United States Patent
Xu et al.

(10) Patent No.: US 11,601,652 B2
(45) Date of Patent: Mar. 7, 2023

(54) CODING MODE DETERMINATION BASED ON COLOR FORMAT

(71) Applicants: Beijing Bytedance Network Technology Co., Ltd., Beijing (CN); Bytedance Inc., Los Angeles, CA (US)

(72) Inventors: Jizheng Xu, San Diego, CA (US); Zhipin Deng, Beijing (CN); Li Zhang, San Diego, CA (US); Hongbin Liu, Beijing (CN); Kai Zhang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/684,630

(22) Filed: Mar. 2, 2022

(65) Prior Publication Data
US 2022/0210437 A1    Jun. 30, 2022

Related U.S. Application Data

(63) Continuation of application No. PCT/CN2020/112974, filed on Sep. 2, 2020.

(30) Foreign Application Priority Data

Sep. 2, 2019  (CN) ................. PCT/CN2019/103959

(51) Int. Cl.
*H04N 19/157* (2014.01)
*H04N 19/174* (2014.01)
(Continued)

(52) U.S. Cl.
CPC ............. *H04N 19/157* (2014.11); *H04N 9/64* (2013.01); *H04N 19/119* (2014.11);
(Continued)

(58) Field of Classification Search
CPC .. H04N 19/157; H04N 19/119; H04N 19/174; H04N 19/176; H04N 19/186;
(Continued)

(56) References Cited

U.S. PATENT DOCUMENTS 9,860,559 B2   1/2018  Zhang et al.
10,055,189 B2  8/2018  Tsai et al.
(Continued)

FOREIGN PATENT DOCUMENTS

CN    103327328 A    9/2013
CN    104685875 A    6/2015
(Continued)

OTHER PUBLICATIONS

Bross et al. "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019 document JVET-M1001, 2019, http://phenix.it-sudparis.eu/jvet/doc_end_user/current_document.php?id=5755.
(Continued)

*Primary Examiner* — Jae N Noh
(74) *Attorney, Agent, or Firm* — Perkins Coie LLP

(57) ABSTRACT

A method of video processing is described. The method includes determining, for a conversion between a video region of a video and a coded representation of the video, an intra coding characteristic of the video region based on a color format of the video according to a rule; and performing the conversion according to the intra coding characteristic.

20 Claims, 26 Drawing Sheets

2110

Determining, for a conversion between a video region of a video and a coded representation of the video, an intra coding characteristic of the video region based on a color format of the video according to a rule — 2112

Performing the conversion according to the intra coding characteristic — 2114

(51) Int. Cl.
*H04N 19/186* (2014.01)
*H04N 19/503* (2014.01)
*H04N 19/176* (2014.01)
*H04N 19/169* (2014.01)
*H04N 19/119* (2014.01)
*H04N 19/46* (2014.01)
*H04N 9/64* (2023.01)

(52) U.S. Cl.
CPC ......... *H04N 19/174* (2014.11); *H04N 19/176* (2014.11); *H04N 19/186* (2014.11); *H04N 19/1883* (2014.11); *H04N 19/46* (2014.11); *H04N 19/503* (2014.11)

(58) Field of Classification Search
CPC .. H04N 19/1883; H04N 19/46; H04N 19/503; H04N 9/64
See application file for complete search history.

(56) References Cited

U.S. PATENT DOCUMENTS

| | | | |
|---|---|---|---|
| 10,136,140 | B2 | 11/2018 | Li et al. |
| 10,306,240 | B2 | 5/2019 | Xiu et al. |
| 10,382,795 | B2 | 8/2019 | Huang et al. |
| 10,820,015 | B2 | 10/2020 | Zhang et al. |
| 11,330,298 | B2 | 5/2022 | Ray et al. |
| 2012/0128067 | A1 | 5/2012 | Liu et al. |
| 2012/0163455 | A1 | 6/2012 | Zheng et al. |
| 2013/0279583 | A1 | 10/2013 | Gao et al. |
| 2013/0294524 | A1 | 11/2013 | Van Der Auwera et al. |
| 2014/0226721 | A1 | 8/2014 | Joshi et al. |
| 2014/0328404 | A1 | 11/2014 | Na et al. |
| 2015/0063460 | A1 | 3/2015 | Gamei et al. |
| 2015/0195559 | A1 | 7/2015 | Chen et al. |
| 2015/0373357 | A1 | 12/2015 | Pang et al. |
| 2016/0100179 | A1 | 4/2016 | He et al. |
| 2016/0234494 | A1 | 8/2016 | Seregin et al. |
| 2017/0251213 | A1 | 8/2017 | Ye et al. |
| 2017/0272782 | A1 | 9/2017 | Li et al. |
| 2017/0366818 | A1 | 12/2017 | Zhang et al. |
| 2018/0070110 | A1 | 3/2018 | Chuang et al. |
| 2018/0199072 | A1 | 7/2018 | Li et al. |
| 2018/0205946 | A1 | 7/2018 | Zhang et al. |
| 2018/0307457 | A1 | 10/2018 | Tsai et al. |
| 2019/0158854 | A1 | 5/2019 | He et al. |
| 2019/0230337 | A1 | 7/2019 | Kim |
| 2019/0238864 | A1 | 8/2019 | Xiu et al. |
| 2019/0320171 | A1 | 10/2019 | Zhang et al. |
| 2020/0077095 | A1 | 3/2020 | Chuang et al. |
| 2020/0137394 | A1 | 4/2020 | Shih et al. |
| 2020/0260070 | A1 | 8/2020 | Yoo et al. |
| 2020/0296398 | A1 | 9/2020 | Zhao et al. |
| 2021/0029356 | A1 | 1/2021 | Zhang et al. |
| 2021/0037242 | A1 | 2/2021 | Zhao et al. |
| 2021/0044828 | A1 | 2/2021 | Pham Van et al. |
| 2021/0152830 | A1 | 5/2021 | Bossen et al. |
| 2021/0227234 | A1 | 7/2021 | Zhang et al. |
| 2021/0250592 | A1 | 8/2021 | Xiu et al. |
| 2021/0274175 | A1 | 9/2021 | Lim et al. |
| 2021/0329233 | A1 | 10/2021 | Tsai et al. |
| 2022/0038717 | A1 | 2/2022 | Zhu et al. |
| 2022/0046288 | A1 | 2/2022 | Rosewarne |
| 2022/0141495 | A1 | 5/2022 | Kim et al. |
| 2022/0159254 | A1 | 5/2022 | Xu et al. |
| 2022/0159255 | A1 | 5/2022 | Xu et al. |

FOREIGN PATENT DOCUMENTS

| | | | |
|---|---|---|---|
| CN | 104782125 | A | 7/2015 |
| CN | 105379284 | A | 3/2016 |
| CN | 105491379 | A | 4/2016 |
| CN | 106062779 | A | 10/2016 |
| CN | 106797465 | A | 5/2017 |
| CN | 107071494 | A | 8/2017 |
| CN | 107534711 | A | 1/2018 |
| CN | 108353184 | A | 7/2018 |
| CN | 109743576 | A | 5/2019 |
| CN | 109804629 | A | 5/2019 |
| CN | 110381311 | A | 10/2019 |
| EP | 3994886 | A1 | 5/2022 |
| EP | 4011066 | A1 | 6/2022 |
| WO | WO-2015005132 | A1 * | 1/2015 ............. H04N 19/11 |
| WO | 2017206803 | A1 | 12/2017 |
| WO | 2018177953 | A1 | 10/2018 |
| WO | 2019069950 | A | 4/2019 |
| WO | WO-2020219737 | A1 * | 10/2020 ........... H04N 19/105 |
| WO | 2021023258 | A1 | 2/2021 |
| WO | 2021026564 | A1 | 2/2021 |
| WO | WO-2021030747 | A1 * | 2/2021 ........... H04N 19/103 |
| WO | WO-2021060847 | A1 * | 4/2021 |

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11, 15th Meeting, Gotehnburg, SE, Jul. 3-12, 2019, document JVET-O2001 ,vB and vE 2019.

Cai et al. "On Supporting 64x64 Chroma Transform Unit," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0389, 2019.

Chao et al. "Non-CE8: Palette Mode and Prediction Mode Signaling," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0476, 2019.

Chen et al. "Algorithm Description for Versatile Video Coding and Test Model 5 (VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1002, 2019.

Choi et al. "Chroma Block Size Restriction in Dual Tree Intra Coding," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0398, 2019.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Huang et al. "Block Partitioning Structure in the VVC Standard," IEEE Transactions on Circuits and Systems for Video Technology, Oct. 2021, 31(10):3818-3833.

Kuo et al. "Non-CE2: CRS with Chroma Separate Tree," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0130, 2019.

Li et al. "AHG15: Cleanup for Signaling of Minimum QP of Transform Skip," Joint Video Experts Team (JVET) of ITU-T SG 16 WP 3 and ISO/IEC JTC 1/SC 29/WG 11 18th Meeting: by teleconference, Apr. 15-24, 2020, document JVET-R0045, 2020.

Lin et al. "CE3-2.1.1 and CE3-2.1.2: Removing 2x2, 2x4, and 4x2 chroma CBs," Joint Video Experts Team (JVET)of ITU-T SG 16 WP 3 and ISO/IEC JTC 1/SC 29/WG 1115th Meeting: Gothenburg, SE, Jul. 3-12, 2019, document JVET-30050, 2019.

Poirier et al. "Non-CE2: Alternative Solutions for Reducing the Luma-Chroma Latency" Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0524, 2019.

Pu et al. "AHG15: Chroma Quantization Parameters QpC Table," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0433, 2019.

Rosewarne et al. "AHG16-Related: Chroma Block Coding and Size Restriction," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0245, 2019.

(56) References Cited

OTHER PUBLICATIONS

Said et al. "CE5: Per-context CABAC Initialization with Single Window (Test 5.1.4)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0413, 2019.
Wang et al. Effective Quadtree Plus Binary Tree Block Partition Decision for Future Video Coding, 2017 Data Compression Conference, 2017, IEEE.
Yang et al. "Low-Complexity CTU Partition Structure Decision and Fast Intra Mode Decision for Versatile Video Coding," IEEE Transactions on Circuits and Systems for Video Technology, Jun. 2020, 30(6):1668-1682.
Zhou et al. "Non-CE3: Intra Chroma Partitioning and Prediction Restriction," Joint Video Exploration Team (JVET) of ITU-T SG 16 WP 3 and ISO/IEC JTC 1/SC 29/WG 11 13th Meeting: Marrakesh, MA, Jan. 9-18, 2019, document JVET-M0065,2 019.
Zhu et al. "Non-CE8: Adaptive Single/Dual Tree with IBC Simplification," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0258, 2019.
https://vcgit.hhi.fraunhofer.de/jvet/VVCSoftware_VTM/tags/VTM-5.0.
https://jvet.hhi.fraunhofer.de/svn/svn_HMJEMSoftware/.
International Search Report and Written Opinion from International Patent Application No. PCT/CN2020/107381 dated Nov. 11, 2020 (9 pages).
International Search Report and Written Opinion from International Patent Application No. PCT/CN2020/107400 dated Oct. 26, 2020 (10 pages).
International Search Report and Written Opinion from International Patent Application No. PCT/CN2020/107408 dated Sep. 28, 2020 (10 pages).
International Search Report and Written Opinion from International Patent Application No. PCT/CN2020/112974 dated Nov. 30, 2020 (14 pages).
International Search Report and Written Opinion from International Patent Application No. PCT/CN2020/112975 dated Nov. 30, 2020 (10 pages).
International Search Report and Written Opinion from International Patent Application No. PCT/CN2020/116472 dated Dec. 25, 2020 (13 pages).
International Search Report and Written Opinion from International Patent Application No. PCT/CN2021/086522 dated Jul. 9, 2021 (13 pages).
Non Final Office Action from U.S. Appl. No. 17/589,537 dated May 10, 2022.
Non Final Office Action from U.S. Appl. No. 17/589,168 dated May 18, 2022.
Non Final Office Action from U.S. Appl. No. 17/589,483 dated May 23, 2022.
Non Final Office Action from U.S. Appl. No. 17/684,694 dated Jul. 5, 2022.
Final Office Action from U.S. Appl. No. 17/589,483 dated Sep. 19, 2022.
Extended European Search Report from European Patent No. 20859901.9 dated Aug. 18, 2022 (13 pages).
Extended European Search Report from European Patent No. 20850328.4 dated Nov. 28, 2022 (8 pages).
Yuan et al. "Quadtree Based Nonsquare Block Structure for Inter Frame Coding in High Efficiency Video Coding," EEE Transactions on Circuits and Systems for Video Technology, Dec. 2012, 22(12):1707-1719. (cited in EP20859902.7 EESR dated Oct. 11, 2022).
Extended European Search Report from European Patent No. 20859902.7 dated Oct. 11, 2022 (13 pages).

\* cited by examiner

CODING MODE DETERMINATION BASED ON COLOR FORMAT

CROSS REFERENCE TO RELATED APPLICATIONS

This application is a continuation of International Patent Application No. PCT/CN2020/112974, filed on Sep. 2, 2020, which claims the priority to and benefit of International Patent Application No. PCT/CN2019/103959, filed on Sep. 2, 2019. All the aforementioned patent applications are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for in which reference pictures are used in video coding or decoding.

In one example aspect a method of video processing is disclosed. The method includes determining, for a conversion between a video region of a video and a coded representation of the video, an intra coding characteristic of the video region based on a color format of the video according to a rule; and performing the conversion according to the intra coding characteristic.

In another example aspect, another method of video processing is disclosed. The method includes performing a conversion between a current video block of a video and a coded representation of the video, wherein the coded representation conforms to a format rule, and wherein the format rule specifies a syntax element, modeType, indicative of a coding mode of the current video block, that is equal to either MODE_TYPE_NO_JNTER that restricts use of the inter coding mode for the conversion, or MODE_TYPE_NO_INTRA that restricts use of the intra mode for the conversion.

In another example aspect, another method of video processing is disclosed. The method includes performing a conversion between a video and a coded representation of the video, wherein the coded representation conforms to a format rule that specifies that a flag indicating a prediction mode constraint is not included in the coded representation in case that a chroma format of the video is 4:2:2, 4:0:0, or 4:4:4.

In another example aspect, another method of video processing is disclosed. The method includes determining, for a conversion between a video region of a video and a coded representation of the video, whether and/or how a restriction on a size of a smallest chroma intra prediction block to the video region is enabled according to a rule; and performing the conversion based on the determining, wherein the rule is dependent on whether a color format of the video is 4:2:0 or 4:2:2.

In another example aspect, another method of video processing is disclosed. The method includes determining, for a conversion between a video region of a video and a coded representation of the video, whether a restriction on a size of a smallest chroma intra prediction block to the video region is enabled according to a rule; and performing the conversion based on the determining, wherein the rule is dependent on a color format of the video and/or a width (M) and a height (N) of the video region, and wherein the rule further specifies that, for the video region that is a coding tree node with a BT (binary tree) split, then the restriction on the smallest chroma intra prediction block is disabled in case that 1) the color format of the video is 4:2:2 and 2) that a multiplication of M and N is a value from a set of values, wherein the set of values includes 64.

In another example aspect, another method of video processing is disclosed. The method includes performing a conversion between a video region of a video and a coded representation of the video according to a restriction on a smallest chroma intra prediction block size, wherein the coded representation conforms to a format rule that specifies a value of a syntax field in the coded representation, due to a 4:2:2 color format of the video.

In another example aspect, another method of video processing is disclosed. The method includes determining, for a conversion between a current video block of a video and a coded representation of the video, an applicability of a partitioning scheme to the current video block according to a rule; and performing the conversion based on the determining.

In another example aspect, another method of video processing is disclosed. The method includes determining, for a conversion between a video block of a video and a coded representation of the video, whether an inter mode is enabled according to a rule, and performing the conversion based on the determining, wherein the rule specifies that the inter mode is enabled in case that a dual tree partitioning of luma samples is enabled for the video block.

In another example aspect, another method of video processing is disclosed. The method includes determining, for a conversion between a video region of a video and a coded representation of the video, based on a rule, whether use of a palette mode is permitted for the video region; and performing the conversion based on the determining, wherein the palette mode includes encoding the video region using a palette of representative sample values.

In another example aspect, another method of video processing is disclosed. The method includes performing a conversion between a current video block of a video and a coded representation of the video, wherein the coded representation conforms to a format rule, wherein the format rule specifies a syntax element, modeType, that includes a MODE_TYPE_IBC that allows use of an intra block copy mode for the conversion or MODE_TYPE_PALETTE that allows use of a palette mode for the conversion, wherein the intra block copy mode includes encoding the current video block using at least a block vector pointing to a video frame containing the current video block, and wherein the palette mode includes encoding the current video block using a palette of representative sample values.

In another example aspect, another method of video processing is disclosed. The method includes determining, for a conversion between a current video block of a video and a coded representation of the video, whether a certain partitioning scheme is allowed for the current video block according to a rule that depends on a coding mode type used for representing the current video block in the coded representation and a dimension of the current video block; and performing the conversion based on the determining.

In another example aspect, another method of video processing is disclosed. The method includes performing a conversion between a video block of a video and a coded representation of the video, wherein the coded representation conforms to a format rule, wherein the format rule specifies that a characteristic of the video block controls whether a syntax element in the coded representation indicates a prediction mode of the video block.

In another example aspect, another method of video processing is disclosed. The method includes performing a conversion between a video region of a first component of a video and a coded representation of the video, wherein the coded representation conforms to a format rule, wherein the format rule specifies whether and/or how a syntax field is configured in the coded representation to indicate a differential quantization parameter for the video region depends on a splitting scheme used for splitting samples of the first component.

In another example aspect, another method of video processing is disclosed. The method includes performing a conversion between a video region of a first component of a video and a coded representation of the video according to a rule, wherein the rule specifies, in case that a dual tree and/or a local dual tree coding structure is applied to the video region, that a variable related to a differential quantization parameter of the first component is not modified during a decoding or parsing process of a second component of the video.

In yet another example aspect, the above-described method may be implemented by a video encoder apparatus that comprises a processor.

In yet another example aspect, the above-described method may be implemented by a video decoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 3 shows an example of use of palette predictor to signal palette entries.

FIG. 9 shows an example of subsampled Laplacian calculation.

DETAILED DESCRIPTION

Figure 1:
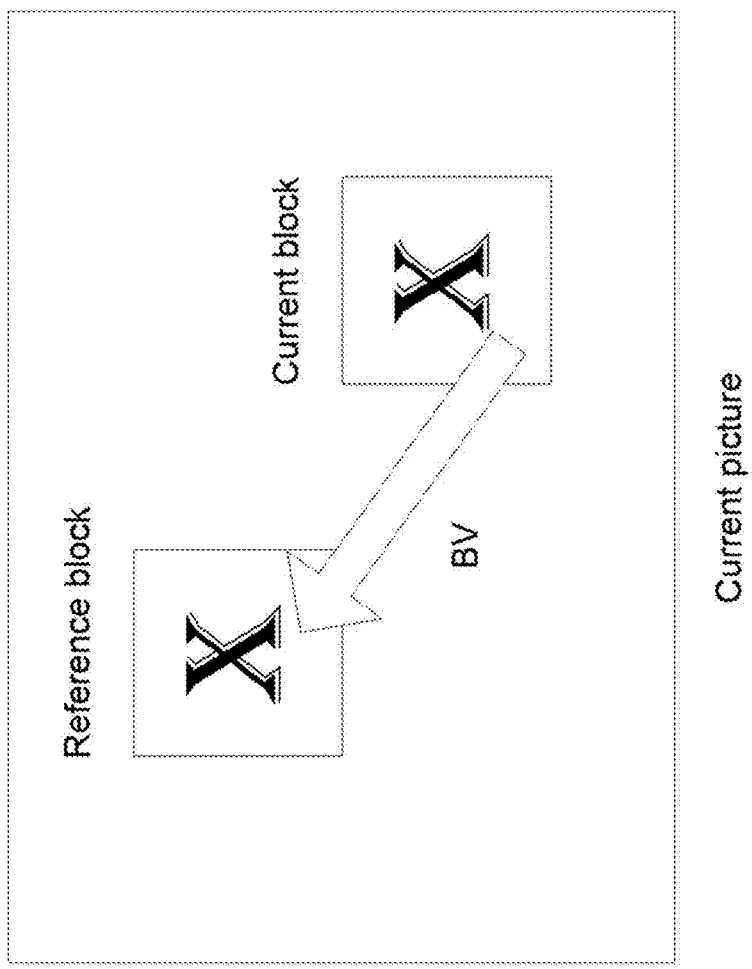
FIG. 1 shows an example of intra block copy coding tool.

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to video coding technologies. Specifically, it is related to palette coding with employing base colors based representation in video coding. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Intra Block Copy

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 1, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

FIG. 1 is an illustration of Intra block copy.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.2 IBC in HEVC Screen Content Coding Extensions

In the screen content coding extensions of HEVC, when a block uses current picture as reference, it should guarantee that the whole reference block is within the available reconstructed area, as indicated in the following spec text:

---

The varishies offsetX and offsetY are derived as follows:
    offsetX = ( ChromaArrayType = = 0 ) ? 0 : (mvCLX [0] & 0x7 ? 2 : 0 )    (8-104)
    offsetY = ( ChromaArrayType = = 0 ) ? 0 : (mvCLX [1] & 0x7 ? 2 : 0 )    (8-105)
It is a requirement of bitstream conformance that when the reference picture is the current picture,
the luma motion vector mvLX shall obey the follow contraints:
  When the derivation process for z-scan order block availability as specified in clause 6.4.1 is invoked with
  ( xCurr, yCurr ) set equal to ( xCb, yCb ) and the neighbouring luma location (xNbY, yNbY ) set equal to
  ( xPb + (mvLX[ 0 ] >> 2 ) – offsetX, yPb + ( mvLX [ 1 ] >> 2 ) – offsetY ) as inputs, the outputs shall be
  equal to TRUE.
  When the derivation process for z-scan order block abailability as specified in clause 6.4.1 is invoked with
  ( xCurr, yCurr ) set equal to (xCb, yCb ) and the neighbouring luma location (xNbY, yNbY ) set equal to
  ( xPb + ( mvL [ 0 ] >> 2 ) + nPbW – 1 + offsetX, yPb + ( mvLx[ 1 ] << 2 ) + nPbH – 1 + offsetY ) as inputs,
  the output shall be equal to TRUE.
  One or both of the following conditions shall be true:
    The value of ( mvLX[0] >> 2 ) + nPbW + xB1 + offsetX is less than or equal to 0.
    The value of ( mvLX[1] >> 2 ) + nPbH + yB1 + offsetY is less than or equal to 0.
  The following condition shall be true:
    ( xPb + (mvLX[ 0 ] >> 2 ) + nPbSw – 1 + offsetX ) / CtbSizeY – xCb / CtbSizeY <=
      yCb/CtbSizeY – ( yPb + (mvLX[ 1 ] >> 2 ) + nPbSh – 1 + offsetY ) / CtbSize Y    (8-106)

---

Thus, the case that the reference block overlaps with the current block or the reference block is outside of the picture will not happen. There is no need to pad the reference or prediction block.

2.3 IBC in VVC Test Model

In the current VVC test model, i.e., VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.3.1 IBC Merge Mode

Figure 20:
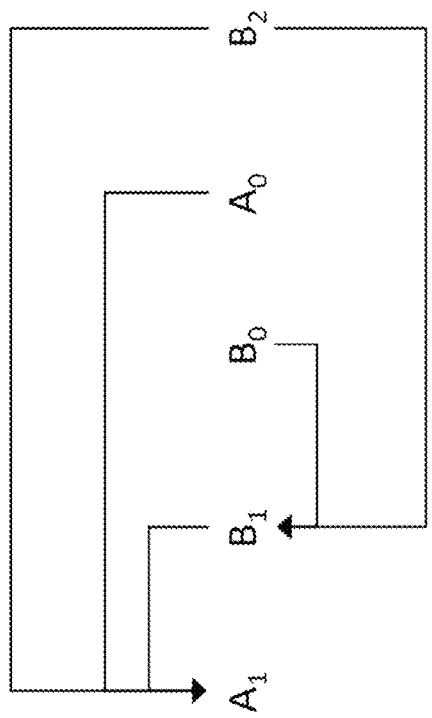
FIG. 20 shows examples of candidate pairs considered for redundancy check of spatial merge candidates.
Figure 19:
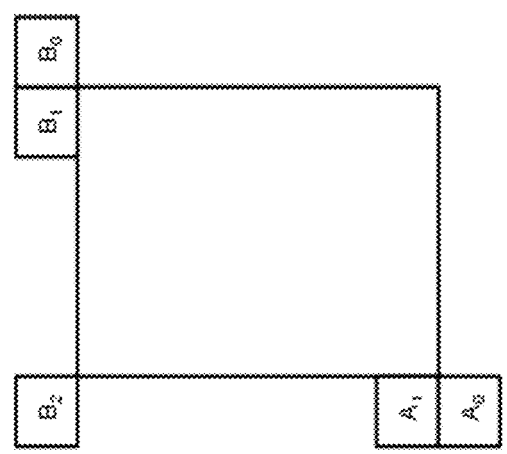
FIG. 19 shows examples of positions of spatial merge candidates.

In IBC merge mode, an index pointing to an entry in the IBC merge candidates list is parsed from the bitstream. The construction of the IBC merge list can be summarized according to the following sequence of steps:

Step 1: Derivation of spatial candidates
    Step 2: Insertion of HMVP candidates
    Step 3: Insertion of pairwise average candidates In the derivation of spatial merge candidates, a maximum of four merge candidates are selected among candidates located in the positions depicted in FIG. 19. The order of derivation is $A_1$, $B_1$, $B_0$, $A_0$ and $B_2$. Position $B_2$ is considered only when any PU of position $A_1$, $B_1$, $B_0$, $A_0$ is not available (e.g., because it belongs to another slice or tile) or is not coded with IBC mode. After candidate at position $A_1$ is added, the insertion of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 20 are considered and a candidate is only added to the list if the corresponding candidate used for redundancy check has not the same motion information.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.3.2 IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates
      Check $A_0$, $A_1$ until an available candidate is found.
      Check $B_0$, $B_1$, $B_2$ until an available candidate is found.

Step 2: Insertion of HMVP candidates

Step 3: Insertion of zero candidates

After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.4 Palette Mode

The basic idea behind a palette mode is that the samples in the CU are represented by a small set of representative colour values. This set is referred to as the palette. And it is also possible to indicate a sample that is outside the palette by signalling an escape symbol followed by (possibly quantized) component values. This kind of sample is called escape sample. The palette mode is illustrated in FIG. 2.

Figure 2:
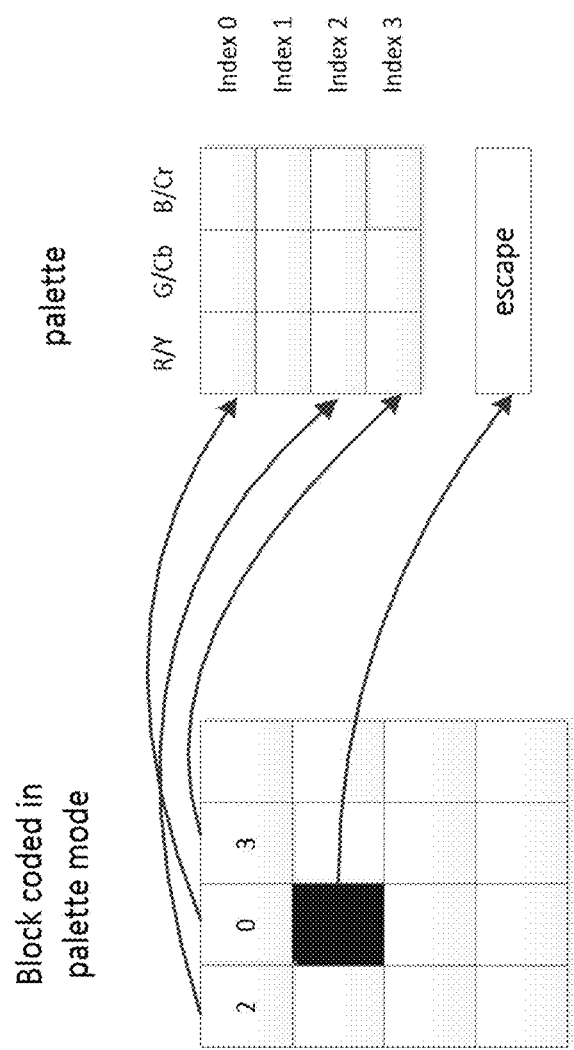
FIG. 2 shows an example of a block coded in palette mode.

FIG. 2 shows an example of a block coded in palette mode.

2.5 Palette Mode in HEVC Screen Content Coding Extensions (HEVC-SCC)

In the palette mode in HEVC-SCC, a predictive way is used to code the palette and index map.

2.5.1 Coding of the Palette Entries

For coding of the palette entries, a palette predictor is maintained. The maximum size of the palette as well as the palette predictor is signalled in the SPS. In HEVC-SCC, a palette_predictor_initializer_present_flag is introduced in the PPS. When this flag is 1, entries for initializing the palette predictor are signalled in the bitstream. The palette predictor is initialized at the beginning of each CTU row, each slice and each tile. Depending on the value of the palette_predictor_initializer_present_flag, the palette predictor is reset to 0 or initialized using the palette predictor intializer entries signalled in the PPS. In HEVC-SCC, a palette predictor initializer of size 0 was enabled to allow explicit disabling of the palette predictor initialization at the PPS level.

Figure 3:
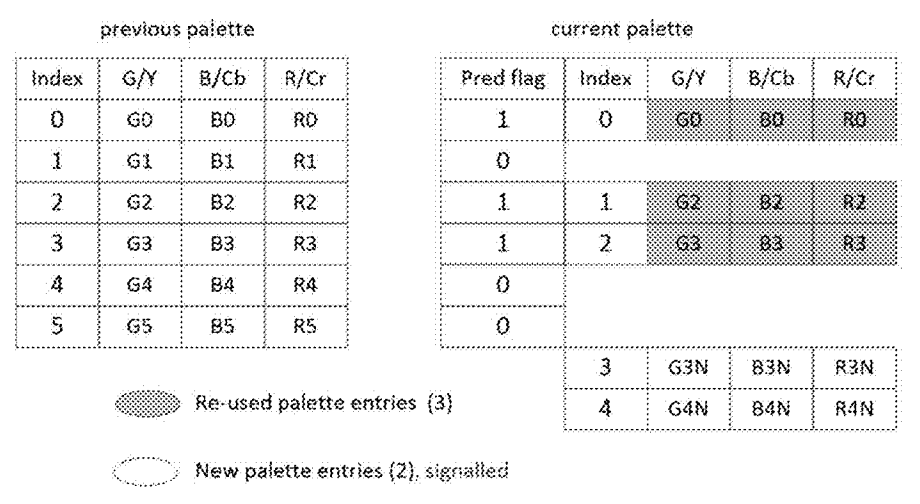

For each entry in the palette predictor, a reuse flag is signalled to indicate whether it is part of the current palette. This is illustrated in FIG. 3. The reuse flags are sent using run-length coding of zeros. After this, the number of new palette entries are signalled using exponential Golomb code of order 0. Finally, the component values for the new palette entries are signalled.

FIG. 3 shows an example of use of palette predictor to signal palette entries.

2.5.2 Coding of Palette Indices

Figure 4:
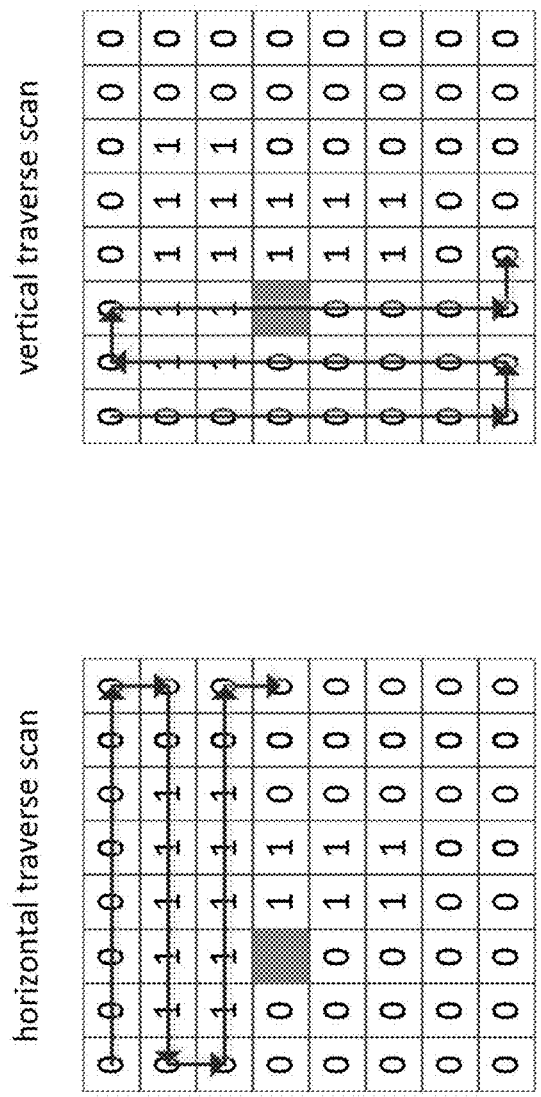
FIG. 4 shows an example of examples of Horizontal and vertical traverse scans.

The palette indices are coded using horizontal and vertical traverse scans as shown in FIG. 4. The scan order is explicitly signalled in the bitstream using the palette_transpose_flag. For the rest of the subsection it is assumed that the scan is horizontal.

FIG. 4 shows examples of Horizontal and vertical traverse scans.

Figure 5:
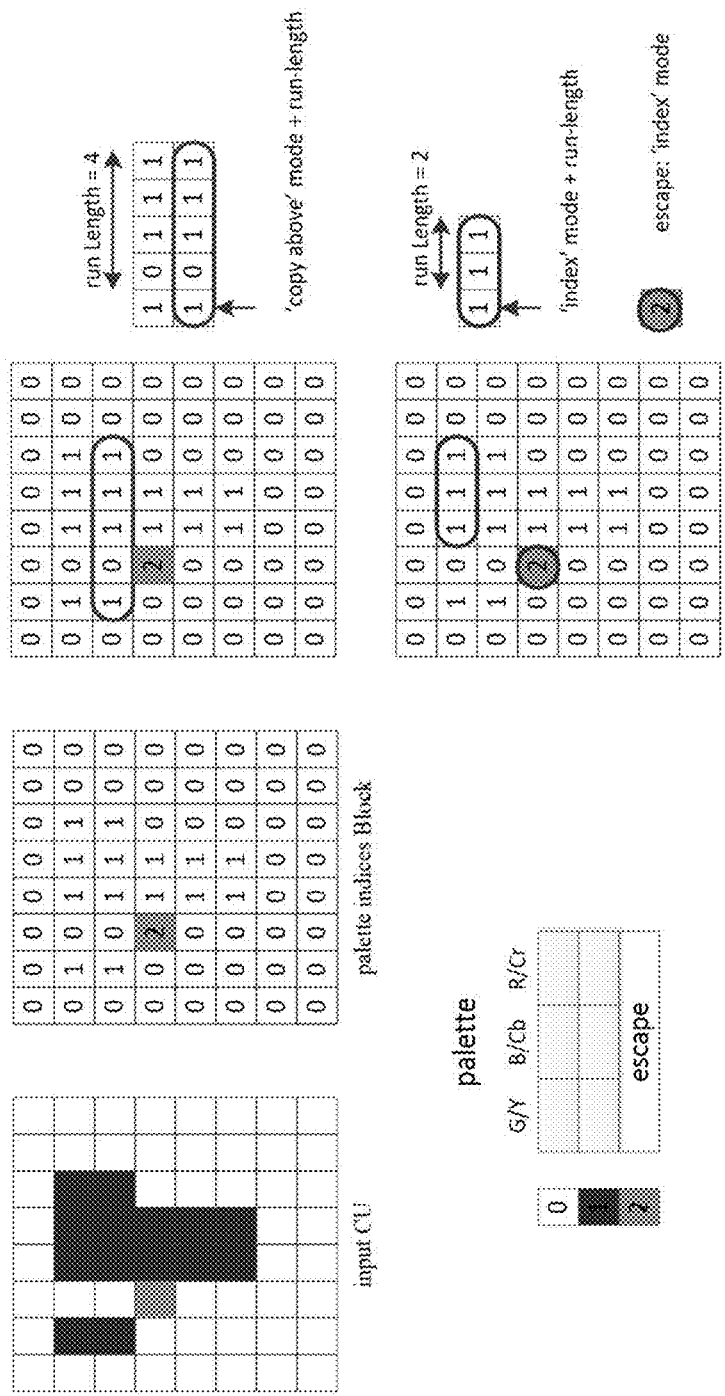
FIG. 5 shows examples of coding of palette indices.

The palette indices are coded using two main palette sample modes: 'INDEX' and 'COPY_ABOVE'. As explained previously, the escape symbol is also signalled as an 'INDEX' mode and assigned an index equal to the maximum palette size. The mode is signalled using a flag except for the top row or when the previous mode was 'COPY_ABOVE'. In the 'COPY_ABOVE' mode, the palette index of the sample in the row above is copied. In the 'INDEX' mode, the palette index is explicitly signalled. For both 'INDEX' and 'COPY_ABOVE' modes, a run value is signalled which specifies the number of subsequent samples that are also coded using the same mode. When escape symbol is part of the run in 'INDEX' or 'COPY_ABOVE' mode, the escape component values are signalled for each escape symbol. The coding of palette indices is illustrated in FIG. 5.

This syntax order is accomplished as follows. First the number of index values for the CU is signaled. This is followed by signaling of the actual index values for the entire CU using truncated binary coding. Both the number of indices as well as the the index values are coded in bypass mode. This groups the index-related bypass bins together. Then the palette sample mode (if necessary) and run are signaled in an interleaved manner. Finally, the component escape values corresponding to the escape samples for the entire CU are grouped together and coded in bypass mode.

An additional syntax element, last_run_type_flag, is signaled after signaling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signaling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signaling is for the escape component values. For each escape sample, the number of escape component values signaled may be different depending on the number of components associated with that sample.

In VVC, the dual tree coding structure is used on coding the intra slices, so the luma component and two chroma components may have different palette and palette indices. In addition, the two chroma component shares same palette and palette indices.

FIG. 5 shows examples of coding of palette indices.

2.6 Intra Mode Coding in VVC

To capture the arbitrary edge directions presented in natural video, the number of directional intra modes in VTM5 is extended from 33, as used in HEVC, to 65. The new directional modes not in HEVC are depicted as red dotted arrows in FIG. 6 and the planar and DC modes remain the same. These denser directional intra prediction modes apply for all block sizes and for both luma and chroma intra predictions.

In VTM5, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VTM5, blocks can have a rectangular shape that necessitates the use of a division operation per block in the general case. To avoid division operations for DC prediction, only the longer side is used to compute the average for non-square blocks.

Figure 6:
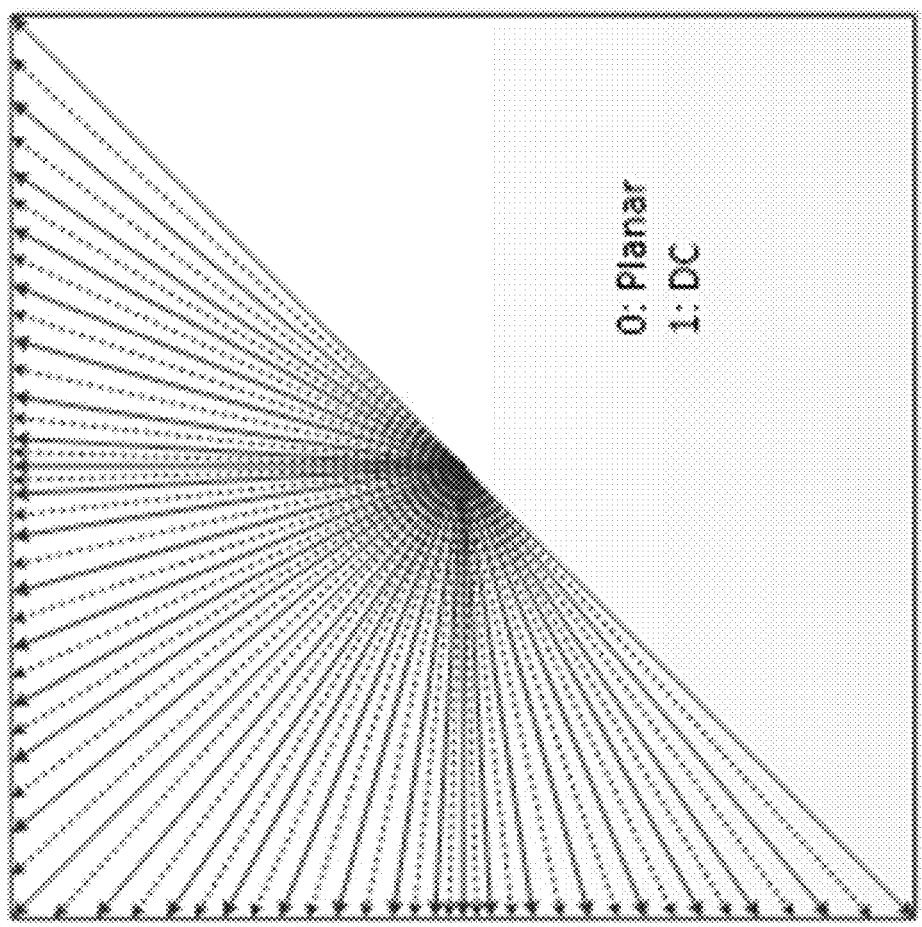
FIG. 6 shows an example of 67 intra prediction modes.

FIG. 6 shows an example of 67 intra prediction modes.

To keep the complexity of the most probable mode (MPM) list generation low, an intra mode coding method with 6 MPMs is used by considering two available neighboring intra modes. The following three aspects are considered to construct the MPM list:

Default intra modes

Neighbouring intra modes

Derived intra modes

Figure 7:
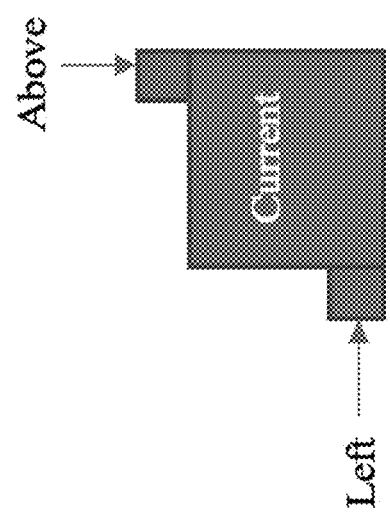
FIG. 7 shows examples of the left and above neighbours of the current block.

A unified 6-MPM list is used for intra blocks irrespective of whether MRL and ISP coding tools are applied or not. The MPM list is constructed based on intra modes of the left and above neighboring block. Suppose the mode of the left block is denoted as Left and the mode of the above block is denoted as Above, the unified MPM list is constructed as follows (The left and above blocks are shown in FIG. 7):

FIG. 7 is an example of the left and above neighbours of the current block.

When a neighboring block is not available, its intra mode is set to Planar by default.

If both modes Left and Above are non-angular modes:
   MPM list→{Planar, DC, V, H, V−4, V+4}

If one of modes Left and Above is angular mode, and the other is non-angular:
   Set a mode Max as the larger mode in Left and Above
   MPM list→{Planar, Max, DC, Max−1, Max+1, Max−2}

If Left and Above are both angular and they are different:
   Set a mode Max as the larger mode in Left and Above
   if the difference of mode Left and Above is in the range of 2 to 62, inclusive
      MPM list→{Planar, Left, Above, DC, Max−1, Max+1}
   Otherwise
      MPM list→{Planar, Left, Above, DC, Max−2, Max+2}

If Left and Above are both angular and they are the same:
   MPM list→{Planar, Left, Left−1, Left+1, DC, Left−2}

Besides, the first bin of the mpm index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

For chroma intra mode coding, a total of 8 intra modes are allowed for chroma intra mode coding. Those modes include five traditional intra modes and three cross-component linear model modes (CCLM, LM_A, and LM_L). Chroma mode signalling and derivation process are shown in Table 2-. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 2-4

Derivation of chroma prediction mode from luma mode when cclm_is enabled

| Chroma prediction mode | Corresponding luma intra prediction mode | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

2.7 Quantized Residual Block Differential Pulse-Code Modulation (QR-BDPCM)

In JVET-M0413, a quantized residual block differential pulse-code modulation (QR-BDPCM) is proposed to code screen contents efficiently.

The prediction directions used in QR-BDPCM can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M (rows)×N (cols), let $r_{i,j}$, $0 \leq i \leq M-1$, $0 \leq j \leq N-1$ be the prediction residual after performing intra prediction horizontally (copying left neighbor pixel value across the the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signalled:

$$\tilde{r}_{ij} = \begin{cases} Q(r_{i,j}), & i=0, 0 \leq j \leq (N-1) \\ Q(r_{i,j}) - Q(r_{(i-1),j}), & 1 \leq i \leq (M-1), 0 \leq j \leq (N-1) \end{cases} \quad (2\text{-}7\text{-}1)$$

For horizontal prediction, similar rules apply, and the residual quantized samples are obtained by $$\tilde{r}_{ij} = \begin{cases} Q(r_{i,j}), & 0 \leq i \leq (M-1), j=0 \\ Q(r_{i,j}) - Q(r_{i,(j-1)}), & 0 \leq i \leq (M-1), 1 \leq j \leq (N-1) \end{cases} \quad (2\text{-}7\text{-}2)$$

The residual quantized samples $\tilde{r}_{i,j}$ are sent to the decoder.

On the decoder side, the above calculations are reversed to produce $Q(r_{i,j})$, $0 \leq i \leq M-1$, $0 \leq j \leq N-1$. For vertical prediction case, $$Q(r_{i,j}) = \sum_{k=0}^{i} \tilde{r}_{k,j}, 0 \leq i \leq (M-1), 0 \leq j \leq (N-1) \quad (2\text{-}7\text{-}3)$$

For horizontal case, $$Q(r_{i,j}) = \sum_{k=0}^{j} \tilde{r}_{i,k}, 0 \leq i \leq (M-1), 0 \leq j \leq (N-1) \quad (2\text{-}7\text{-}4)$$

The inverse quantized residuals, $Q^{-1}(Q(r_{i,j}))$, are added to the intra block prediction values to produce the reconstructed sample values.

The main benefit of this scheme is that the inverse DPCM can be done on the fly during coefficient parsing simply adding the predictor as the coefficients are parsed or it can be performed after parsing.

2.8 Adaptive Loop Filter

In the VTM5, an Adaptive Loop Filter (ALF) with block-based filter adaption is applied. For the luma component, one among 25 filters is selected for each 4×4 block, based on the direction and activity of local gradients.

2.8.1.1 Filter Shape

Figure 8:
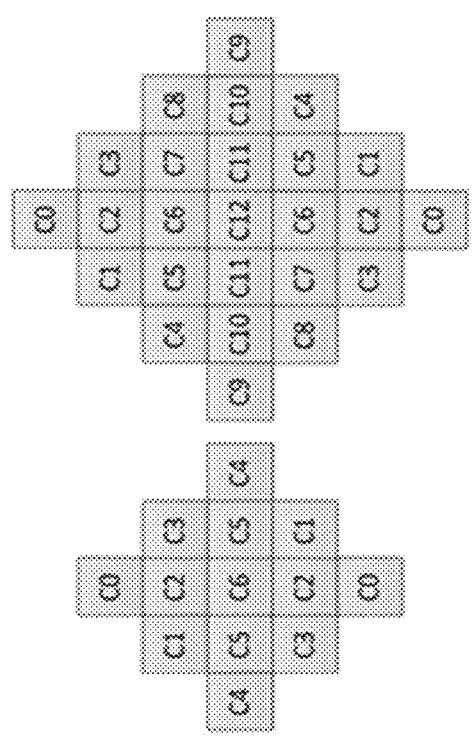
FIG. 8 shows examples of ALF filter shapes (chroma: 5×5 diamond, luma: 7×7 diamond).

In the VTM5, two diamond filter shapes (as shown in FIG. 8) are used. The 7×7 diamond shape is applied for luma component and the 5×5 diamond shape is applied for chroma components.

FIG. 8 shows examples of ALF filter shapes (chroma: 5×5 diamond, luma: 7×7 diamond)

2.8.1.2 Block Classification

For luma component, each 4×4 block is categorized into one out of 25 classes. The classification index C is derived based on its directionality D and a quantized value of activity $\hat{A}$, as follows:

$$C = 5D + \hat{A} \tag{2-9-1}$$

To calculate D and $\hat{A}$, gradients of the horizontal, vertical and two diagonal direction are first calculated using 1-D Laplacian:

$$g_v = \sum_{k=i-2}^{i+3} \sum_{l=j-2}^{j+3} V_{k,l}, \tag{2-9-2}$$

$$V_{k,l} = |2R(k,l) - R(k,l-1) - R(k,l+1)|$$

$$g_h = \sum_{k=i-2}^{i+3} \sum_{l=j-2}^{j+3} H_{k,l}, \tag{2-1}$$

$$H_{k,l} = |2R(k,l) - R(k-1,l) - R(k+1,l)|$$

$$g_{d1} = \sum_{k=i-2}^{i+3} \sum_{l=j-2}^{j+3} D1_{k,l}, \tag{2-9-4}$$

$$D1_{k,l} = |2R(k,l) - R(k-1,l-1) - R(k+1,l+1)|$$

$$g_{d2} = \sum_{k=i-2}^{i+3} \sum_{j=j-2}^{j+3} D2_{k,l}, \tag{2-9-5}$$

$$D2_{k,l} = |2R(k,l) - R(k-1,l+1) - R(k+1,l-1)|$$

Where indices i and j refer to the coordinates of the upper left sample within the 4×4 block and R(i,j) indicates a reconstructed sample at coordinate (i,j).

Figure 9:
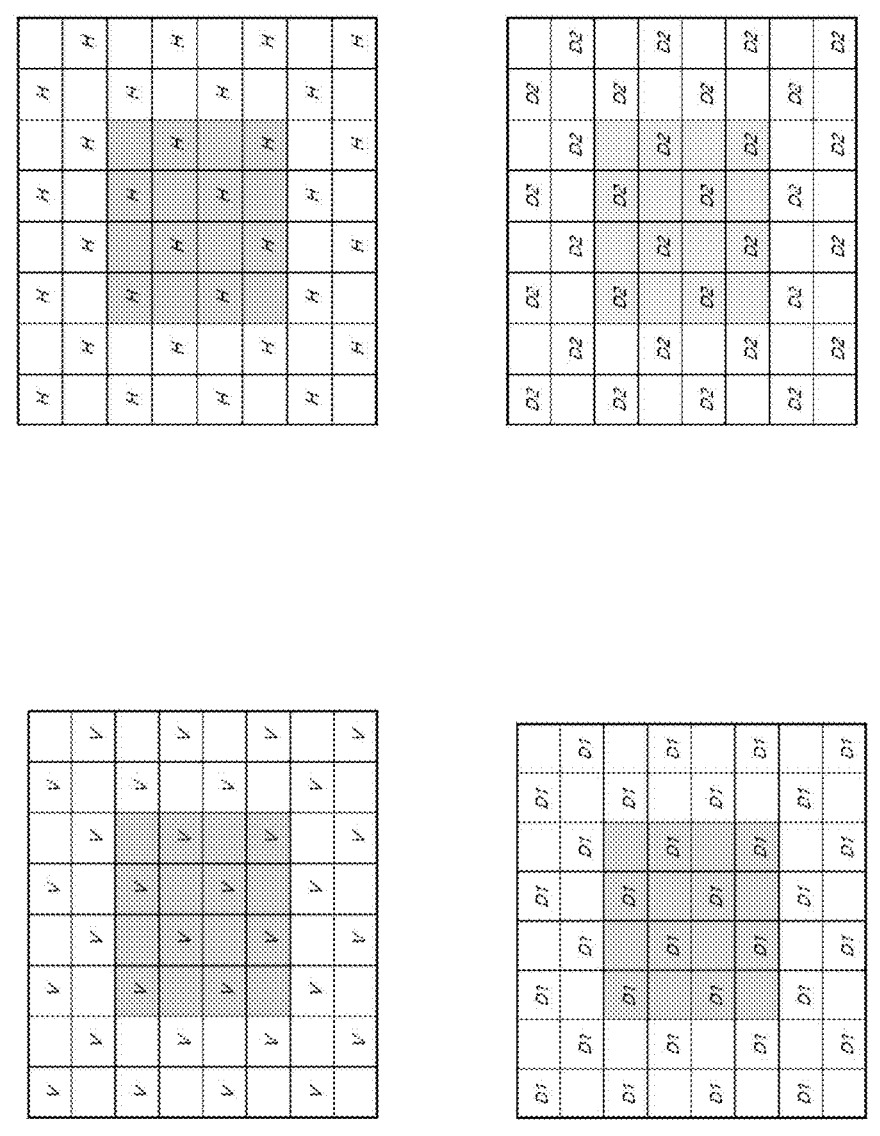

To reduce the complexity of block classification, the subsampled 1-D Laplacian calculation is applied. As shown in FIG. 9 the same subsampled positions are used for gradient calculation of all directions.

FIG. 9 shows an example of subsampled Laplacian calculation. (a) Subsampled positions for vertical gradient (b) Subsampled positions for horizontal gradient (c) Subsampled positions for diagonal gradient (d) Subsampled positions for diagonal gradient.

Then D maximum and minimum values of the gradients of horizontal and vertical directions are set as:

$$g_{h,v}^{max} = \max(g_h, g_v), g_{h,v}^{min} = \min(g_h, g_v) \tag{2-9-6}$$

The maximum and minimum of the gradient of two diagonal directions are set as:

$$g_{d0,d1}^{max} = \max(g_{d0}, g_{d1}), g_{d0,d1}^{min} = \min(g_{d0}, g_{d1}) \tag{2-9-7}$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \sum_{k=u-2}^{i+3} \sum_{l=j-2}^{j+3} (V_{k,l} + H_{k,l}) \tag{2-9-8}$$

A is further quantized to the range of 0 to 4, inclusively, and the quantized value is denoted as $\hat{A}$.

For chroma components in a picture, no classification method is applied, i.e. a single set of ALF coefficients is applied for each chroma component.

2.8.1.3 Geometric Transformations of Filter Coefficients and Clipping Values Before filtering each 4×4 luma block, geometric transformations such as rotation or diagonal and vertical flipping are applied to the filter coefficients f (k, l) and to the corresponding filter clipping values c(k, l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

Diagonal: $f_D(k,l) = f(l,k), c_D(k,l) = c(l,k),$ (2-9-9)

Vertical flip: $f_V(k,l) = f(k,K-l-1), c_V(k,l) = c(k,K-l-1)$ (2-9-10)

Rotation: $f_R(k,l) = f(K-l-1,k), c_R(k,l) = c(K-l-1,k)$ (2-9-11)

where K is the size of the filter and $0 \leq k, l \leq K-1$ are coefficients coordinates, such that location (0,0) is at the upper left corner and location (K−1, K−1) is at the lower right corner. The transformations are applied to the filter coefficients f (k, l) and to the clipping values c(k, l) depending on gradient values calculated for that block. The relationship between the transformation and the four gradients of the four directions are summarized in the following table.

TABLE 2-5

Mapping of the gradient calculated for one block and the transformations

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

2.8.1.4 Filter Parameters Signalling

In the VTM5, ALF filter parameters are signalled in Adaptation Parameter Set (APS). In one APS, up to 25 sets of luma filter coefficients and clipping value indexes, and up to one set of chroma filter coefficients nd clipping value indexes could be signalled. To reduce bits overhead, filter coefficients of different classification can be merged. In slice header, the indices of the APSs used for the current slice are signaled.

Clipping value indexes, which are decoded from the APS, allow determining clipping values using a Luma table of clipping values and a Chroma table of clipping values. These clipping values are dependent of the internal bitdepth. More precisely, the Luma table of clipping values and Chroma table of clipping values are obtained by the following formulas:

$$AlfClip_L = \left\{ \text{round}\left(2^{B\frac{N-n+1}{N}}\right) \text{ for } n \in [1 \ldots N] \right\}, \tag{2-9-12}$$

-continued $$AlfClip_C = \left\{ \text{round}\left(2^{(B-8)+8\frac{(N-n)}{N-1}}\right) \text{ for } n \in [1 \ldots N] \right\} \quad (2\text{-}9\text{-}13)$$

with B equal to the internal bitdepth and N equal to 4 which is the number of allowed clipping values in VTM5.0.

The filtering process can be controlled at CTB level. A flag is always signalled to indicate whether ALF is applied to a luma CTB. A luma CTB can choose a filter set among 16 fixed filter sets and the filter sets from APSs. A filter set index is signaled for a luma CTB to indicate which filter set is applied. The 16 fixed filter sets are pre-defined and hard-coded in both the encoder and the decoder.

The filter coefficients are quantized with norm equal to 128. In order to restrict the multiplication complexity, a bitstream conformance is applied so that the coefficient value of the non-central position shall be in the range of $-2^7$ to $2^7-1$, inclusive. The central position coefficient is not signalled in the bitstream and is considered as equal to 128.

2.8.1.5 Filtering Process

At decoder side, when ALF is enabled for a CTB, each sample R(i, j) within the CU is filtered, resulting in sample value R'(i, j) as shown below, $$R'(i,j)=R(i,j)+((\Sigma_{k\neq 0}\Sigma_{l\neq 0}f(k,l)\times K(R(i+k,j+l)-R(i,j),c(k,l))+64)>>7) \quad (2\text{-}9\text{-}14)$$

where f (k, l) denotes the decoded filter coefficients, K(x, y) is the clipping function and c(k, l) denotes the decoded clipping parameters. The variable k and l varies between −L/2 and L/2 where L denotes the filter length. The clipping function K(x, y)=min (y, max(−y, x)) which corresponds to the function Clip3 (−y, y, x).

2.8.1.6 Virtual Boundary Filtering Process for Line Buffer Reduction

In VTM5, to reduce the line buffer requirement of ALF, modified block classification and filtering are employed for the samples near horizontal CTU boundaries. For this purpose, a virtual boundary is defined as a line by shifting the horizontal CTU boundary with "N" samples as shown in FIG. 10 with N equal to 4 for the Luma component and 2 for the Chroma component.

Figure 10:
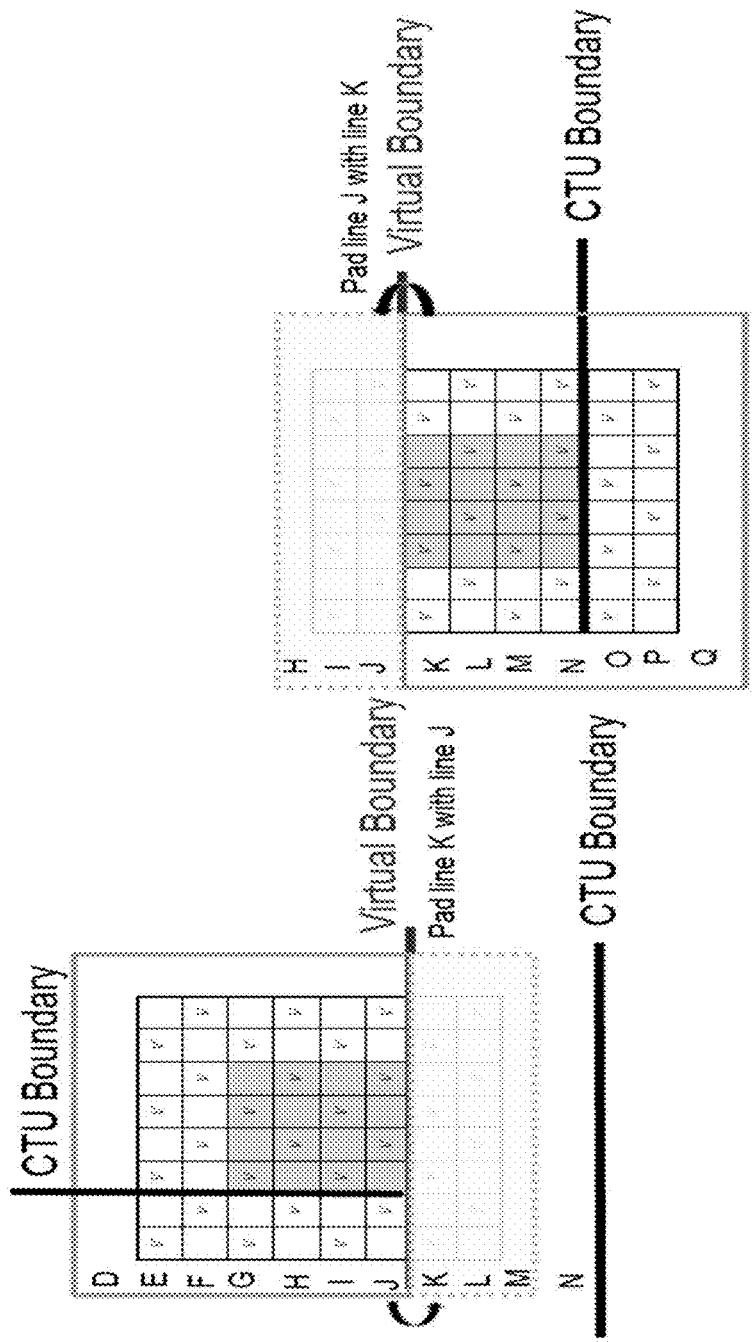
FIG. 10 shows an example of a modified block classification at virtual boundaries.

FIG. 10 shows an example of a modified block classification at virtual boundaries.

Figure 11:
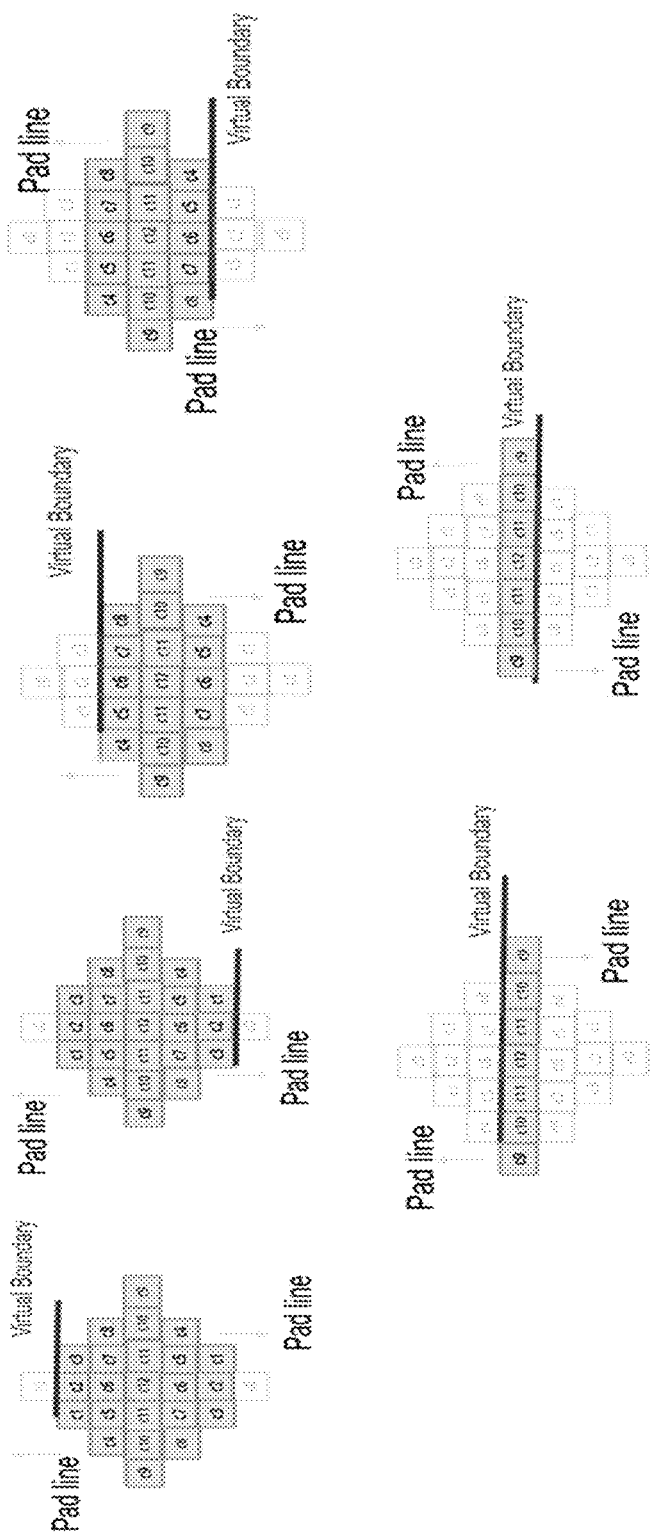
FIG. 11 is an example illustration of modified ALF filtering for Luma component at virtual boundaries.

Modified block classification is applied for the Luma component as depicted in FIG. 11 activity value A is accordingly scaled by taking into account the reduced number of samples used in 1D Laplacian gradient calculation.

For filtering processing, symmetric padding operation at the virtual boundaries are used for both Luma and Chroma components. As shown in FIG. 11, when the sample being filtered is located below the virtual boundary, the neighboring samples that are located above the virtual boundary are padded. Meanwhile, the corresponding samples at the other sides are also padded, symmetrically.

FIG. 11 shows examples of modified ALF filtering for Luma component at virtual boundaries.

2.9 Sample Adaptive Offset (SAO)

Sample adaptive offset (SAO) is applied to the reconstructed signal after the deblocking filter by using offsets specified for each CTB by the encoder. The HM encoder first makes the decision on whether or not the SAO process is to be applied for current slice. If SAO is applied for the slice, each CTB is classified as one of five SAO types as shown in Table 2-. The concept of SAO is to classify pixels into categories and reduces the distortion by adding an offset to pixels of each category. SAO operation includes Edge Offset (EO) which uses edge properties for pixel classification in SAO type 1-4 and Band Offset (BO) which uses pixel intensity for pixel classification in SAO type 5. Each applicable CTB has SAO parameters including sao_merge_left_flag, sao_merge_up_flag, SAO type and four offsets. If sao_merge_left_flag is equal to 1, the current CTB will reuse the SAO type and offsets of the CTB to the left. If sao_merge_up_flag is equal to 1, the current CTB will reuse SAO type and offsets of the CTB above.

TABLE 2-6

Specification of SAO type

| SAO type | sample adaptive offset type to be used | Number of categories |
| --- | --- | --- |
| 0 | None | 0 |
| 1 | 1-D 0-degree pattern edge offset | 4 |
| 2 | 1-D 90-degree pattern edge offset | 4 |
| 3 | 1-D 135-degree pattern edge offset | 4 |
| 4 | 1-D 45-degree pattern edge offset | 4 |
| 5 | band offset | 4 |

2.9.1 Operation of Each SAO Type

Figure 12:
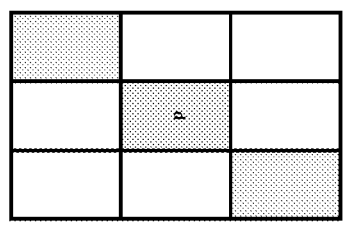
FIG. 12 shows examples of four 1-D 3-pixel patterns for the pixel classification in EO.
Figure 12:
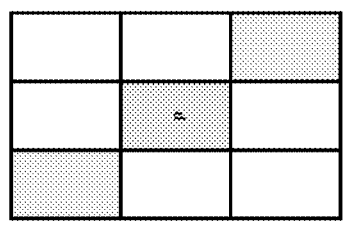
Figure 12:
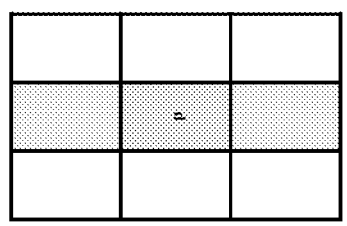
Figure 12:
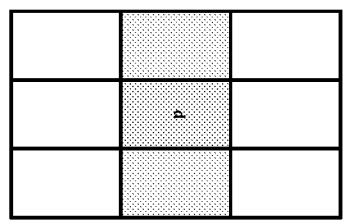

Edge offset uses four 1-D 3-pixel patterns for classification of the current pixel p by consideration of edge directional information, as shown in FIG. 12. From left to right these are: 0-degree, 90-degree, 135-degree and 45-degree.

FIG. 12 shows examples of four 1-D 3-pixel patterns for the pixel classification in EO.

Each CTB is classified into one of five categories according to Table 2-7.

TABLE 2-7

Pixel classification rule for EO

| Category | Condition | Meaning |
| --- | --- | --- |
| 0 | None of the below | Largely monotonic |
| 1 | p < 2 neighbours | Local minimum |
| 2 | p < 1 neighbour && p == 1 neighbour | Edge |
| 3 | p > 1 neighbour && p == 1 neighbour | Edge |
| 4 | p > 2 neighbours | Local maximum |

Figure 13:
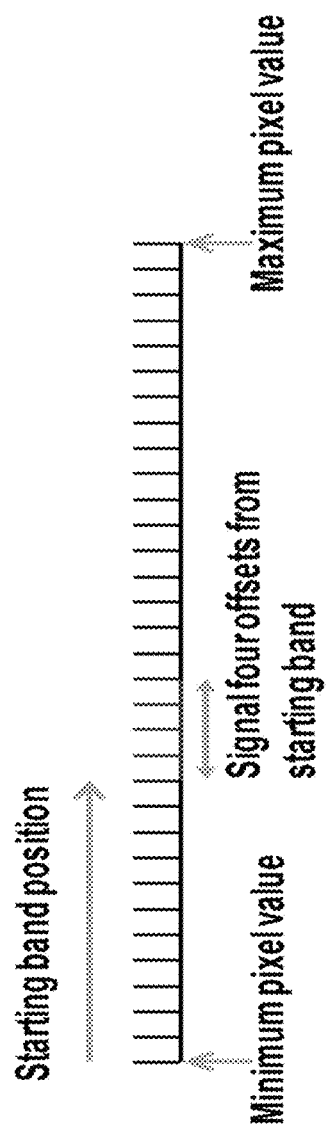
FIG. 13 four bands are grouped together and represented by its starting band position.

Band offset (BO) classifies all pixels in one CTB region into 32 uniform bands by using the five most significant bits of the pixel value as the band index. In other words, the pixel intensity range is divided into 32 equal segments from zero to the maximum intensity value (e.g. 255 for 8-bit pixels). Four adjacent bands are grouped together and each group is indicated by its most left-hand position as shown in FIG. 13. The encoder searches all position to get the group with the maximum distortion reduction by compensating offset of each band.

FIG. 13 shows an example of four bands are grouped together and represented by its starting band position 2.10 Combined Inter and Intra Prediction (CIIP)

In VTM5, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks (depicted in FIG. 14) as follows:

If the top neighbor is available and intra coded, then set isIntraTop to 1, otherwise set isIntraTop to 0;
If the left neighbor is available and intra coded, then set isIntraLeft to 1, otherwise set isIntraLeft to 0;
If (isIntraLeft+isIntraLeft) is equal to 2, then wt is set to 3;
Otherwise, if (isIntraLeft+isIntraLeft) is equal to 1, then wt is set to 2;
Otherwise, set wt to 1.

The CIIP prediction is formed as follows:

$$P_{CIIP}=((4-wt)*P_{inter}+wt*P_{intra}+2)>>2 \qquad (3\text{-}2)$$

Figure 14:
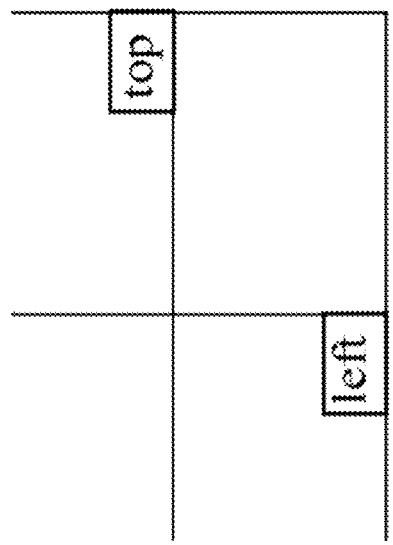
FIG. 14 top and left neighboring blocks used in CIIP weight derivation.

FIG. 14 shows examples of Top and left neighboring blocks used in CIIP weight derivation 2.11 Luma Mapping with Chroma Scaling (LMCS)

Figure 15:
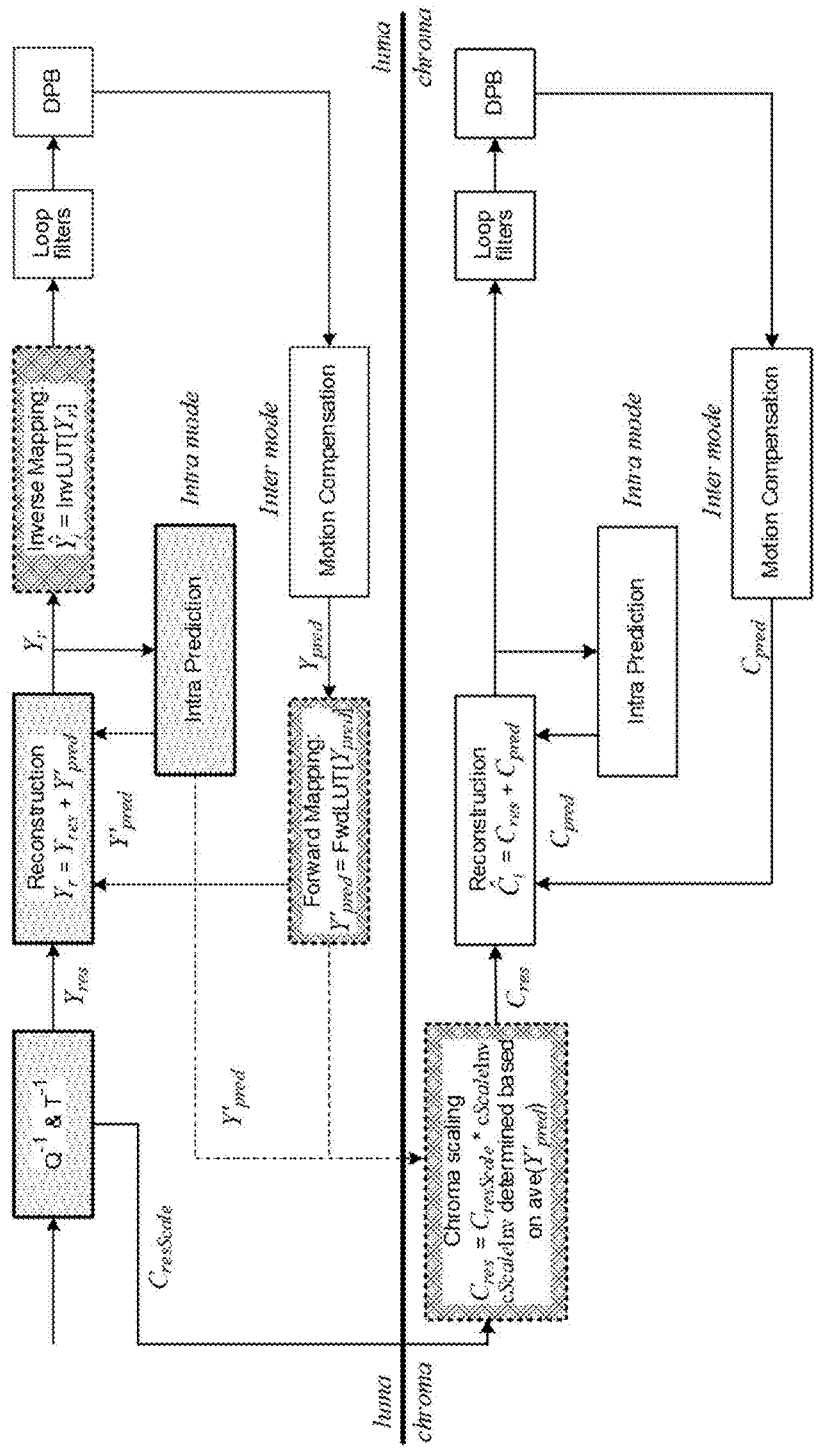
FIG. 15 Luma mapping with chroma scaling architecture.

In VTM5, a coding tool called the luma mapping with chroma scaling (LMCS) is added as a new processing block before the loop filters. LMCS has two main components: 1) in-loop mapping of the luma component based on adaptive piecewise linear models; 2) for the chroma components, luma-dependent chroma residual scaling is applied. FIG. 15 shows the LMCS architecture from decoder's perspective. The dotted blocks in FIG. 15 indicate where the processing is applied in the mapped domain; and these include the inverse quantization, inverse transform, luma intra prediction and adding of the luma prediction together with the luma residual. The unpatterned blocks in FIG. 15 indicate where the processing is applied in the original (i.e., non-mapped) domain; and these include loop filters such as deblocking, ALF, and SAO, motion compensated prediction, chroma intra prediction, adding of the chroma prediction together with the chroma residual, and storage of decoded pictures as reference pictures. The checkered blocks in FIG. 15 are the new LMCS functional blocks, including forward and inverse mapping of the luma signal and a luma-dependent chroma scaling process. Like most other tools in VVC, LMCS can be enabled/disabled at the sequence level using an SPS flag.

FIG. 15 shows examples of Luma mapping with chroma scaling architecture.

2.12 Dualtree Partitioning

In the current VVC design, for I slices, each CTU can be split into coding units with 64×64 luma samples using an implicit quadtree split and that these coding units are the root of two separate coding_tree syntax structure for luma and chroma.

Since the dual tree in intra picture allows to apply different partitioning in the chroma coding tree compared to the luma coding tree, the dual tree introduces longer coding pipeline and the QTBT MinQTSizeC value range and MinBtSizeY and MinTTSizeY in chroma tree allow small chroma blocks such as 2×2, 4×2, and 2×4. It provides difficulties in practical decoder design. Moreover, several prediction modes such as CCLM, planar and angular mode needs multiplication. In order to alleviate the above-mentioned issues, small chroma block sizes (2×2/2×4/4×2) are restricted in dual tree as a partitioning restriction.

2.13 Smallest Chroma Intra Prediction Unit (SCIPU) in JVET-O0050

Small chroma size is not friendly to hardware implementation. In dualtree cases, chroma blocks with too small sizes are disallowed. However, in singletree cases, VVC draft 5 still allows 2×2, 2×4, 4×2 chroma blocks. To restrict the size of chroma block, in single coding tree, a SCIPU is defined in JVET-O0050 as a coding tree node whose chroma block size is larger than or equal to TH chroma samples and has at least one child luma block smaller than 4TH luma samples, where TH is set to 16 in this contribution. It is required that in each SCIPU, all CBs are inter, or all CBs are non-inter, i.e, either intra or IBC. In case of a non-inter SCIPU, it is further required that chroma of the non-inter SCIPU shall not be further split and luma of the SCIPU is allowed to be further split. In this way, the smallest chroma intra CB size is 16 chroma samples, and 2×2, 2×4, and 4×2 chroma CBs are removed. In addition, chroma scaling is not applied in case of a non-inter SCIPU.

Figure 16:
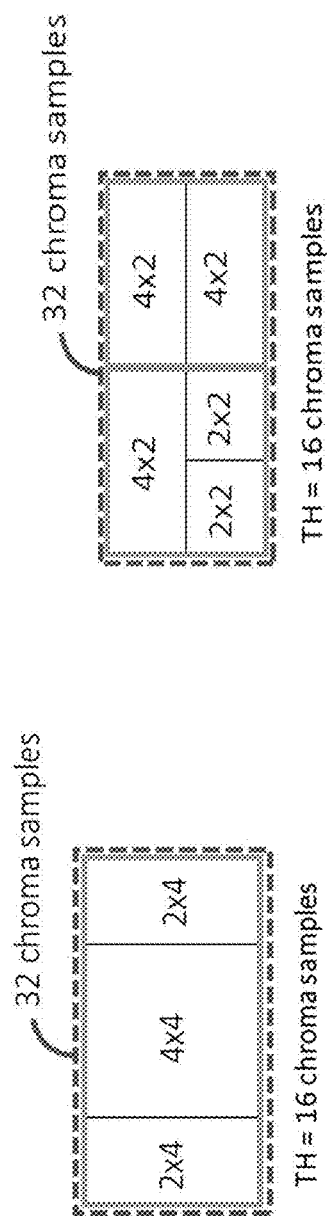
FIG. 16 shows examples of SCIPU.

Two SCIPU examples are shown in FIG. 16. In FIG. 16(a), one chroma CB of 8×4 chroma samples and three luma CBs (4×8, 8×8, 4×8 luma CBs) form one SCIPU because the ternary tree (TT) split from the 8×4 chroma samples would result in chroma CBs smaller than 16 chroma samples. In FIG. 16(b), one chroma CB of 4×4 chroma samples (the left side of the 8×4 chroma samples) and three luma CBs (8×4, 4×4, 4×4 luma CBs) form one SCIPU, and the other one chroma CB of 4×4 samples (the right side of the 8×4 chroma samples) and two luma CBs (8×4, 8×4 luma CBs) form one SCIPU because the binary tree (BT) split from the 4×4 chroma samples would result in chroma CBs smaller than 16 chroma samples.

FIG. 16 shows SCIPU examples.

The type of a SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one signalled flag before parsing the CUs in the SCIPU.

2.14 Small Chroma Block Constrains in VVC Draft 6

In VVC draft 6 (JVET-O2001-vE.docx), the constrains on small chroma blocks are implemented as follows (related part is marked in {{ }}). Boldface texts are enclosed in [[ ]].

|  | Descriptor |
|---|---|
| coding_tree( x0, y0, cbWidth, cbHeight, qgOnY, qgOnC, cbSubdiv, cqtDepth, mttDepth, depthOffset, partIdx, {{treeTypeCurr, modeTypeCurr}} ) { | |
| ... | |
| if( split_cu_flag ) { | |
| if( (allowSplitBtVer \|\| allowSplitBtHor \|\| allowSplitTtVer \|\| allowSplitTtHor) && allowSplitQT ) | |
| [[split_qt_flag]] | ae(v) |

```
if( !split_qt_flag) {
    if( ( allowSplitBtHor || allowSplitTtHor )&&
        ( allowSplitBtVer || allowSplitTtVer ) )
        [[mtt_split_cu_vertical_flag]]                                          ae(v)
    if( ( allowSplitBtVer && allowSplitTtVer && mtt_split_cu_verti cal flag ) ||
        ( allowSplitBtHor && allowSplitTtHor && !mtt_split_cu_vertical_flag ) )
        [[mtt_split_cu_binary_flag]]                                            ae(v)
    }
    {{if( modeTypeCondition == 1 )
        modeType = MODE_TYPE_INTRA
    else if( modeTypeCondition == 2 ) {
        mode_constraint_flag                                                    ae(v)
    modeType = mode_constraint_flag ? MODE_TYPE_INTRA : MODE_TYPE_IN
TER
    } else {
        modeType = modeTypeCurr
    }
    treeType = ( modeType= =
MODE)TYPE)INTRA ) ? DUAL)TREE_LUMA : treeTypeCurr}}
    if(! split_qt_flag ) {
        if( MttSplitMode[ x0 ][ y0 ][ mttDepth ] = = SPLIT_BT_VER ) {
            depthoffset += ( x0 + cbWidth > pic_width_in_luma_samples ) ? 1 : 0
            x1 = x0 + ( cbWidth / 2 )
            coding_tree( x0, y0, cbWidth / 2, cbHeight, qgOnY, qgOnC, cbSubdiv + 1,
                cqtDepth, mttDepth + 1, depthOffset, 0, treeType, modeType )
            if( x1 < pic_width_in_luma_samples)
                coding_tree( x1, y0, cbWidth / 2, cbHeightY, qgOnY, qgOnC, cbSubdiv + 1,
                    cqtDepth, mttDepth + 1, depthOffset, 1, treeType, modeType )
        } else if( MttSplitMode[ x0 ][ y0 ][ mttDepth ] = = SPLIT_BT_HOR) {
            depthOffset += (y0 + cbHeight > pic_height_in_luma_samples) ? 1 : 0
            y1 = y0 + ( cbHeight / 2 )
            coding_tree( x0, y0, cbWidth, cbHeight / 2, qgOnY, qgOnC, cbSubdiv + 1,
                cqtDepth, mttDepth + 1, depthOffset, 0, treeType, modeType )
            if( y1 < pic_height_in_luma_samples )
                coding_tree( x0, y1, cbWidth, cbHeight / 2, qgOnY, qgOnC, cbSubdiv + 1,
                    cqtDepth, mttDepth + 1, depthOffset, 1, treeType, modeType)
        } else if( MttSplitMode [ x0 ][ y0 ][ mttDepth ] = = SPLIT_TT_VER ) {
            x1 = x0 + ( cbWidth / 4 )
            x2 = x0 + ( 3 * cbWidth / 4 )
            qgOnY = qgOnY && ( cbSubdiv + 2 <= cu_qp_delta_subdiv )
            qgOnC = qgOnC && ( cbSubdiv + 2 <= cu_chroma_qp_offset_subdiv )
            coding_tree( x0, y0, cbWidth / 4, cbHeight, qgOnY, qgOnC, cbSubdiv + 2,
                cqtDepth, mttDepth + 1, depthOffset, 0, treeType, modeType )
            coding_tree( x1, y0, cbWidth / 2, cbHeight, qgOnY, qgOnC, cbSubdiv + 1,
                cqtDepth, mttDepth + 1, depthOffset, 1, treeType, modeType )
            coding_tree( x2, y0, cbWidth / 4, cbHeight, qgOnY, qgOnC, cbSubdiv + 2,
                cqtDepth, mttDepth + 1, depthOffset, 2, treeType, modeType )
        } else {/* SPLIT_TT_HOR */
            y1 = y0 + ( cbHeight / 4 )
            y2 = y0 + ( 3 * cbHeight / 4 )
            qgOnY = qgOnY && ( cbSubdiv + 2 <= cu_qp_delta_subdiv )
            qgOnC = qgOnC && ( cbSubdiv + 2 <= cu_chroma_qp_offset_subdiv)
            coding_tree( x0, y0, cbWidth, cbHeight / 4, qgOnY, qgOnC, cbSubdiv + 2,
                cqtDepth, mttDepth + 1, depthOffset, 0, treeType, modeType)
            coding_tree( x0, y1, cbWidth, cbHeight / 2, qgOnY, qgOnC, cbSubdiv + 1,
                cqtDepth, mttDepth + 1, depthOffset, 1, treeType, modeType)
            coding_tree( x0, y2, cbWidth, cbHeight / 4, qgOnY, qgOnC, cbSubdiv + 2,
                cqtDepth, mttDepth + 1, depthOffset, 2, treeType, modeType )
        }
    } else {
        x1 = x0 + ( cbWidth / 2 )
        y1 = y0 + ( cbHeight / 2 )
        coding_tree( x0, y0, cbWidth / 2, cbHeight / 2, qgOnY, qgOnC, cbSubdiv + 2,
            cqtDepth + 1, 0, 0, 0, treeType, modeType )
        if( x1 < pic_width_in_luma_samples )
            coding_tree( x1, y0, cbWidth / 2, cbHeight / 2, qgOnY, qgOnC,
cb Subdiv + 2,
                cqtDepth + 1, 0, 0, 1, treeType, modeType )
        if( y1 < pic_height_in_luma_samples )
            coding_tree( x0, y1, cbWidth / 2, cbHeight / 2, qgOnY, qgOnC,
cbSubdiv + 2,
                cqtDepth +1, 0, 0, 2, treeType, modeType )
        if( y 1 < pic_height_in_luma_samples && x1 < pic_width_in_luma_samples )
            coding_tree( x1, y1, cbWidth / 2, cbHeight / 2, qgOnY, qgOnC,
cbSubdiv + 2,
                cqtDepth +1, 0, 0, 3, treeType, modeType)
    }
```

-continued

```
{{if( modeTypeCur = = MODE_TYPE_ALL && modeType = =
MODE_TYPE_INTRA ) {
    coding_tree( x0, y0, cbWidth, cbHeight, qgOnY, qgOnC, cbSubdiv, cqtDepth,
mttDepth,0,0
            DUAL_TREE_CHROMA, modeType)
    }}}
} else
    coding_unit( x0, y0, cbWidth, cbHeight, cqtDepth, treeTypeCurr , modeTypeCurr
)
}
```

2.14.1.1 Coding Unit Syntax

|  | Descriptor |
|---|---|
| coding_unit( x0, y0, cbWidth, cbHeight, cqtDepth, treeType, modeType ) { <br>   chType = treeType = = DUAL_TREE_CHROMA? 1 : 0 <br>   if( slice_type != I \|\| sps_ibc_enabled_flag \|\| sps_palette_enabled_flag) { <br>     if( treeType != DUAL_TREE_CHROMA && <br>       !( ( ( cbWidth = = 4 && cbHeight = = 4 ) \|\| [[modeType = = MODE_TYPE_INTRA]] ) <br>       && !sps_ibc_enabled_flag ) ) <br>       [[cu_skip_flag]] [ x0 ][ y0 ] <br>     if( cu_skip_flag[ x0 ][ y0 ] = = 0 && slice_type != I <br>       && !( cbWidth = = 4 && cbHeight = = 4 ) [[&& modeType = = MODE_TYPE_ALL]] ) <br>       [[pred_mode_flag]] <br>     if( ( ( slice_type == I && cu_skip_flag[ x0 ][ y0 ] = =0 ) \|\| <br>       ( slice_type != I && ( CuPredMode[chType ][ x0 ][ y0 ] != MODE_INTRA \|\| <br>         ( cbWidth = = 4 && cbHeight = = 4 && cu_skip_flag[ x0 ][ y0 ] = = 0 ) ) ) ) && <br>       cbWidth <= 64 && cbHeight <= 64 && [[modeType != MODE_TYPE_INTER]] && <br>       sps_ibc_enabled_flag && treeType != DUAL_TREE_CHROMA ) <br>       [[pred_mode_ibc_flag]] <br>     if( ( ( ( slice_type = = I \|\| ( cbWidth = = 4 && cbHeight = = 4 ) \|\| sps_ibc_enabled_flag ) && <br>       CuPredMode[ x0 ][ y0 ] = = MODE_INTRA ) \|\| <br>       ( slice_type != I && !( cbWidth = = 4 && cbHeight = = 4 ) && !sps_ibc_enabled_flag <br>       && CuPredMode [ x0 ][ y0 ] != MODE_INTRA ) ) && !sps_palette_enabled_flag && <br>       cbWidth <= 64 && cbHeight <= 64 && && cu_skip_flag[ x0 ][y0 ] = = 0 && <br>       [[modeType != MODE_INTER]] ) <br>       [[pred_mode_plt_flag]] <br>   } <br> ... | <br><br><br><br><br>ae(v)<br><br><br><br>ae(v)<br><br><br><br><br><br>ae(v)<br><br><br><br><br><br>ae(v) |

{{The variable modeTypeCondition is derived as follows:

If one of the following conditions is true, modeTypeCondition is set equal to 0 slice_type==I and qtbtt_dual_tree_intra_flag is equal to 1 modeTypeCurr is not equal to MODE_TYPE_ALL

Otherwise, if one of the following conditions is true, modeTypeCondition is set equal to 1 cbWidth * cbHeight is equal to 64 and split_qt_flag is equal to 1 cbWidth * cbHeight is equal to 64 and MttSplitMode[x0][y0][mttDepth] is equal to SPLIT_TT_HOR or SPLIT_TT_VER cbWidth * cbHeight is equal to 32 and MttSplitMode[x0][y0][mttDepth] is equal to SPLIT_BT_HOR or SPLIT_BT_VER Otherwise, if one of the following conditions is true, modeTypeCondition is set equal to 1+(slice_type !=I ? 1:0)

cbWidth * cbHeight is equal to 64 and MttSplitMode[x0][y0][mttDepth] is equal to SPLIT_BT_HOR or SPLIT_BT_VER cbWidth * cbHeight is equal to 128 and MttSplitMode[x0][y0][mttDepth] is equal to SPLIT_TT_HOR or SPLIT_TT_VER Otherwise, modeTypeCondition is set equal to 0}}

Allowed Quad Split Process

Inputs to this process are:

a coding block size cbSize in luma samples, a multi-type tree depth mttDepth, a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed, {{a variable modeType specifying whether intra (MODE_INTRA), IBC (MODE_IBC), palette (MODE_PLT), and inter coding modes can be used (MODE_TYPE_ALL), or whether only intra, IBC, and palette coding modes can be used (MODE_TYPE_INTRA), or whether only inter coding modes can be used (MODE_TYPE_INTER) for coding units inside the coding tree node.}}

Output of this process is the variable allowSplitQt.

The variable allowSplitQt is derived as follows:

If one or more of the following conditions are true, allowSplitQt is set equal to FALSE:

treeType is equal to SINGLE_TREE or DUAL_TREE_LUMA and cbSize is less than or equal to MinQtSizeY treeType is equal to DUAL_TREE_CHROMA and
    cbSize/SubWidthC is less than or equal to MinQt-
    SizeC
mttDepth is not equal to 0
treeType is equal to DUAL_TREE_CHROMA and
    (cbSize/SubWidthC) is less than or equal to 4
{{treeType is equal to DUAL_TREE_CHROMA and
    modeType is equal to MODE_TYPE_INTRA}}
Otherwise, allowSplitQt is set equal to TRUE.
Allowed Binary Split Process
Inputs to this process are:
a binary split mode btSplit,
a coding block width cbWidth in luma samples,
a coding block height cbHeight in luma samples,
a location (x0, y0) of the top-left luma sample of the
    considered coding block relative to the top-left luma
    sample of the picture,
a multi-type tree depth mttDepth,
a maximum multi-type tree depth with offset maxMtt-
    Depth,
a maximum binary tree size maxBtSize,
a minimum quadtree size minQtSize,
a partition index partIdx,
a variable treeType specifying whether a single tree
    (SINGLE_TREE) or a dual tree is used to partition the
    CTUs and, when a dual tree is used, whether the luma
    (DUAL_TREE_LUMA) or chroma components (DU-
    AL_TREE_CHROMA) are currently processed,
{{a variable modeType specifying whether intra (MOD-
    E_INTRA), IBC (MODE_IBC), palette (MODE_PLT),
    and inter coding modes can be used (MOD-
    E_TYPE_ALL), or whether only intra, IBC, and palette
    coding modes can be used (MODE_TYPE_INTRA), or
    whether only inter coding modes can be used (MOD-
    E_TYPE INTER) for coding units inside the coding
    tree node. }}
Output of this process is the variable allowBtSplit.

TABLE 6-2

Specification of parallelTtSplit and cbSize based on btSplit.

| | [[btSplit = = SPLIT_BT_VER]] | [[btSplit = = SPLIT_BT_HOR]] |
|---|---|---|
| [parallelTtSplit]] | SPLIT_TT_VER | SPLIT_TT_HOR |
| [[cbSize]] | cbWidth | cbHeight |

The variables parallelTtSplit and cbSize are derived as
specified in Table 6-2.
  The variable allowBtSplit is derived as follows:
  If one or more of the following conditions are true,
      allowBtSplit is set equal to FALSE:
    cbSize is less than or equal to MinBtSizeY
    cbWidth is greater than maxBtSize
    cbHeight is greater than maxBtSize
    mttDepth is greater than or equal to maxMttDepth
    treeType is equal to DUAL_TREE_CHROMA and
        (cbWidth/SubWidthC) * (cbHeight/SubHeightC) is
        less than or equal to 16
    {{treeType is equal to DUAL_TREE_CHROMA and
        modeType is equal to MODE_TYPE_INTRA}}
  Otherwise, if all of the following conditions are true,
      allowBtSplit is set equal to FALSE
    btSplit is equal to SPLIT_BT_VER
    y0+cbHeight is greater than pic_height_jn_ju-
        ma_samples
  Otherwise, if all of the following conditions are true,
      allowBtSplit is set equal to FALSE
    btSplit is equal to SPLIT_BT_VER
    cbHeight is greater than MaxTbSizeY
    x0+cbWidth is greater than pic_width_in_ju-
        ma_samples
  Otherwise, if all of the following conditions are true,
      allowBtSplit is set equal to FALSE
    btSplit is equal to SPLIT_BT_HOR
    cbWidth is greater than MaxTbSizeY
    y0+cbHeight is greater than pic_height_in_ju-
        ma_samples
  Otherwise, if all of the following conditions are true,
      allowBtSplit is set equal to FALSE
    x0+cbWidth is greater than pic_width_in_lu-
        ma_samples
    y0+cbHeight is greater than pic_height_in_ju-
        ma_samples
    cbWidth is greater than minQtSize
  Otherwise, if all of the following conditions are true,
      allowBtSplit is set equal to FALSE
    btSplit is equal to SPLIT_BT_HOR
    x0+cbWidth is greater than pic_width_in_ju-
        ma_samples
    y0+cbHeight is less than or equal to pic_height_in_lu-
        ma_samples
  Otherwise, if all of the following conditions are true,
      allowBtSplit is set equal to FALSE:
    mttDepth is greater than 0
    partIdx is equal to 1
    MttSplitMode[x0][y0][mttDepth−1] is equal to paral-
        lelTtSplit
  Otherwise, if all of the following conditions are true,
      allowBtSplit is set equal to FALSE
    btSplit is equal to SPLIT_BT_VER
    cbWidth is less than or equal to MaxTbSizeY
    cbHeight is greater than MaxTbSizeY
  Otherwise, if all of the following conditions are true,
      allowBtSplit is set equal to FALSE
    btSplit is equal to SPLIT_BT_HOR
    cbWidth is greater than MaxTbSizeY
    cbHeight is less than or equal to MaxTbSizeY
  Otherwise, allowBtSplit is set equal to TRUE.
Allowed Ternary Split Process
Inputs to this process are:
a ternary split mode ttSplit,
a coding block width cbWidth in luma samples,
a coding block height cbHeight in luma samples,
a location (x0, y0) of the top-left luma sample of the
    considered coding block relative to the top-left luma
    sample of the picture,
a multi-type tree depth mttDepth
a maximum multi-type tree depth with offset maxMtt-
    Depth,
a maximum ternary tree size maxTtSize,
a variable treeType specifying whether a single tree
    (SINGLE_TREE) or a dual tree is used to partition the
    CTUs and, when a dual tree is used, whether the luma
    (DUAL_TREE_LUMA) or chroma components (DU-
    AL_TREE_CHROMA) are currently processed,
{{a variable modeType specifying whether intra (MOD-
    E_INTRA), IBC (MODE_IBC), palette (MODE_PLT),
    and inter coding modes can be used (MOD-
    E_TYPE_ALL), or whether only intra, IBC, and palette
    coding modes can be used (MODE_TYPE_INTRA), or whether only inter coding modes can be used (MODE_TYPE INTER) for coding units inside the coding tree node.}}
Output of this process is the variable allowTtSplit.

TABLE 6-3

Specification of cbSize based on ttSplit.

| | [[ttSplit = = SPLIT_TT_VER]] | [[ttSplit = = SPLIT_TT_HOR]] |
|---|---|---|
| [[cbSize]] | cbWidth | cbHeight |

The variable cbSize is derived as specified in Table 6-3. The variable allowTtSplit is derived as follows:
If one or more of the following conditions are true, allowTtSplit is set equal to FALSE:
 cbSize is less than or equal to 2 * MinTtSizeY
 cbWidth is greater than Min(MaxTbSizeY, maxTtSize)
 cbHeight is greater than Min(MaxTbSizeY, maxTtSize)
 mttDepth is greater than or equal to maxMttDepth
 x0+cbWidth is greater than pic_width_in_luma_samples
 y0+cbHeight is greater than pic_height_in_luma_samples
 treeType is equal to DUAL_TREE_CHROMA and (cbWidth/SubWidthC) * (cbHeight/SubHeightC) is less than or equal to 32
 {{treeType is equal to DUAL_TREE_CHROMA and modeType is equal to MODE_TYPE_INTRA)}}
Otherwise, allowTtSplit is set equal to TRUE.

[[pred_mode_flag]] equal to 0 specifies that the current coding unit is coded in inter prediction mode. pred_mode_flag equal to 1 specifies that the current coding unit is coded in intra prediction mode.
When pred_mode_flag is not present, it is inferred as follows:
 If cbWidth is equal to 4 and cbHeight is equal to 4, pred_mode_flag is inferred to be equal to 1.
 {{Otherwise, if modeType is equal to MODE_TYPE_INTRA, pred_mode_flag is inferred to be equal to 1.
 Otherwise, if modeType is equal to MODE_TYPE_INTER, pred_mode_flag is inferred to be equal to 0.}}
 Otherwise, pred_mode_flag is inferred to be equal to 1 when decoding an I slice, and equal to 0 when decoding a P or B slice, respectively.
The variable CuPredMode[chType][x][y] is derived as follows for x=x0 . . . x0+cbWidth−1 and y=y0 . . . y0+cbHeight−1:
 If pred_mode_flag is equal to 0, CuPredMode[chType][x][y] is set equal to MODE_INTER.
 Otherwise (pred_mode_flag is equal to 1), CuPredMode[chType][x][y] is set equal to MODE_INTRA.

[[pred_mode_ibc_flag]] equal to 1 specifies that the current coding unit is coded in IBC prediction mode. pred_mode_ibc_flag equal to 0 specifies that the current coding unit is not coded in IBC prediction mode.
When pred_mode_ibc_flag is not present, it is inferred as follows:
 If cu_skip_flag[x0][y0] is equal to 1, and cbWidth is equal to 4, and cbHeight is equal to 4, pred_mode_ibc_flag is inferred to be equal to 1.
 Otherwise, if both cbWidth and cbHeight are equal to 128, pred_mode_ibc_flag is inferred to be equal to 0.
 {{Otherwise, if modeType is equal to MODE_TYPE_INFER, pred_mode_ibc_flag is inferred to be equal to 0.
 Otherwise, if treeType is equal to DUAL_TREE_CHROMA, pred_mode_ibc_flag is inferred to be equal to 0.}}
 Otherwise, pred_mode_ibc_flag is infered to be equal to the value of sps_ibc_enabled_flag when decoding an I slice, and 0 when decoding a P or B slice, respectively.
When pred_mode_ibc_flag is equal to 1, the variable CuPredMode[chType][x][y] is set to be equal to MODE_IBC for x=x0 . . . x0+cbWidth−1 and y=y0 . . . y0+cbHeight−1.

3. Examples of Technical Problems Solved by Disclosed Technical Solutions

1. Currently IBC is considered as MODE_TYPE_INTRA and thus small chroma block is disallowed, which leads to unnecessary coding efficiency loss.
2. Currently palette is considered as MODE_TYPE_INTRA and thus small chroma block is disallowed, which leads to unnecessary coding efficiency loss.
3. Currently small chroma block constrains do not consider color subsampling format.
4. Currently same partition and prediction mode constraints on small blocks is applied to all chroma formats. However, it may be desirable to design different constraint mechanisms on small blocks in 4:2:0 and 4:2:2 chroma formats.
5. Currently the Palette mode flag signaling depends on the modeType, which is not desirable as palette may be not apply small block constraints.
6. Currently the IBC mode flag is inferred to be 0 for PB slice with cu_skip_flag equal to 1 but MODE_TYPE equal to MODE_TYPE_INTRA, this is illegal in the syntax parsing.
7. Currently, non-4×4 luma IBC mode is not allowed for SCIPU luma blocks, which may be not desirable and may cause coding efficiency loss.
8. 2×H chroma block is still allowed, which is not friendly to hardware implementation.
9. CIIP is considered as of MODE_INTER while it uses intra prediction, which breaks the constrains in some cases.
10. When SCIPU is applied, delta QP for chroma may be signaled depending on the luma splitting. For example, when the current block dimensions are 16×8 in luma samples and are split with vertical TT, a local dual tree may be applied. It is specified that qgOnC=qgOnC && (cbSubdiv+2<=cu_chroma_qp_offset_subdiv)
 So qgOnC is set to zero if cbSubdiv+2<=cu_chroma_qp_offset_subdiv. This conditional setting assumes that the chroma component is also split by TT. With the local dual tree, the chroma component may not be split, thus cbSubdiv may be larger than cu_chroma_qp_offset_subdiv. IsCuChromaQpOffsetCoded should be set to be 0 to allow signaling delta QP for chroma. However, IsCuChromaQpOffsetCoded is not set to be 0 because qgOnC is set to be 0.

4. Examples of Technical Solutions and Embodiments

The listing below should be considered as examples. These techniques should not be interpreted in a narrow way. Furthermore, these techniques can be combined in any manner.

In this document, "M×N coding tree node" indicates a M×N block, with M as the block width and N as the block height in luma samples, which may be further partitioned, such as by QT/BT/TT. For example, a block could be a QT node, or a BT node, or a TT node. A coding tree node could be a coding unit (e.g., with three color components for single tree, with two chroma color components for dual tree chroma coding, and only luma color component for dual tree luma coding), or a luma coding block, or a chroma coding block. A "small coding tree node unit" may indicate a coding tree node with block size M×N equal to 32/64/128 in luma samples.

If not specifically mentioned, the width W and height H for a coding block is measured in luma samples. For example, M×N coding block means a M×N luma block, and/or two (M/SubWidthC)×(N/SubHeightC) chroma blocks, where SubWidthC and SubHeightC are derived by chroma format as below.

| [[chroma_format_idc]] | [[separate_colour_plane_flag]] | [[Chroma format]] | [[Sub WidthC]] | [[Sub HeightC]] |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

1. Whether and/or how to partition into small blocks may depend on color formats.
   a. In one example, for 4:4:4 color format, the constrains on the sizes of chroma blocks may follow those constrains on luma blocks.
   b. In one example, for 4:2:2 color format, the constrains on the sizes of chroma blocks may follow those constrains for 4:2:0 color format.
   c. In one example, for 4:0:0, and/or 4:4:4 chroma format, the constraints on small block partitions and/or prediction modes may be not applied.
   d. In one example, the constraints on small block partitions and/or prediction modes may be applied differently for different chroma formats.
      i. In one example, for M×N (such as 8×8) coding tree node with horizontal BT split, in 4:2:2 chroma format, the horizontal BT split may be allowed for both chroma block and luma block, while in 4:2:0 chroma format, the horizontal BT split may be allowed for luma block but disabled for chroma block.
      ii. In one example, for M×N (such as 16×4) coding tree node with vertical BT split, in 4:2:2 chroma format, the vertical BT split may be allowed for both chroma block and luma block, while in 4:2:0 chroma format, the vertical BT split may be allowed for luma block but disabled for chroma block.
      iii. In one example, for M×N (such as 8×16) coding tree node with horizontal TT split, in 4:2:2 chroma format, the horizontal TT split may be allowed for both chroma block and luma block, while in 4:2:0 chroma format, the horizontal TT split may be allowed for luma block but disabled for chroma block.
      iv. In one example, for M×N (such as 32×4) coding tree node with vertical TT split, in 4:2:2 chroma format, the vertical TT split may be allowed for both chroma block and luma block, while in 4:2:0 chroma format, the vertical TT split may be allowed for luma block but disabled for chroma block.
      v. In one example, for 4:0:0, and/or 4:4:4 color formats, small block constraints may be not applied.
   e. In one example, whether to enable SCIPU is dependent on the color format.
      i. In one example, SCIPU is enabled for 4:2:0 and 4:2:2 color formats.
      ii. In one example, SCIPU is disabled for 4:0:0 and/or 4:4:4 color format.
         1. In one example, modeType may be always equal to MODE_TYPE_ALL for 4:0:0 and/or 4:4:4 color format.
         2. In one example, modeTypeCondition may be always equal to 0 for 4:0:0 and/or 4:4:4 color format.
2. How to determine the prediction modes (and/or modeType) for (sub-)blocks of a coding tree node may depend on chroma formats.
   a. In one example, if one of the below conditions is true, the modeType of (sub-)blocks partitioned by this coding tree node may be equal to MODE_TYPE_ALL for 4:2:2 chroma format, while for 4:2:0 chroma format, the modeType may be equal to either MODE_TYPE_INTRA or MODE_TYPE_INTER.
      i. M×N (such as 8×8) coding tree node with horizontal BT split
      ii. M×N (such as 16×4) coding tree node with vertical BT split
      iii. M×N (such as 8×16) coding tree node with horizontal TT split
      iv. M×N (such as 32×4) coding tree node with vertical TT split
3. It is proposed to rename MODE_TYPE_INTRA to MODE_TYPE_NO_INTER and restrict the usage of MODE_INTER.
   a. In one example, when modeType of a coding unit is equal to MODE_TYPE_NO_INTER, MODE_INTER may be disallowed.
4. It is proposed to rename MODE_TYPE_INTER to MODE_TYPE_NO_INTRA and restrict the usage of MODE_INTRA.
   a. In one example, when modeType of a coding unit is equal to MODE_TYPE_NO_INTRA, MODE_INTRA may be disallowed.
5. The mode constraint flag may be never signaled in 4:2:2 and/or 4:0:0 and/or 4:4:4 chroma formats.
   a. In one example, when mode constraint flag is not present, it may be inferred to equal to be 1.
      i. Alternatively, when mode constraint flag is not present, it may be inferred to equal to be 0.
6. Whether and/or how to apply SCIPU on an M×N coding block with M as the block width and N as the block height may depend on whether the color format is 4:2:0 or 4:2:2.
   a. In one example, in 4:2:2 color format, for an M×N coding block with M as the block width and N as the block height, SCIPU may be enabled only if M multiplied by N (denoted by M*N) is equal to 64 or 32.
   b. In one example, a coding tree node with M*N=128 may be never treated as SCIPU block in 4:2:2 color format.

c. In one example, a coding tree node with BT split and M*N=64 may be never treated as SCIPU block in 4:2:2 color format.
d. In one example, a coding tree node with split_qt_flag equal to 1 and M*N=64, may be an SCIPU block in 4:2:2 color format.
e. In one example, a coding tree node with TT split and M*N=64, may be treated as SCIPU block in 4:2:2 color format.
f. In one example, a coding tree node with BT split and M*N=32, may be treated as SCIPU block in 4:2:2 color format.
g. In above description, for an SCIPU block in 4:2:2 color format, the modeTypeCondition may be always equal to 1.
h. In above description, for an SCIPU block in 4:2:2 color format, only MODE_TYPE_INTRA may be allowed for both the current block in parent node and all sub-blocks under child leaf nodes.

7. In 4:2:2 color format, modeTypeCondition of an SCIPU block may be always equal to 1.
   a. In one example, modeTypeCondition may be equal to 0 or 1 for 4:2:2 color format.
   b. In one example, for SCIPU blocks in 4:2:2 color format, modeTypeCondition may be never equal to 2.

8. In 4:2:2 color format, modeType of an SCIPU block may be always equal to MODE_TYPE_INTRA.
   a. In one example, modeType may be equal to MODE_TYPE_ALL or MODE_TYPE_INTRA in 4:2:2 color format.
   b. In one example, for SCIPU blocks in 4:2:2 color format, MODE_TYPE_INTER may be disabled.

9. Whether the block partition is allowed or not may be dependent on the modeType, and/or the block size.
   a. In one example, whether BT and/or TT split is allowed for a block may be dependent on the modeType.
      i. In one example, if modeType is equal to MODE_TYPE_INTER, then BT split may be disallowed for the current coding block (e.g., allowBtSplit is set equal to false).
      ii. In one example, if modeType is equal to MODE_TYPE_INTER, then TT split may be disallowed for the current coding block (e.g., allowTtSplit is set equal to false).
   b. In one example, whether BT and/or TT split is allowed for a block may be dependent on the modeType and the block size.
      i. In one example, for an M×N coding block, with M as the block width and N as the block height, when M*N is less than or equal to 32 and modeType is equal to MODE_TYPE_INTER, the BT split may be disallowed (e.g., allowBtSplit is set equal to false).
      ii. In one example, for an M×N coding block, with M as the block width and N as the block height, when M*N is less than or equal to 64 and modeType is equal to MODE_TYPE_INTER, the TT split may be disallowed (e.g., allowTtSplit is set equal to false).

10. When modeTypeCurr of a coding tree is equal to MODE_TYPE_INTER, split of the coding tree may be restricted
    a. In one example, when modeTypeCurr of a coding tree is equal to MODE_TYPE_INTER, BT split may be disallowed.
    b. In one example, when modeTypeCurr of a coding tree is equal to MODE_TYPE_INTER, TT split may be disallowed.
    c. In one example, when modeTypeCurr of a coding tree is equal to MODE_TYPE_INTER, QT split may be disallowed.
    d. In one example, when modeTypeCurr of a coding tree is equal to MODE_TYPE_INTER and luma block size is less than or equal to 32, BT split may be disallowed.
    e. In one example, when modeTypeCurr of a coding tree is equal to MODE_TYPE_INTER and luma block size is less than or equal to 64, TT split may be disallowed.

11. A coding unit with treeType being DUAL_TREE_LUMA may be coded in inter mode.
    a. In one example, coding unit coded in inter coding mode, i.e. MODE_INTER may only contain luma component even for color formats with multiple color components.
    b. In one example, pred_mode_flag may need to be parsed for DUAL_TREE_LUMA block.
    c. In one example, for DUAL_TREE_LUMA block coded in inter mode, the same constrains of inter mode for SINGLE_TREE may be also applied.
       i. In one example, 4×4 DUAL_TREE_LUMA inter block may be disallowed.

12. Chroma intra (and/or IBC) blocks with block width equal to M (such as M=2) chroma samples may be not allowed.
    a. In one example, 2×N (such as N<=64) chroma intra blocks may be not allowed in dual tree.
       i. In one example, when treeType is equal to DUAL_TREE_CHROMA and the block width is equal to 4 chroma samples, vertical BT split may be disabled.
       ii. In one example, when treeType is equal to DUAL_TREE_CHROMA and the block width is equal to 8 chroma samples, vertical TT split may be disabled.
    b. In one example, 2×N (such as N<=64) chroma intra (and/or IBC) blocks may be not allowed in single tree.
       i. In one example, for M×N (such as M=8 and N<=64) coding tree node with vertical BT split, one of below process may be applied.
          1. Vertical BT split may be disallowed for the 4×N or 4×(N/2) chroma block but allowed for the 8×N luma block.
          2. The 4×N or 4×(N/2) chroma block may be not vertical BT split, and it may be coded by MODE_INTRA, or MODE_IBC.
          3. Vertical BT split may be allowed for both the 8×N luma block and the 4×N or 4×(N/2) chroma block, but both luma and chroma blocks not coded by MODE_INTRA (e.g., may be coded by MODE_INTER, or MODE_IBC).
       ii. In one example, for M×N (such as M=16 and N<=64) coding tree node with vertical TT split, one of below process may be applied.
          1. Vertical TT split may be disallowed for the 8×N or 8×(N/2) chroma block but allowed for the 16×N luma block.
          2. The 8×N or 8×(N/2) chroma block may be not vertical TT split and coded by MODE_INTRA, or MODE MC.
          3. Vertical TT split may be allowed for both the 16×N luma block and the 8×N or 8×(N/2) chroma block, but both luma and chroma blocks may be not coded by MODE_INTRA (e.g., may be coded by MODE_INTER, or MODE_IBC).

13. IBC mode may be allowed for luma and/or chroma blocks regardless of whether it is of small block size.

a. In one example, IBC mode may be allowed for luma blocks including 8×4/8×8/16×4 and 4×N (such as N<=64) luma blocks, even if modeType is equal to MODE_TYPE_INTRA.
b. In one example, IBC mode may be allowed for chroma blocks, even if modeType is equal to MODE_TYPE_INTRA.

14. The signaling of IBC prediction mode flag may depend on prediction mode type (e.g., MODE_TYPE_INTRA).
    a. In one example, IBC prediction mode flag for a non-SKIP block (e.g. a coding block which is not coded by skip mode) may be explicitly signaled in the bistream when the treeType is not equal to DUAL_TREE_CHROMA and the modeType is equal to MODE_TYPE_INTRA.

15. IBC prediction mode flag may be inferred depending on the CU SKIP flag and the mode type (e.g., modeType).
    a. In one example, if the current block is coded with SKIP mode (such as cu_skip_flag is equal to 1), and the modeType is equal to MODE_TYPE_INTRA, the IBC prediction mode flag (such as pred_mode_ibc_flag) may be inferred to be equal to 1.

16. The explicit signaling of Palette mode flag may not depend on the modeType.
    a. In one example, palette mode flag (such as pred_mode_plt_flag) signaling may depend on the slice_type, block size, prediction mode, etc., But no matter what the modeType is.
    b. In one example, palette mode flag (such as pred_mode_plt_flag) is inferred to be 0 when modeType is equal to MODE_TYPE_INTER or MODE_TYPE_INTRA.

17. IBC mode may be allowed to use when modeType is equal to MODE_TYPE_INTER
    a. In one example, chroma IBC may be disallowed when modeType is equal to MODE_TYPE_INTRA.
    b. In one example, IBC mode may be allowed to use when modeType is equal to MODE_TYPE_INTRA or MODE_TYPE_INTER.
    c. In one example, IBC mode may be allowed to use regardless what modeType is.
    d. In one example, within one SCIPU, IBC and inter mode may be both allowed.
    e. In one example, the size of IBC chroma block may always corresponds to the size of corresponding luma block.
    f. In one example, when modeType is equal to MODE_TYPE_INTER and coding unit size is 4×4 in luma, signaling of pred_mode_ibc_flag may be skipped and pred_mode_ibc_flag may be inferred to be equal to 1.

18. Palette mode may be allowed to use when modeType is MODE_TYPE_INTER
    a. In one example, chroma palette may be disallowed when modeType is MODE_TYPE_INTRA.
    b. In one example, IBC mode may be allowed to use when modeType is equal to MODE_TYPE_INTRA or MODE_TYPE_INTER.
    c. In one example, IBC mode may be allowed to use regardless what modeType is.
    d. In one example, palette mode may be allowed to use when modeType is equal to MODE_TYPE_INTRA or MODE_TYPE_INTER.
    e. In one example, palette mode may be allowed to use regardless what modeType is.
    f. In one example, within one SCIPU, palette and inter mode may be both allowed.
    g. In one example, within one SCIPU, palette, IBC and inter mode may be all allowed.
    h. In one example, the size of palette chroma block may always corresponds to the size of corresponding luma block.
    i. In one example, when modeType is equal to MODE_TYPE_INFER and coding unit size is 4×4 in luma, signaling of pred_mode_plt_flag may be skipped and pred_mode_plt_flag may be inferred to be equal to 1.
    j. In one example, when modeType is equal to MODE_TYPE_INTER and coding unit size is 4×4 in luma, one message may be sent to indicated if the current prediction mode is of IBC or palette.
    k. In one example, whether to enable/disable Palette mode may depend on slice types and modeType.
        i. In one example, for I slices with MODE_TYPE_INTRA, Palette mode may be enabled.
        ii. In one example, for PB slices with MODE_TYPE_INTER, Palette mode may be enabled.

19. When palette mode is enabled, local dualtree may be disallowed.
    a. In one example, when palette mode is enabled, modeTypeCondition may be always set equal to 0.

20. For small chroma blocks with width equal to M (e.g., M=2) or height equal to N (e.g., N=2), allowed intra prediction modes may be restricted to be different from those allowed for large chroma blocks.
    a. In one example, only a subset of intra prediction mode of available chroma intra prediction modes may be used.
    b. In one example, only INTRA_DC mode may be used.
    c. In one example, only INTRA PLANAR mode may be used.
    d. In one example, only INTRA_ANGULAR18 mode may be used.
    e. In one example, only INTRA_ANGULAR50 mode may be used.
    f. In one example, CCLM modes may be disallowed.

21. For small chroma blocks with width equal to M (e.g., M=2) or height equal to N (e.g., N=2), transform types may be restricted to be different from those allowed for large chroma blocks.
    a. In one example, only transform skip may be used.
    b. In one example, only one-dimensional transform may be used.
    c. In one example, coding tools that support multiple types of transforms are disallowed.
        i. Alternatively, the signaling of coding tools that support multiple types of transforms is omitted.

22. CIIP may be considered as MODE_TYPE_INTRA.
    a. In one example, CIIP mode may be allowed when dualtree partitioning is used.
        i. In one example, CUP mode may be allowed when CU type is of DUAL_TREE_CHROMA.
    b. Alternatively, CIIP may be considered as MODE_TYPE_INTER
        i. In one example, when chroma block width is equal to M (e.g., M=2), CIIP mode may be disallowed.
        ii. In one example, when chroma block width is equal to M (e.g., M=2), intra prediction modes for chroma in CIIP may be restricted to simple intra prediction mode.
            1. In one example, INTRA_DC may be used for chroma intra prediction, when chroma block width is equal to M (e.g., M=2).

2. In one example, INTRA_ANGULAR18 may be used for chroma intra prediction, when chroma block width is equal to M (e.g., M=2).
3. In one example, INTRA_ANGULAR50 may be used for chroma intra prediction, when chroma block width is equal to M (e.g., M=2).
    iii. In one example, intra prediction modes for chroma in CIIP may be restricted to simple intra prediction mode.
        1. In one example, INTRA_DC may be used for chroma intra prediction.
        2. In one example, INTRA_ANGULAR18 mode may be used for chroma intra prediction.
        3. In one example, INTRA_ANGULAR50 mode may be used for chroma intra prediction.
23. For above bullets, the variables M and/or N may be pre-defined or signaled.
    a. In one example, M and/or N may be further dependent on color formats (e.g., 4:2:0, 4:2:2, 4:4:4).
24. modeType may be extended to cover more types.
    a. In one example, modeType may be MODE_TYPE_IBC. When modeType is equal to MODE_TYPE_IBC, the prediction mode is inferred to be IBC.
        i. In one example, pred_mode_flag is not signaled in this case.
        ii. In one example, pred_mode_ibc_flag is not signaled in this case.
        iii. In one example, pred_mode_plt_flag is not signaled in this case.
    b. In one example, modeType may be MODE_TYPE_PALETTE. When modeType is equal to MODE_TYPE_PALETTE, the prediction mode is inferred to be Palette mode.
        i. In one example, pred_mode_flag is not signaled in this case.
        ii. In one example, pred_mode_ibc_flag is not signaled in this case.
        iii. In one example, pred_mode_plt_flag is not signaled in this case.
    c. In one example, [[mode_constraint_flag]] may be replaced by an index to tell which one of allowed modeTypes are used.
25. In one example, whether QT split is allowed for a block with dimensions W×H may depend on modeType combined with dimensions.
    a. For example, if modeType is equal to MODE_TYPE_INTER and W is equal to 8 and H is equal to 8, QT spit is disallowed.
26. In one example, whether vertical TT split is allowed for a block with dimensions W×H may depend on modeType combined with dimensions.
    a. For example, if modeType is equal to MODE_TYPE_INTER and W is equal to 16 and H is equal to 4, vertical TT spit is disallowed.
27. In one example, whether horizontal TT split is allowed for a block with dimensions W×H may depend on modeType combined with dimensions.
    a. For example, if modeType is equal to MODE_TYPE_INTER and W is equal to 4 and H is equal to 16, horizontal TT spit is disallowed.
28. In one example, whether vertical BT split is allowed for a block with dimensions W×H may depend on modeType combined with dimensions.
    a. For example, if modeType is equal to MODE_TYPE_INTER and W is equal to 8 and H is equal to 4, vertical BT spit is disallowed.
29. In one example, whether horizontal BT split is allowed for a block with dimensions W×H may depend on modeType combined with dimensions.
    a. For example, if modeType is equal to MODE_TYPE_INTER and W is equal to 4 and H is equal to 8, horizontal BT spit is disallowed.
30. In one example, whether the prediction mode of a CU is inferred by modeType may depend on color components and/or block dimensions W×H.
    a. For example, the prediction mode of a chroma CU is inferred by modeType; but the prediction mode of a luma CU is signaled instead of inferred by modeType.
        i. For example, the prediction mode of a luma CU is signaled instead of inferred by modeType if W>4 or H>4.
31. When SCIPU is applied, whether to and/or how to signal the information related to delta QP of a first component may depend on the splitting way of the first component.
    a. In one example, when SCIPU is applied, whether to and/or how to signal the information related to delta QP of a first component may depend on the splitting way of the first component and decoupled from the splitting way of a second component.
    b. In one example, the first component is luma and the second component is chroma.
    c. In one example, the first component is chroma and the second component is luma.
32. Any variable related to delta QP of a first component cannot be modified during the decoding or parsing process of a second component when dual tree and/or local dual tree coding structure is applied.
    a. In one example, the local dual tree coding structure may be used according to SCIPU.
    b. In one example, the first component is luma and the second component is chroma.
        i. The variable may be IsCuQpDeltaCoded.
    c. In one example, the first component is chroma and the second component is luma.
        i. The variable may be IsCuChromaQpOffsetCoded.
33. When SCIPU is applied, the information related to delta QP of a component (such as luma or chroma) may be signaled at most once in a specific region wherein the luma component and the chroma component are required to share the same mode type (such as MODE_TYPE_INTER or MODE_TYPE_INTRA).
    a. In one example, the specific region is a regarded as a quantization group.

5. Embodiments

Newly added parts are enclosed in {{ }}, and the deleted parts from VVC working draft are marked with double brackets (e.g., [[a]] denotes the deletion of the character "a"). The modifications are based on the latest VVC working draft (JVET-02001-v11)

5.1 An Example Embodiment #1

The embodiment below is about the constraints on small block partitions and prediction modes are applied to 4:2:0 and 4:4:4 chroma formats only (not apply to 4:0:0 and 4:4:4 chroma formats).

7.4.9.4 Coding Tree Semantics

The variable modeTypeCondition is derived as follows:

If one of the following conditions is true, modeTypeCondition is set equal to 0
  slice_type==I and qtbtt_dual_tree_intra_flag is equal to 1
  modeTypeCurr is not equal to MODE_TYPE_ALL
  {{chroma_format_idc is equal to 0
  chroma_format_idc is equal to 3}}
Otherwise, if one of the following conditions is true, modeTypeCondition is set equal to 1
  cbWidth * cbHeight is equal to 64 and split_qt_flag is equal to 1
  cbWidth * cbHeight is equal to 64 and MttSplitMode[x0][y0][mttDepth] is equal to SPLIT_TT_HOR or SPLIT_TT_VER
  cbWidth * cbHeight is equal to 32 and MttSplitMode[x0][y0][mttDepth] is equal to SPLIT_BT_HOR or SPLIT_BT_VER
Otherwise, if one of the following conditions is true, modeTypeCondition is set equal to 1+(slice_type !=I ? 1:0)
  cbWidth * cbHeight is equal to 64 and MttSplitMode[x0][y0][mttDepth] is equal to SPLIT_BT_HOR or SPLIT_BT_VER
  cbWidth * cbHeight is equal to 128 and MttSplitMode[x0][y0][mttDepth] is equal to SPLIT_TT_HOR or SPLIT_TT_VER
Otherwise, modeTypeCondition is set equal to 0

5.2 An Example Embodiment #2

The embodiment below is about the signaling of Palette mode flag not depend on the modeType.

7.3.8.5 Coding Unit Syntax 5.3 An Example Embodiment #3

The embodiment below is about the IBC prediction mode flag is inferred depending on the CU SKIP flag and the modeType.

[[pred_mode_ibc_flag]] equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred as follows:

If cu_skip_flag[x0][y0] is equal to 1, and cbWidth is equal to 4, and cbHeight is equal to 4, pred_mode_ibc_flag is inferred to be equal 1.

Otherwise, if both cbWidth and cbHeight are equal to 128, pred_mode_ibc_flag is inferred to be equal to 0.

{{Otherwise, if cu_skip_flag[x0][y0] is equal to 1, and modeType is equal to MODE_TYPE_INTRA, pred_mode_ibc_flag is inferred to be equal to 1.}}

Otherwise, if modeType is equal to MODE_TYPE_INTER, pred_mode_ibc_flag is inferred to be equal to 0.

Otherwise, if treeType is equal to DUAL_TREE_CHROMA, pred_mode_ibc_flag is inferred to be equal to 0.

Otherwise, pred_mode_ibc_flag is infered to be equal to the value of sps_ibc_enabled_flag when decoding an I slice, and 0 when decoding a P or B slice, respectively.

When pred_mode_ibc_flag is equal to 1, the variable CuPredMode[chType][x][y] is set to be equal to MODE_IBC for x=x0 . . . x0+cbWidth−1 and y=y0 . . . y0+cbHeight−1.

5.4 An Example Embodiment #4

The embodiment below is about the signaling of IBC prediction mode flag depend on MODE_TYPE_INTRA, and/or IBC mode is allowed for luma blocks regardless of whether it is small block size.

| | Descriptor |
|---|---|
| coding_unit( x0, y0, cbWidth, cbHeight, cqtDepth, treeType, modeType ) { | |
|   chType = treeType = = DUAL_TREE_CHROMA? 1 : 0 | |
|   if( slice_type != I \|\| sps_ibc_enabled_flag \|\| sps_palette_enabled_flag) { | |
|     if( treeType != DUAL_TREE_CHROMA && | |
|     ! ( ( ( cbWidth = = 4 && cbHeight = = 4 ) \|\| modeType = = MODE_TYPE_INTRA ) | |
|       && ! sps_ibc_enabled_flag ) ) | |
|     [[cu_skip_flag]][ x0 ][ y0 ] | ae(v) |
|     if( cu_skip_flag[ x0 ][ y0 ] = = 0 && slice_type != I | |
|     && !( cbWidth = = 4 && cbHeight = = 4 ) && modeType = = MODE_TYPE_ALL ) | |
|     [[pred_mode_flag]] | ae(v) |
|     if( ( ( slice_type = = I && cu_skip _flag[ x0 ][ y0 ] = = 0 ) \|\| | |
|      ( slice_type != I && ( CuPredMode[ chType ][ x0 ][ y0 ] != MODE_INTRA \|\| | |
|       ( cbWidth = = 4 && cbHeight = = 4 && cu_skip_flag[ x0 ][ y0 ] = = 0 ) ) ) ) && | |
|     cbWidth <= 64 && cbHeight <= 64 && modeType != MODE_TYPE_INTER && | |
|     sps_ibc_enabled_flag && treeType != DUAL_TREE_CHROMA ) | |
|     [[pred_mode_ibc_flag]] | ae(v) |
|     if( ( ( ( slice_type = = I \|\| ( cbWidth = = 4 && cbHeight = = 4 ) \|\| sps_ibc_enabled_flag ) && | |
|       CuPredMode[ x0 ][ y0 ] = = MODE_INTRA ) \|\| | |
|      ( slice_type != I && !( cbWidth = = 4 && cbHeight = = 4 ) && | |
| !sps_ibc_enabled_flag | |
|       && CuPredMode [ x0 ][ y0 ] != MODE_INTRA ) ) && sps_palette_enabled_flag | |
| && | |
|     cbWidth <= 64 && cbHeight <= 64 && && cu_skip_flag[ x0 ][ y0 ] = = 0 [[&& | |
|     modeType != MODE_INTER]] ) | |
|     [[pred_mode_plt_flag]] | ae(v) |

7.3.8.5 Coding Unit Syntax

|  | Descriptor |
|---|---|
| coding_unit( x0, y0, cbWidth, cbHeight, cqtDepth, treeType, modeType ) {<br>  chType = treeType = = DUAL_TREE_CHROMA? 1 : 0<br>  if( slice_type != I \|\| sps_ibc_enabled_flag \|\| sps_palette_enabled_flag) {<br>    if( treeType != DUAL_TREE_CHROMA &&<br>      !( ( ( cbWidth = = 4 && cbHeight = = 4 ) \|\| modeType = = MODE_TYPE_INTRA )<br>      && !sps_ibc_enabled_flag ) )<br>      [[cu_skip_flag]][ x0 ][ y0 ] | ae(v) |
|     if( cu_skip_flag[ x0 ][ y0 ] = = 0 && slice_type != I<br>      && !( cbWidth = = 4 && cbHeight = = 4 ) && modeType = = MODE_TYPE_ALL )<br>      [[pred_mode_flag]] | ae(v) |
|     if( ( ( slice_type = = I && cu_skip_flag[ x0 ][ y0 ] = =0 ) \|\|<br>      ( slice_type != I && ( CuPredMode[ chType ][ x0 ][ y0 ] != MODE_INTRA \|\|<br>        {{( modeType = = MODE_TYPE_INTRA && cu_skip_flag[ x0 ][ y0 ] == 0 ) }}\|\|<br>      ( cbWidth = = 4 && cbHeight = = 4 && cu_skip_flag[ x0 ][ y0 ]= = 0 ) ) ) ) &&<br>      cbWidth <= 64 && cbHeight <= 64 && modeType != MODE_TYPE_INTER &&<br>      sps_ibc_enabled_flag && treeType != DUAL_TREE_CHROMA )<br>      [[pred_mode_ibc_flag]] | ae(v) |

5.5 An Example Embodiment #5

The embodiment below is about applying different intra blocks constraints for 4:2:0 and 4:2:2 color formats.

7.4.9.4 Coding Tree Semantics

The variable modeTypeCondition is derived as follows:

If one of the following conditions is true, modeTypeCondition is set equal to 0
- slice_type==I and qtbtt_dual_tree_intra_flag is equal to 1
- modeTypeCurr is not equal to MODE_TYPE_ALL Otherwise, if one of the following conditions is true, modeTypeCondition is set equal to 1
- cbWidth * cbHeight is equal to 64 and split_qt_flag is equal to 1
- cbWidth * cbHeight is equal to 64 and MttSplitMode[x0][y0][mttDepth] is equal to SPLIT_TT_HOR or SPLIT_TT_VER
- cbWidth * cbHeight is equal to 32 and MttSplitMode[x0][y0][mttDepth] is equal to SPLIT_BT_HOR or SPLIT_BT_VER Otherwise, if one of the following conditions is true, modeTypeCondition is set equal to 1+(slice_type !=I ? 1:0)
- cbWidth * cbHeight is equal to 64 and MttSplitMode[x0][y0][mttDepth] is equal to SPLIT_BT_HOR or SPLIT_BT_VER {{and chroma_format_idc is equal to 1}}
- cbWidth * cbHeight is equal to 128 and MttSplitMode[x0][y0][mttDepth] is equal to SPLIT_TT_HOR or SPLIT_TT_VER {{and chroma_format_idc is equal to 1}}
- {{cbWidth is equal to 8 and cbHeight is equal to 8 and MttSplitMode[x0][y0][mttDepth] is equal to SPLIT_BT_VER and chroma_format_idc is equal to 2
- cbWidth is equal to 4 and cbHeight is equal to 16 and MttSplitMode[x0][y0][mttDepth] is equal to SPLIT_BT_HOR and chroma_format_idc is equal to 2
- cbWidth is equal to 16 and cbHeight is equal to 8 and MttSplitMode[x0][y0][mttDepth] is equal to SPLIT_TT_VER and chroma_format_idc is equal to 2
- cbWidth is equal to 4 and cbHeight is equal to 32 and MttSplitMode[x0][y0][mttDepth] is equal to SPLIT_TT_HOR and chroma_format_idc is equal to 2}}

Otherwise, modeTypeCondition is set equal to 0

5.6 An Example Embodiment #6

The embodiment below is about disallowing 2×N chroma intra blocks in single tree.

7.4.9.4 Coding Tree Semantics

The variable modeTypeCondition is derived as follows:

If one of the following conditions is true, modeTypeCondition is set equal to 0
- slice_type==I and qtbtt_dual_tree_intra_flag is equal to 1
- modeTypeCurr is not equal to MODE_TYPE_ALL Otherwise, if one of the following conditions is true, modeTypeCondition is set equal to 1
- cbWidth * cbHeight is equal to 64 and split_qt_flag is equal to 1
- cbWidth * cbHeight is equal to 64 and MttSplitMode[x0][y0][mttDepth] is equal to SPLIT_TT_HOR or SPLIT_TT_VER
- cbWidth * cbHeight is equal to 32 and MttSplitMode[x0][y0][mttDepth] is equal to SPLIT_BT_HOR or SPLIT_BT_VER Otherwise, if one of the following conditions is true, modeTypeCondition is set equal to 1+(slice_type !=I ? 1:0)
- cbWidth * cbHeight is equal to 64 and MttSplitMode[x0][y0][mttDepth] is equal to SPLIT_BT_HOR or SPLIT_BT_VER
- cbWidth * cbHeight is equal to 128 and MttSplitMode[x0][y0][mttDepth] is equal to SPLIT_TT_HOR or SPLIT_TT_VER
- {{cbWidth is equal to 8 and MttSplitMode[x0][y0][mttDepth] is equal to SPLIT_BT_VER
- cbWidth is equal to 16 and MttSplitMode[x0][y0][mttDepth] is equal to SPLIT_TT_VER}}

Otherwise, modeTypeCondition is set equal to 0

5.7 An Example Embodiment #7

The embodiment below is about disallowing 2×N chroma intra blocks in dual tree.

6.4.2 Allowed Binary Split Process

The variable allowBtSplit is derived as follows:

If one or more of the following conditions are true, allowBtSplit is set equal to FALSE:
- cbSize is less than or equal to MinBtSizeY
- cbWidth is greater than maxBtSize cbHeight is greater than maxBtSize
mttDepth is greater than or equal to maxMttDepth
treeType is equal to DUAL_TREE_CHROMA and (cbWidth/SubWidthC) * (cbHeight/SubHeightC) is less than or equal to 16
{{btSplit is equal to SPLIT_BT_VER and treeType is equal to DUAL_TREE_CHROMA and (cbWidth/SubWidthC) is less than or equal to 4}}
treeType is equal to DUAL_TREE_CHROMA and modeType is equal to MODE_TYPE_INTRA 6.4.3 Allowed Ternary Split Process The variable allowTtSplit is derived as follows:
If one or more of the following conditions are true, allowTtSplit is set equal to FALSE:
cbSize is less than or equal to 2 * MinTtSizeY
cbWidth is greater than Min(MaxTbSizeY, maxTtSize)
cbHeight is greater than Min(MaxTbSizeY, maxTtSize)
mttDepth is greater than or equal to maxMttDepth
x0+cbWidth is greater than pic_width_in_luma_samples
y0+cbHeight is greater than pic_height_in_luma_samples
treeType is equal to DUAL_TREE_CHROMA and (cbWidth/SubWidthC) * (cbHeight/SubHeightC) is less than or equal to 32
{{btSplit is equal to SPLIT_TT_VER and treeType is equal to DUAL_TREE_CHROMA and (cbWidth/SubWidthC) is less than or equal to 8}}
treeType is equal to DUAL_TREE_CHROMA and modeType is equal to MODE_TYPE_INTRA
Otherwise, allowTtSplit is set equal to TRUE.

5.8 An Example Embodiment #8

The embodiment below is about enabling MODE_IBC for SCIPU chroma blocks.

7.3.8.5 Coding Unit Syntax

|  | [[Descriptor]] |
|---|---|
| coding_unit( x0, y0, cbWidth, cbHeight, cqtDepth, treeType, modeType ) { | |
|   chType = treeType = = DUAL_TREE_CHROMA? 1 : 0 | |
|   if( slice_type != I \|\| sps_ibc_enabled_flag \|\| sps_palette_enabled_flag ) { | |
|     if( treeType != DUAL_TREE_CHROMA && | |
|       !( ( ( cbWidth = = 4 && cbHeight = = 4 ) \|\| modeType = = MODE_TYPE_INTRA ) | |
|       && !sps_ibc_enabled_flag ) ) | |
|       [[cu_skip_flag]][ x0 ][ y0 ] | ae(v) |
|     if( cu_skip_flag[ x0 ][ y0 ] = = 0 & &slice_type != I | |
|       && !( cbWidth = = 4 && cbHeight = = 4 ) && modeType = = MODE_TYPE_ALL ) | |
|       [[pred_mode flag]] | ae(v) |
|     if( ( ( slice_type = = I && cu_skip _flag[ x0 ][ y0 ] = =0 ) \|\| | |
|       ( slice_type !=!&&( CuPredMode[ chType ][ x0 ][ y0 ] != MODE_INTRA \|\| | |
|         {{( modeType = = MODE_TYPE_INTRA && cu_skip_flag[ x0 ][ y0 ] == 0 ) }}\|\| | |
|         ( cbWidth = = 4 && cbHeight = = 4 && cu skip flag[ x0 ][ y0 ] = = 0 ) ) ) && | |
|       cbWidth <= 64 && cbHeight <= 64 && modeType != MODE_TYPE_INTER && | |
|       sps_ibc_enabled_flag && {{!(modeType == MODE_TYPE_ALL && treeType = = DUAL_TREE_CHROMA)}} [[treeType != DUAL_TREE_CHROMA]]) | |
|       pred_mode_ibc_flag | ae(v) |

5.9 an Example Embodiment #9 on Disallowing Block Partition when modeType is MODE_TYPE_INTER (Solution 1)

6.4.2 Allowed binary split process

The variable allowBtSplit is derived as follows:
If one or more of the following conditions are true, allowBtSplit is set equal to FALSE:
cbSize is less than or equal to MinBtSizeY
cbWidth is greater than maxBtSize
cbHeight is greater than maxBtSize
mttDepth is greater than or equal to maxMttDepth
treeType is equal to DUAL_TREE_CHROMA and (cbWidth/SubWidthC) * (cbHeight/SubHeightC) is less than or equal to 16
{{modeType is equal to MODE_TYPE_INIER and and cbWidth* cbHeight is less than or equal to 32}}
treeType is equal to DUAL_TREE_CHROMA and modeType is equal to MODE_TYPE_INTRA 6.4.3 Allowed Ternary Split Process The variable allowTtSplit is derived as follows:
If one or more of the following conditions are true, allowTtSplit is set equal to FALSE:
cbSize is less than or equal to 2 * MinTtSizeY
cbWidth is greater than Min(MaxTbSizeY, maxTtSize)
cbHeight is greater than Min(MaxTbSizeY, maxTtSize)
mttDepth is greater than or equal to maxMttDepth
x0+cbWidth is greater than pic_width_in_luma_samples
y0+cbHeight is greater than pic_height_in_luma_samples
treeType is equal to DUAL_TREE_CHROMA and (cbWidth/SubWidthC) * (cbHeight/SubHeightC) is less than or equal to 32
{{modeType is equal to MODE_TYPE_INTER and and cbWidth* cbHeight is less than or equal to 64}}
treeType is equal to DUAL_TREE_CHROMA and modeType is equal to MODE_TYPE_INTRA
Otherwise, allowTtSplit is set equal to TRUE.

5.10 An Example Embodiment #10 on Disallowing Block Partition when modeType is MODE_TYPE_INTER (Solution 2)

6.4.2 Allowed Binary Split Process

The variable allowBtSplit is derived as follows:
If one or more of the following conditions are true, allowBtSplit is set equal to FALSE:
cbSize is less than or equal to MinBtSizeY
cbWidth is greater than maxBtSize
cbHeight is greater than maxBtSize
mttDepth is greater than or equal to maxMttDepth
treeType is equal to DUAL_TREE_CHROMA and (cbWidth/SubWidthC) * (cbHeight/SubHeightC) is less than or equal to 16
{{modeType is equal to MODE_TYPE_INTER}}
treeType is equal to DUAL_TREE_CHROMA and modeType is equal to MODE_TYPE_INTRA

6.4.3 Allowed Ternary Split Process

The variable allowTtSplit is derived as follows:

If one or more of the following conditions are true, allowTtSplit is set equal to FALSE:
- cbSize is less than or equal to 2 * MinTtSizeY
- cbWidth is greater than Min(MaxTbSizeY, maxTtSize)
- cbHeight is greater than Min(MaxTbSizeY, maxTtSize)
- mttDepth is greater than or equal to maxMttDepth
- x0+cbWidth is greater than pic_width_in_luma_samples
- y0+cbHeight is greater than pic_height_in_luma_samples
- treeType is equal to DUAL_TREE_CHROMA and (cbWidth/SubWidthC) * (cbHeight/SubHeightC) is less than or equal to 32
- {{modeType is equal to MODE_TYPE_INTER}}
- treeType is equal to DUAL_TREE_CHROMA and modeType is equal to MODE_TYPE_INTRA Otherwise, allowTtSplit is set equal to TRUE.

5.11 An Example Embodiment #11

The embodiment below is about the constraints further splitting of a coding tree when MODE_TYPE_INTER is derived.

7.3.8.4 Coding Tree Syntax

| | Descriptor |
|---|---|
| coding_tree( x0, y0, cbWidth, cbHeight, qgOnY, qgOnC, cbSubdiv, cqtDepth, mttDepth, depthOffset, partIdx, treeTypeCurr, modeTypeCurr ) { | |
| ... | |
|   treeType = ( modeType = = MODE_TYPE_INTRA ) ? DUAL_TREE_LUMA : treeTypeCurr | |
|   {{if ( modeType = = MODE_TYPE_INTER ) | |
|     mttDepth = max( mttDepth, maxMttDepth − 1 )}} | |
|   if( !split_qt_flag) { | |
| ... | |

5.12 An Example Embodiment #12

The embodiment below is about the constraints on small block partitions and prediction modes are not applied when palette mode is enabled.

7.4.9.4 Coding Tree Semantics

The variable modeTypeCondition is derived as follows:

If one of the following conditions is true, modeTypeCondition is set equal to 0
- slice_type==I and qtbtt_dual_tree_intra_flag is equal to 1
- modeTypeCurr is not equal to MODE_TYPE_ALL
- {{sps_palette_enabled_flag is equal to 1}}

Otherwise, if one of the following conditions is true, modeTypeCondition is set equal to 1
- cbWidth * cbHeight is equal to 64 and split_qt_flag is equal to 1
- cbWidth * cbHeight is equal to 64 and MttSplitMode[x0] [y0] [mttDepth] is equal to SPLIT_TT_HOR or SPLIT_TT_VER
- cbWidth * cbHeight is equal to 32 and MttSplitMode[x0] [y0] [mttDepth] is equal to SPLIT_BT_HOR or SPLIT_BT_VER Otherwise, if one of the following conditions is true, modeTypeCondition is set equal to 1+(slice_type !=I ? 1:0)
- cbWidth * cbHeight is equal to 64 and MttSplitMode[x0][y0] [mttDepth] is equal to SPLIT_BT_HOR or SPLIT_BT_VER
- cbWidth * cbHeight is equal to 128 and MttSplitMode[x0] [y0 ] [mttDepth] is equal to SPLIT_TT_HOR or SPLIT_TT_VER Otherwise, modeTypeCondition is set equal to 0

5.13 An Example Embodiment #13

The embodiment below is about the small chroma intra block constraints for 4:2:2 color formats.

7.4.9.4 Coding Tree Semantics

The variable modeTypeCondition is derived as follows:

If one of the following conditions is true, modeTypeCondition is set equal to 0
- slice_type==I and qtbtt_dual_tree_intra_flag is equal to 1
- modeTypeCurr is not equal to MODE_TYPE_ALL Otherwise, if one of the following conditions is true, modeTypeCondition is set equal to 1
- cbWidth * cbHeight is equal to 64 and split_qt_flag is equal to 1
- cbWidth * cbHeight is equal to 64 and MttSplitMode[x0] [y0][mttDepth] is equal to SPLIT_TT_HOR or SPLIT_TT_VER
- cbWidth * cbHeight is equal to 32 and MttSplitMode[x0][y0][mttDepth] is equal to SPLIT_BT_HOR or SPLIT_BT_VER Otherwise, if {{chroma_format_idc is equal to 1 and}}) one of the following conditions is true, modeTypeCondition is set equal to 1+(slice_type !=I ? 1:0)
- cbWidth * cbHeight is equal to 64 and MttSplitMode[x0][y0][mttDepth] is equal to SPLIT_BT_HOR or SPLIT_BT_VER
- cbWidth * cbHeight is equal to 128 and MttSplitMode[x0 ][y0][mttDepth] is equal to SPLIT_TT_HOR or SPLIT_TT_VER Otherwise, modeTypeCondition is set equal to 0

5.14 Example #1 of Delta QP Signaling in SCIPU

| | Descriptor |
|---|---|
| coding_tree( x0, y0, cbWidth, cbHeight, qgOnY, qgOnC, cbSubdiv, cqtDepth, mttDepth, depthOffset, | |
|     partIdx, treeTypeCurr, modeTypeCurr ) { | |
|   ( ( allowSplitBtVer \|\| allowSplitBtHor \|\| allowSplitTtVer \|\| allowSplitTtHor \|\| allowSplitQT ) | |
|     &&( x0 + cbWidth <= pic_width_in_luma_samples ) | |
|     && (y0 + cbHeight <= pic_height_in_luma_samples ) ) | |
|     [[split_cu_flag]] | ae(v) |
|   if( cu_qp_delta_enabled_flag && qgOnY && cbSubdiv <= cu_qp_delta_subdiv ) { | |
|     IsCuQpDeltaCoded = 0 | |
|     CuQpDeltaVal = 0 | |
|     CuQgTopLeftX = x0 | |
|     CuQgTopLeftY = y0 | |
|   } | |
|   if( cu_chroma_qp_offset_enabled_flag && qgOnC && | |
|     cbSubdiv <= cu_chroma_qp_offset_subdiv ) | |
|     IsCuChromaQpOffsetCoded = 0 | |
|   if( split_cu_flag ) { | |
|     if( ( allowSplitBtVer \|\| allowSplitBtHor \|\| allowSplitTtVer \|\| allowSplitTtHor ) && | |
|       allowSplitQT ) | |
|       [[split_qt_flag]] | ae(v) |
|     if( !split_qt_flag ) { | |
|       if( ( allowSplitBtHor \|\| allowSplitTtHor ) && | |
|         ( allowSplitBtVer \|\| allowSplitTtVer ) ) | |
|         [[mtt_split_cu_vertical_flag]] | ae(v) |
|       if( ( allowSplitBtVer && allowSplitTtVer && mtt_split_cu_vertical_flag ) \|\| | |
|         ( allowSplitBtHor && allowSplitTtHor && !mtt_split_cu_vertical_flag ) ) | |
|         [[mtt_split_cu_binary_flag]] | ae(v) |
|     } | |
|     if( modeTypeCondition = = 1 ) | |
|       modeType = MODE_TYPE_INTRA | |
|     else if( modeTypeCondition = = 2 ) { | |
|       [[mode_constraint_flag]] | ae(v) |
|       modeType = mode_constraint_flag ? MODE_TYPE_INTRA : MODE_TYPE_INTER | |
|     } else { | |
|       modeType = modeTypeCurr | |
|     } | |
|     treeType = ( modeType = = MODE_TYPE_INTRA ) ? DUAL_TREE_LUMA : treeTypeCur | |
|     if( !split_qt_flag ) { | |
|       if( MttSplitMode[ x0 ][ y0 ][ mttDepth ] = = SPLIT_BT_VER ) { | |
|         depthOffset += ( x0 + cbWidth > pic_=_width_in_luma_samples ) ? 1 : 0 | |
|         x1 = x0 + (cbWidth / 2 ) | |
|         coding_tree( x0, y0, cbWidth / 2, cbHeight, qgOnY, qgOnC, cbSubdiv + 1, | |
|           cqtDepth, mttDepth + 1, depthOffset, 0, treeType, modeType ) | |
|         if( x1 < pic_width_in_luma_samples ) | |
|           coding_tree( x1, y0, cbWidth / 2, cbHeightY, qgOnY, qgOnC, cbSubdiv + 1, | |
|             cqtDepth, mttDepth + 1, depthOffset, 1, treeType, modeType ) | |
|       } else if( MttSplitMode[ x0 ][ y0 ][ mttDepth ] = = SPLIT_BT_HOR ) { | |
|         depthOffset += ( y0 + cbHeight > pic_height_in_luma_samples ) ? 1 : 0 | |
|         y1 = y0 + ( cbHeight / 2) | |
|         coding_tree( x0, y0, cbWidth, cbHeight / 2, qgOnY, qgOnC, cbSubdiv + 1, | |
|           cqtDepth, mttDepth + 1, depthOffset, 0, treeType, modeType ) | |
|         if( y1 < pic_height_in_luma_samples ) | |
|           coding_tree( x0, y1, cbWidth, cbHeight / 2, qgOnY, qgOnC, cbSubdiv + 1, | |
|             cqtDepth, mttDepth + 1, depthOffset, 1, treeType, modeType ) | |
|       } else if( MttSplitMode[ x0 ][ y0 ][ mttDepth ] = = SPLIT_TT_VER ) { | |
|         x1 = x0 + ( cbWidth / 4 ) | |
|         x2 = x0 + ( 3 * cbWidth/4) | |
|         {{qgOnYnext}} = qgOnY && ( cbSubdiv + 2 <= cu_qp_delta_subdiv ) | |
|         {{qgOnCnext}} = qgOnC &&( cbSubdiv + 2 <= cu_chroma_qp_offset_subdiv ) | |
|         coding_tree( x0, y0, cbWidth / 4, cbHeight, {{qgOnYnext, qgOnCnext,}} cbSubdiv + 2, | |
|           cqtDepth, mttDepth + 1, depthOffset, 0, treeType, modeType ) | |
|         coding_tree( x1, y0, cbWidth / 2, cbHeight, {{qgOnYnext, qgOnCnext,}} cbSubdiv + 1, | |
|           cqtDepth, mttDepth + 1, depthOffset, 1, treeType, modeType ) | |
|         coding_tree( x2, y0, cbWidth / 4, cbHeight, {{qgOnYnext, qgOnCnext,}} cbSubdiv + 2, | |
|           cqtDepth, mttDepth + 1, depthOffset, 2, treeType, modeType ) | |
|       } else { /* SPLIT_TT_HOR */ | |
|         y1 = y0 + ( cbHeight / 4 ) | |
|         y2 = y0 + ( 3 * cbHeight / 4 ) | |
|         {{qgOnYnext}} = qgOnY && ( cbSubdiv + 2 <= cu_qp_delta_subdiv ) | |
|         {{qgOnCnext}} = qgOnC && ( cbSubdiv + 2 <= cu_chroma_qp_offset_subdiv ) | |
|         coding_tree( x0, y0, cbWidth, cbHeight / 4, {{qgOnYnext, qgOnCnext,}} cbSubdiv + 2, | |
|           cqtDepth, mttDepth + 1, depthOffset, 0, treeType, modeType ) | |
|         coding_tree( x0, y1, cbWidth, cbHeight / 2, {{qgOnYnext, qgOnCnext,}} cbSubdiv + 1, | |
|           cqtDepth, mttDepth + 1, depthOffset, 1, treeType, modeType ) | |

|  | Descriptor |
|---|---|
| ``` 
            coding_tree( x0, y2, cbWidth, cbHeight /4, {{qgOnYnext, qgOnCnext,}} cbSubdiv + 2,
                cqtDepth, mttDepth + 1, depthOffset, 2, treeType, modeType )
        }
    } else {
        x1 = x0 + ( cbWidth / 2 )
        y1 = y0 + ( cbHeight / 2 )
        coding_tree( x0, y0, cbWidth / 2, cbHeight / 2, qgOnY, qgOnC,
            cqtDepth + 1, 0, 0, 0, treeType, modeType )
        if( x1 < pic_width_in_luma_samples )
            coding_tree( x1, y0, cbWidth / 2, cbHeight / 2, qgOnY, qgOnC,
                cqtDepth + 1, 0, 0, 1, treeType, modeType )
        if( y1 < pic_height_in_luma_samples )
            coding_tree( x0, y1, cbWidth / 2, cbHeight / 2, qgOnY, qgOnC,
                cqtDepth + 1, 0,0, 2, treeType, modeType )
        if( y1 <pic_height_in_luma_samples && x1 < pic_width_in_luma_samples )
            coding_tree( x1, y1, cbWidth / 2, cbHeight / 2, qgOnY, qgOnC,
                cqtDepth + 1, 0, 0, 3, treeType, modeType )
    }
    if( modeTypeCur = = MODE_TYPE_ALL && modeType = = MODE_TYPE_INTRA ) {
        coding_tree( x0, y0, cbWidth, cbHeight, qgOnY, qgOnC, cbSubdiv, cqtDepth, mttDepth, 0, 0
            DUAL_TREE_CHROMA, modeType )
    }
} else
    coding_unit( x0, y0, cbWidth, cbHeight, cqtDepth, treeTypeCurr, modeTypeCurr )
}
``` | |

5.15 Example #2 of Delta QP Signaling in SCIPU

|  | [[Descriptor]] |
|---|---|
| ```
coding_tree( x0, y0, cbWidth, cbHeight, qgOnY, qgOnC, cbSubdiv, cqtDepth, mttDepth,
depthOffset,
                partIdx, treeTypeCurr, modeTypeCurr ) {
    if( ( allowSplitBtVer || allowSplitBtHor || allowSplitTtVer || allowSplitTtHor || allow-
SplitQT )
        &&( x0 + cbWidth <= pic_width_in_luma_samples )
        && (y0 + cbHeight <= pic_height_in_luma_samples ) )
        [[split_cu_flag]]
``` | ae(v) |
| ```
    if( cu_ap_delta_enabled_flag && qgOnY && cbSubdiv <= cu_qp_delta_subdiv ) {
        IsCuQpDeltaCoded = 0
        CuQpDeltaVal = 0
        CuQgTopLeftX = x0
        CuQgTopLeftY = y0
    }
    if( cu_chroma_qp_offset_enabled_flag && qgOnC &&
        cbSubdiv <= cu_chroma_qp_offset_subdiv )
        IsCuChromaQpOffsetCoded = 0
    if( split_cu_flag ) {
        if( ( allowSplitBtVer || allowSplitBtHor || allowSplitTtVer || allowSplitTtHor ) &&
            allowSplitQT )
            [[split_qt_flag]]
``` | ae(v) |
| ```
        if( !split_qt_flag ) {
            if( ( allowSplitBtHor || allowSplitTtHor ) &&
                ( allowSplitBtVer || allowSplitTtVer ) )
                [[mtt_split_cu_vertical_flag]]
``` | ae(v) |
| ```
            if( ( allowSplitBtVer && allowSplitTtVer && mtt_split_cu_vertical_flag ) ||
                ( allowSplitBtHor && allowSplitTtHor && !mtt_split_cu_vertical_flag ) )
                [[mtt_split_cu_binary_flag]]
``` | ae(v) |
| ```
        }
        if( modeTypeCondition = = 1 )
            modeType = MODE_TYPE_INTRA
        else if( modeTypeCondition = = 2 ) {
            [[mode_constraint_flag]]
``` | ae(v) |
| ```
            modeType = mode_constraint_flag ? MODE_TYPE_INTRA : MODE_TYPE_INTER
        } else {
            modeType = modeTypeCurr
        }
            treeType = ( modeType = = MODE_TYPE_INTRA ) ? DUAL_TREE_LUMA : tree-
TypeCurr
        if( !split_qt flag ) {
            if( MttSplitMode[ x0 ][ y0 ][ mttDepth] = = SPLIT_BT_VER ) {
                depthOffset += ( x0 + cbWidth > pic_width_in_luma_samples ) ? 1 : 0
                x1 = x0 + ( cbWidth / 2 )
                coding_tree( x0, y0, cbWidth / 2, cbHeight, qgOnY, qgOnC, cbSubdiv + 1,
                    cqtDepth, mttDepth + 1, depthOffset, 0, treeTypc, modeType )
``` | |

|   | [[Descriptor]] |
|---|---|
| ```
            if( x1 < pic_width_in_luma_samples )
                coding_tree( x1, y0, cbWidth/ 2, cbHeightY, qgOnY, qgOnC, cbSubdiv + 1,
                    cqtDepth, mttDepth + 1, depthOffset, 1, treeType, modeType )
        } else if( MttSplitMode[ x0 ][ y0 ][ mttDepth ] = = SPLIT_BT_HOR ) {
            depthOffset += ( y0 + cbHeight > pic_height_in_luma_samples ) ? 1 : 0
            y1 = y0 + ( cbHeight / 2 )
            coding_tree( x0, y0, cbWidth, cbHeight / 2, qgOnY, qgOnC, cbSubdiv + 1,
                cqtDepth, mttDepth + 1, depthOffset, 0, treeType, modeType )
            if( y1 < pic_height_in_luma_samples )
                coding_tree( x0, y1, cbWidth, cbHeight / 2, qgOnY, qgOnC, cbSubdiv + 1,
                    cqtDepth, mttDepth + 1, depthOffset, 1, treeType, modeType )
        } else if( MttSplitMode[ x0 ][ y0 ][ mttDepth ] = = SPLIT_TT_VER ) {
            x1 = x0 + ( cbWidth / 4 )
            x2 = x0 + ( 3 * cbWidth / 4)
            {{qgOnYnext}} = qgOnY && ( cbSubdiv + 2 <= cu_qp_delta_subdiv )
            {{qgOnCnext}} = qgOnC &&( cbSubdiv+ 2 <= cu_chroma_qp_offset_subdiv )
            coding_tree( x0, y0, cbWidth / 4, cbHeight, {{qgOnYnext, qgOnCnext,}} cbSub-
div + 2,
                cqtDepth, mttDepth + 1, depthOffset, 0, treeType, modeType )
            coding_tree( x1, y0, cbWidth / 2, cbHeight, {{qgOnYnext, qgOnCnext,}} cbSub-
div + 1,
                cqtDepth, mttDepth + 1, depthOffset, 1, treeType, modeType )
            coding_tree( x2, y0, cbWidth/4, cbHeight, {{qgOnYnext, qgOnCnext,}} cbSubdiv
+ 2,
                cqtDepth, mttDepth + 1, depthOffset, 2, treeType, modeType )
        } else {/* SPLIT_TT_HOR */
            y1 = y0 + ( cbHeight / 4 )
            y2 = y0 + ( 3 * cbHeight / 4 )
            {{qgOnYnext}} = qgOnY && ( cbSubdiv + 2 <= cu_qp_delta_subdiv )
            {{qgOnCnext}} = qgOnC && ( cbSubdiv + 2 <= cu_chroma_qp_offset_subdiv )
            coding_tree( x0, y0, cbWidth, cbHeight / 4, {{qgOnYnext, qgOnCnext,}} cbSub-
div + 2,
                cqtDepth, mttDepth + 1, depthOffset, 0, treeType, modeType )
            coding_tree( x0, y1, cbWidth, cbHeight / 2, {{qgOnYnext, qgOnCnext,}} cbSub-
div + 1,
                cqtDepth, mttDepth + 1, depthOffset, 1, treeType, modeType )
            coding_tree( x0, y2, cbWidth, cbHeight / 4, {{qgOnYnext, qgOnCnext,}} cbSub-
div + 2,
                cqtDepth, mttDepth + 1, depthOffset, 2, treeType, modeType )
        }
    } else {
        x1 = x0 + ( cbWidth / 2 )
        y1 = y0 + ( cbHeight / 2 )
        coding_tree( x0, y0, cbWidth / 2, cbHeight / 2, qgOnY, qgOnC, cbSubdiv + 2,
            cqtDepth + 1, 0, 0, 0, treeType, modeType )
        if( x1 < pic_width_in_luma_samples )
            coding_tree( x1, y0, cbWidth / 2, cbHeight / 2, qgOnY, qgOnC, cbSubdiv + 2,
                cqtDepth + 1, 0, 0, 1, treeType, modeType )
        if( y1 < pic_height_in_luma_samples )
            coding_tree( x0, y1, cbWidth / 2, cbHeight / 2, qgOnY, qgOnC, cbSubdiv + 2,
                cqtDepth + 1, 0,0, 2, treeType, modeType )
        if( y1 < pic_height_in_luma_samples && x1 < pic_width_in_luma_samples )
            coding_tree( x1, y1, cbWidth / 2, cbHeight / 2, qgOnY, qgOnC, cbSubdiv + 2,
                cqtDepth + 1, 0,0, 3, treeType, modeType )
    }
    if( modeTypeCur = = MODE_TYPE_ALL && modeType = = MODE_TYPE_IN-
TRA ) {
        coding_tree( x0, y0, cbWidth, cbHeight, qgOnY, 0, cbSubdiv, cqtDepth, mtt-
Depth, 0, 0
            DUAL_TREE_CHROMA, modeType )
    }
} else
    coding_unit( x0, y0, cbWidth, cbHeight, cqtDepth, treeTypeCurr , modeTypeCurr
)
}
``` |   |

5.16 Example #3 of Delta QP Signaling in SCIPU

|   | Descriptor |
|---|---|
| ```
coding_tree( x0, y0, cbWidth, cbHeight, qgOnY, qgOnC, cbSubdiv, cqtDepth, mttDepth, depthOffset,
             partIdx, treeTypeCurr, modeTypeCurr ) {
    if( ( allowSplitBtVer || allowSplitBtHor || allowSplitTtVer || allowSplitTtHor || allowSplitQT )
        &&( x0 + cbWidth <= pic_width_in_luma_samples )
        &&( y0 + cbHeight <= pic_height_in_luma_samples ) )
        [[split_cu_flag]]
``` | ae(v) |

```
{{if( cu_qp_delta_enabled_flag && qgOnY && cbSubdiv <= cu_qp_delta_subdiv &&
treeTypeCurr != DUAL_TREE_CHROMA ) { }}
        IsCuQpDeltaCoded = 0
        CuQpDeltaVal = 0
        CuQgTopLefX = x0
        CuQgTopLeftY = y0
    }
    if( cu_chroma_qp_offset_enabled_flag && qgOnC &&
        cbSubdiv <= cu_chroma_qp_offset_subdiv && {{&& treeTypeCurr !=
DUAL_TREE_LUMA}} )
        IsCuChromaQpOffsetCoded = 0
    if( split_cu_flag ) {
        if( ( allowSplitBtVer || allowSplitBtHor || allowSplitTtVer || allowSplitTtHor ) &&
            allowSplitQT )
            [[split_qt_flag]]                                                                    ae(v)
        if( !split_qt_flag ) {
            if( ( allowSplitBtHor || allowSplitTtHor ) &&
                ( allowSplitBtVer || allowSplitTtVer ) )
                [[mtt_split_cu_vertical_flag]]                                                   ae(v)
            if( ( allowSplitBtVer && allowSplitTtVer && mtt_split_cu_vertical_flag ) ||
                ( allowSplitBtHor && allowSplitTtHor && !mtt_split_cu_vertical_flag ) )
                [[mtt_split_cu_binary_flag]]                                                     ae(v)
        }
        if( modeTypeCondition = = 1 )
            modeType = MODE_TYPE_INTRA
        else if( modeTypeCondition = = 2 ) {
            [[mode_constiaint_flag]]                                                             ae(v)
            modeType = mode_constraint_flag ? MODE_TYPE_INTRA : MODE_TYPE_INTER
        } else {
            modeType = modeTypeCurr
        }
        treeType = ( modeType = = MODE_TYPE_INTRA ) ? DUAL_TREE_LUMA : treeTypeCurr
        if( !split_qt_flag ) {
            if( MttSplitMode[ x0 ][ y0 ][ mttDepth] == SPLIT_BT_VER ) {
                depthOffset += ( x0 + cbWidth > pic_width_in_luma_samples ) ? 1 : 0
                x1 = x0 + ( cbWidth / 2 )
                coding_tree( x0, y0, cbWidth / 2, cbHeight, qgOnY, qgOnC, cbSubdiv + 1,
                    cqtDepth, mttDepth + 1, depthOffset, 0, treeType, modeType )
                if( x1 < pic_width_in_luma_samples )
                    coding_tree( x1, y0, cbWidth / 2, cbHeightY, qgOnY, qgOnC, cbSubdiv + 1,
                        cqtDepth, mttDepth + 1, depthOffset, 1, treeType, modeType )
            } else if( MttSplitMode[ x0 ][ y0 ][ mttDepth ] = = SPLIT_BT_HOR ) {
                depthOffset += ( y0 + cbHeight > pic_height_in_luma_samples ) ? 1 : 0
                y1 = y0 + ( cbHeight / 2 )
                coding_tree( x0, y0, cbWidth, cbHeight / 2, qgOnY, qgOnC, cbSubdiv + 1,
                    cqtDepth, mttDepth + 1, depthOffset, 0, treeType, modeType )
                if( y1 < pic_height_in_luma_samples )
                    coding_tree( x0, y1, cbWidth, cbHeight / 2, qgOnY, qgOnC , cbSubdiv + 1,
                        cqtDepth, mttDepth + 1, depthOffset, 1, treeType, modeType )
            } else if( MtSplitMode[ x0 ][ y0 ][ mttDepth ] = = SPLIT_TT_VER ) {
                x1 = x0 + ( cbWidth / 4 )
                x2 = x0 + ( 3 * cbWidth / 4 )
                {{qgOnYnext}} = qgOnY && ( cbSubdiv + 2 <= cu_qp_delta_subdiv )
                {{qgOnCnext}} = qgOnC && ( cbSubdiv + 2 <= cu_chroma_qp_offset_subdiv )
                coding_tree( x0, y0, cbWidth / 4, cbHeight, {{qgOnYnext, qgOnCnext,}} cbSubdiv + 2,
                    cqtDepth, mttDepth + 1, depthOffset, 0, treeType, modeType )
                coding_tree( x1, y0, cbWidth/ 2, cbHeight, {{qgOnYnext, qgOnCnext,}} cbSubdiv + 1,
                    cqtDepth, mttDepth + 1, depthOffset, 1, treeType, modeType )
                coding_tree( x2, y0, cbWidth / 4, cbHeight, {{qgOnYnext, qgOnCnext,}} cbSubdiv + 2,
                    cqtDepth, mttDepth + 1, depthOffset, 2, treeType, modeType )
            } else {/* SPLIT_TT_HOR */
                y1 = y0 + ( cbHeight / 4 )
                y2 = y0 + ( 3 * cbHeight / 4 )
                {{qgOnYnext}} = qgOnY && ( cbSubdiv + 2 <= cu_qp_delta_subdiv )
                {{qgOnCnext}} = qgOnC && ( cbSubdiv + 2 <= cu_chroma_qp_offset_subdiv )
                coding_tree( x0, y0, cbWidth, cbHeight / 4, {{qgOnYnext, qgOnCnext,}} cbSubdiv + 2,
                    cqtDepth, mttDepth + 1, depthOffset, 0, treeType, modeType )
                coding_tree( x0, y1, cbWidth, cbHeight / 2, {{qgOnYnext, qgOnCnext,}} cbSubdiv + 1,
                    cqtDepth, mttDepth + 1, depthOffset, 1, treeType, modeType )
                coding_tree( x0, y2, cbWidth, cbHeight / 4, {{qgOnYnext, qgOnCnext,}} cbSubdiv + 2,
                    cqtDepth, mttDepth + 1, depthOffset, 2, treeType, modeType )
            }
        } else {
            x1 = x0 + ( cbWidth / 2 )
            y1 = y0 + ( cbHeight / 2 )
            coding_tree( x0, y0, cbWidth / 2, cbHeight / 2, qgOnY, qgOnC, cbSubdiv + 2,
                cqtDepth + 1, 0, 0, 0, treeType, modeType )
```

```
            if( x1 < pic_width_in_luma_samples )
                coding_tree( x1, y0, cbWidth / 2, cbHeight / 2, qgOnY, qgOnC, cbSubdiv + 2,
                    cqtDepth + 1,0,0,1, treeType, modeType )
            if( y1 < pic_height_in_luma_samples )
                coding_tree( x0, y 1, cbWidth / 2, cbHeight / 2, qgOnY, qgOnC, cbSubdiv + 2,
                    cqtDepth + 1, 0,0, 2, treeType, modeType )
            if( y1 < pic_height_in_luma_samples && x1 < pic_width_in_luma_samples )
                coding_tree( x1, y1, cbWidth / 2, cbHeight / 2, qgOnY, qgOnC, cbSubdiv + 2,
                    cqtDepth + 1, 0,0, 3, treeType, modeType )
            }
            if( modeTypeCur = = MODE_TYPE_ALL && modeType = = MODE_TYPE_INTRA ) {
                coding_tree( x0, y0, cbWidth, cbHeight, qgOnY, 0, cbSubdiv, cqtDepth, mttDepth, 0, 0
                    DUAL_TREE_CHROMA, modeType )
            }
        } else
            coding_unit( x0, y0, cb Width, cbHeight, cqtDepth, treeTypeCurr, modeTypeCurr )
}
```

5.17 Example #4 of Delta QP Signaling in SCIPU

|  | Descriptor |
|---|---|
| coding_tree( x0, y0, cbWidth, cbHeight, qgOnY, qgOnC, cbSubdiv, cqtDepth, mttDepth, depthOffset,<br>        partIdx, treeTypeCurr, modeTypeCurr ) {<br>  if( ( allowSplitBtVer \|\| allowSplitBtHor \|\| allowSplitTtVer \|\| allowSplitTtHor \|\| allowSplitQT )<br>    &&( x0 + cbWidth <= pic_width_in_luma_samples )<br>    && (y0 + cbHeight <= pic_height_in_luma_samples ) )<br>    [[split_cu_flag]] | ae(v) |
|   if( cu_qp_delta_enabled_flag && qgOnY && cbSubdiv <= cu_qp_delta_subdiv ) {<br>    IsCuQpDeltaCoded = 0<br>    CuQpDeltaVal = 0<br>    CuQgTopLeftX = x0<br>    CuQgTopLeftY = y0<br>  }<br>  if( cu_chroma_qp_offset_enabled_flag && qgOnC &&<br>    cbSubdiv <= cu_chroma_qp_offset_subdiv )<br>    IsCuChromaQpOffsetCoded = 0<br>  if( split_cu_flag ) {<br>    if( ( allowSplitBtVer \|\| allowSplitBtHor \|\| allowSplitTtVer \|\| allowSplitTtHor ) &&<br>      allowSplitQT )<br>    [[split_qt_flag]] | ae(v) |
|   if( !split_qt_flag ) {<br>    if ( ( allowSplitBtHor \|\| allowSplitTtHor ) &&<br>      ( allowSplitBtVer \|\| allowSplitTtVer ) )<br>    [[mtt_split_cu_vertical_flag]] | ae(v) |
|     if( ( allowSplitBtVer && allowSplitTtVer && mtt_split_cu_vertical_flag ) \|\|<br>      ( allowSplitBtHor && allowSplitTtHor && !mtt_split_cu_vertical_flag ) )<br>    [[mtt_split_cu_binary_flag]] | ae(v) |
|   }<br>  if( modeTypeCondition = = 1 )<br>    modeType = MODE_TYPE_INTRA<br>  else if( modeTypeCondition = = 2 ) {<br>    [[mode_constraint_flag]]<br>    modeType = mode_constraint_flag ? MODE_TYPE_INTRA : MODE_TYPE_INTER | ae(v) |
|   } else {<br>    modeType = modeTypeCurr<br>  }<br>    {{if( modeTypeCondition > 0 )}}<br>        {{qgOnY = qgOnC = 0}}<br>    treeType = ( modeType = = MODE_TYPE_INTRA ) ? DUAL_TREE_LUMA : treeTypeCurr<br>    if( !split_qt_flag ) {<br>      if( MttSplitMode[ x0 ][ y0 ][ mttDepth ] = = SPLIT_BT_VER ) {<br>        depthOffset += ( x0 + cbWidth > pic_width_in_luma_samples ) ? 1 : 0<br>        x1 = x0 + ( cbWidth / 2 )<br>        coding_tree( x0, y0, cbWidth / 2, cbHeight, qgOnY, qgOnC, cbSubdiv + 1,<br>          cqtDepth, mttDepth + 1, depthOffset, 0, treeType, modeType )<br>        if( x1 < pic_width_in_luma_samples )<br>          coding_tree( x1, y0, cbWidth / 2, cbHeightY, qgOnY, qgOnC, cbSubdiv + 1,<br>            cqtDepth, mttDepth + 1, depthOffset, 1, treeType, modeType )<br>      } else if( MttSplitMode[ x0 ][ y0 ][ mttDepth ] = = SPLIT_BT_HOR ) {<br>        depthOffset += ( y0 + cbHeight > pic_height_in_luma_samples ) ? 1 : 0<br>        y1 = y0 + ( cbHeight / 2 )<br>        coding_tree( x0, y0, cbWidth, cbHeight / 2, qgOnY, qgOnC, cbSubdiv + 1,<br>          cqtDepth, mttDepth + 1, depthOffset, 0, treeType, modeType )<br>        if( y1 < pic_height_in_luma_samples ) |  |

```
            coding_tree( x0, y1, cbWidth, cbHeight / 2, qgOnY, qgOnC, cbSubdiv + 1,
                cqtDepth, mttDepth + 1, depthOffset, 1, treeType, modeType )
        } else if( MttSplitMode[ x0 ][ y0 ][ mttDepth ] = = SPLIT_TT_VER ) {
            x1 = x0 + ( cbWidth / 4 )
            x2 = x0 + ( 3 * cbWidth / 4 )
            qgOnY = qgOnY && ( cbSubdiv + 2 <= cu_qp_delta_subdiv )
            qgOnC = qgOnC && ( cbSubdiv + 2 <= cu_chroma_qp_offset_subdiv )
            coding_tree( x0, y0, cbWidth / 4, cbHeight, qgOnY, qgOnC, cbSubdiv + 2,
                cqtDepth, mttDepth + 1, depthOffset, 0, treeType, modeType )
            coding_tree( x1, y0, cbWidth / 2, cbHeight, qgOnY, qgOnC, cbSubdiv + 1,
                cqtDepth, mttDepth + 1, depthOffset, 1, treeType, modeType )
            coding_tree( x2, y0, cbWidth / 4, cbHeight, qgOnY, qgOnC, cbSubdiv + 2,
                cqtDepth, mttDepth + 1, depthOffset, 2, treeType, modeType )
        } else {/* SPLIT _TT _HOR */
            y1 = y0 + ( cbHeight / 4 )
            y2 = y0 + ( 3 * cbHeight / 4 )
            qgOnY = qgOnY && ( cbSubdiv + 2 <= cu_qp_delta_subdiv )
            qgOnC = qgOnC && ( cbSubdiv + 2 <= cu_chroma_qp_offset_subdiv )
            coding_tree( x0, y0, cbWidth, cbHeight / 4, qgOnY, qgOnC, cbSubdiv + 2,
                cqtDepth, mttDepth + 1, depthOffset, 0, treeType, modeType )
            coding_tree( x0, y 1, cbWidth, cbHeight / 2, qgOnY, qgOnC, cbSubdiv + 1,
                cqtDepth, mttDepth + 1, depthOffset, 1, treeType, modeType )
            coding_tree( x0, y2, cbWidth, cbHeight / 4, qgOnY, qgOnC, cbSubdiv + 2,
                cqtDepth, mttDepth + 1, depthOffset, 2, treeType, modeType )
        }
    } else {
        x1 = x0 + ( cbWidth / 2 )
        y1 = y0 + ( cbHeight / 2 )
        coding_tree( x0, y0, cbWidth / 2, cbHeight / 2, qgOnY, qgOnC, cbSubdiv + 2,
            cqtDepth + 1, 0, 0, 0, treeType, modeType )
        if( x1 < pic_width_in_luma_samples )
            coding_tree( x1, y0, cbWidth / 2, cbHeight / 2, qgOnY, qgOnC, cbSubdiv + 2,
                cqtDepth + 1, 0, 0, 1, treeType, modeType )
        if( y1 < pic_height_in_luma_samples )
            coding_tree( x0, y1, cbWidth / 2, cbHeight / 2, qgOnY, qgOnC, cbSubdiv + 2,
                cqtDepth + 1, 0, 0, 2, treeType, modeType )
        if( y1 < pic_height_in_luma_samples && x1 < pic_width_in_luma_samples )
            coding_tree( x1, y1, cbWidth / 2, cbHeight / 2, qgOnY, qgOnC, cbSubdiv + 2,
                cqtDepth + 1, 0,0, 3, treeType, modeType )
    }
    if( modeTypeCur = = MODE_TYPE_ALL && modeType = = MODE_TYPE_INTRA ) {
        coding_tree( x0, y0, cbWidth, cbHeight, qgOnY, qgOnC, cbSubdiv, cqtDepth, mttDepth, 0, 0
            DUAL_TREE_CHROMA, modeType )
    }
} else
    coding_unit( x0, y0, cbWidth, cbHeight, cqtDepth, treeTypeCurr, modeTypeCurr )
}
```

Figure 17:
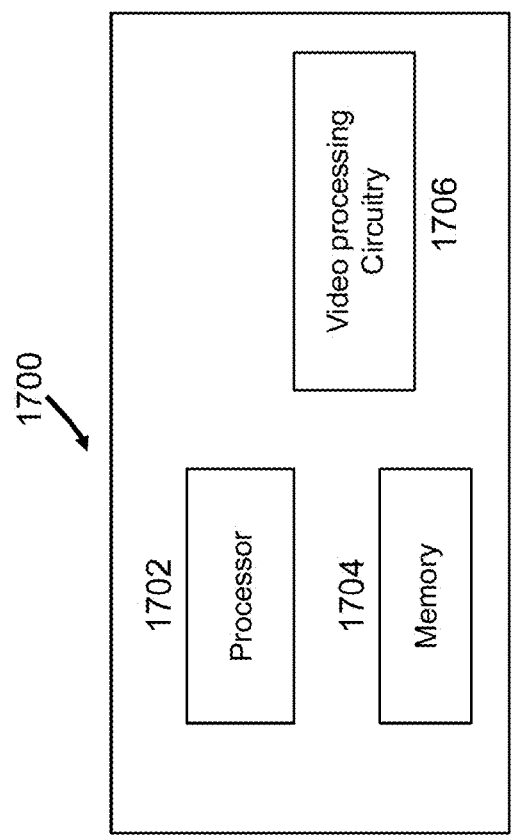
FIG. 17 is a block diagram of an example of a hardware platform used for implementing techniques described in the present document.

FIG. 17 is a block diagram of a video processing apparatus 1700. The apparatus 1700 may be used to implement one or more of the methods described herein. The apparatus 1700 may be embodied in a smartphone, tablet, computer, Internet of Things (IoT) receiver, and so on. The apparatus 1700 may include one or more processors 1702, one or more memories 1704 and video processing hardware 1706. The processor(s) 1702 may be configured to implement one or more methods described in the present document. The memory (memories) 1704 may be used for storing data and code used for implementing the methods and techniques described herein. The video processing hardware 1706 may be used to implement, in hardware circuitry, some techniques described in the present document. In some embodiments, the hardware 1706 may be at least partly within the processor 1702, e.g., a graphics co-processor.

Figure 18:
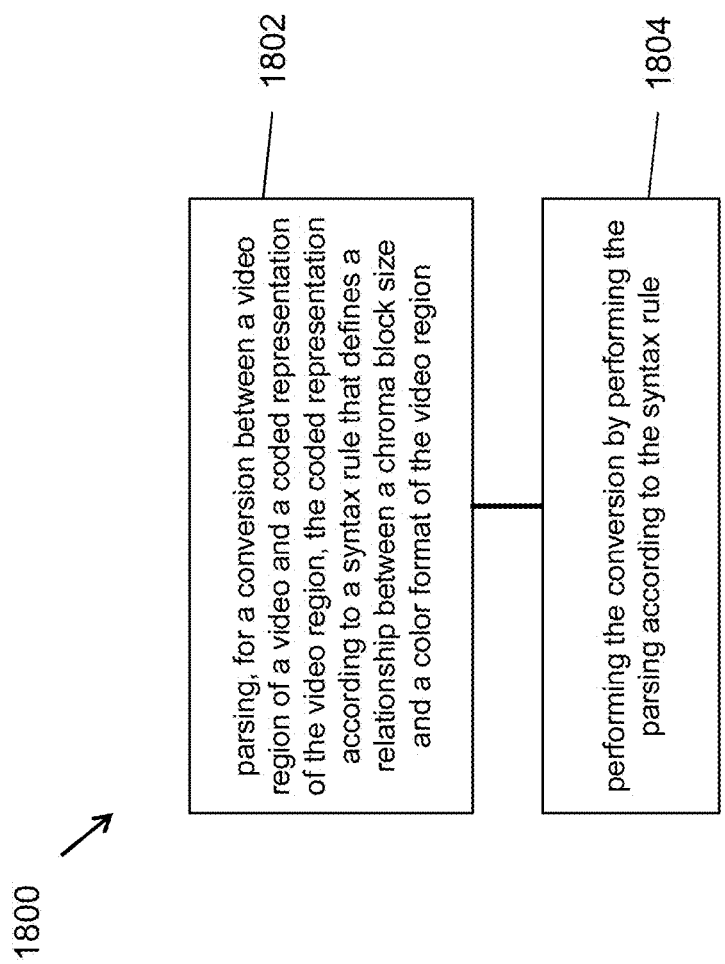
FIG. 18 is a flowchart for an example method of video processing.

FIG. 18 is a flowchart for a method 1800 of processing a video. The method 1800 includes parsing (1802), for a conversion between a video region of a video and a coded representation of the video region, the coded representation according to a syntax rule that defines a relationship between a chroma block size and a color format of the video region; and performing (1804) the conversion by performing the parsing according to the syntax rule.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The following first set of clauses may be implemented in some embodiments.

The following clauses may be implemented together with additional techniques described in item 1 of the previous section.

1. A method of video processing, comprising: parsing, for a conversion between a video region of a video and a coded representation of the video region, the coded representation according to a syntax rule that defines a relationship between a chroma block size and a color format of the video region; and performing the conversion by performing the parsing according to the syntax rule.

2. The method of clause 1, wherein the color format is 4:4:4 and where the syntax rule specifies that the chroma block is subject to a same size constraint as that for a luma blocks.

3. The method of clause 1, wherein the color format is 4:2:2 and where the syntax rule specifies that the chroma block is subject to a same size constraint as that for 4:2:0 color format.

4. The method of any of clauses 1-3, wherein the syntax specifies that a prediction modes and small block partitions are used in a chroma-format dependent manner.

5. The method of clause 1, wherein the syntax rule defines that a smallest allowed size feature is enabled for the conversion of the video region based on the color format of the video region.

The following clauses may be implemented together with additional techniques described in item 2 of the previous section.

6. A method of video processing, comprising: determining, based on a property of a video and a chroma format of the video, a coding mode of a coding tree node of the video; and performing a conversion between a coded representation of the video and a video block of the coding tree node using the determined coding mode.

7. The method of clause 6, wherein the coding mode is determined to be MODE_TYPE_ALL for the chroma format being 4:2:2, MODE_TYPE_INTRA or MODE_TYPE_INTER for the chroma format being 4:2:0 in case the property is:

i. the coding node is an M×N coding tree node with a horizontal binary tree split;
ii. the coding node is an M×N coding tree node with a vertical binary tree split;
iii. the coding node is an M×N coding tree node with a horizontal ternary tree split; or
iv. the coding node is an M×N coding tree node with a vertical ternary tree split.

8. The method of clause 7, wherein M=8, or 16 or 32 and N=4 or 8 or 16.

The following clauses may be implemented together with additional techniques described in item 12 of the previous section.

9. A method of video processing, comprising: determining, based on a rule, whether a certain size of chroma blocks is allowed in a video region of a video; and performing a conversion between the video region and a coded representation of the video region based on the determining.

10. The method of clause 9, wherein the rule specifies that 2×N chroma blocks are disallowed due to the video region including a dual tree partition.

11. The method of clause 9, wherein the rule specifies that 2N chroma blocks are disallowed due to the video region including a single tree partition.

12. The method of clauses 10 or 11, wherein N<=64.

The following clauses may be implemented together with additional techniques described in items 13, 14 and 15 of the previous section.

13. A method of video processing, comprising: determining, based on a rule that allows use of a coding mode for a video condition, that a coding mode is permitted for a video region; and performing a conversion between a coded representation of pixels in the video region and pixels of the video region based on the determining.

14. The method of clause 13, wherein the video condition is block size, and wherein the rule allows use of intra block copy mode for small block sizes of luma blocks.

15. The method of clause 14, wherein the small block sizes include 8×4, 8×8, 16×4 or 4×N luma block sizes.

16. The method of clause 13, wherein the rule allows use of intra block copy mode for conversion of the video region using a MODE_TYPE_INTER mode of coding.

17. The method of clause 13, wherein the rule allows use of palette coding mode for conversion of the video region using a MODE_TYPE_INTER mode of coding.

The following clauses may be implemented together with additional techniques described in items 16, 17, 18 of the previous section.

18. A method of video processing, comprising: performing a conversion between a video block of a video and a coded representation of the video block using a video coding mode, wherein a syntax element signaling the coding mode is selectively included in the coded representation based on a rule.

19. The method of clause 18, wherein the video coding mode is an intra block coding mode and wherein the rule specifies to use a type of the video coding mode to control inclusion of the syntax element in the coded representation.

20. The method of clause 19, wherein the rule specifies explicitly signaling a non-SKIP block.

21. The method of clause 18, wherein the rule specifies to implicitly signal intra block copy flag based on a skip flag and a mode type of the video block.

22. The method of clause 18, wherein the coding mode is a palette coding mode and wherein the rule specifies to selectively include a palette coding indicator based on mode type of the video block.

The following clauses may be implemented together with additional techniques described in item 21 of the previous section.

23. A method of video processing, comprising: determining, due to a chroma block having a size less than a threshold size, that a transform type used during a conversion between the chroma block and a coded representation of the chroma block is different from a transform type used for a corresponding luma block conversion; and performing the conversion based on the determining.

24. The method of clause 23, wherein the threshold size is M×N, wherein M is 2.

The following clauses may be implemented together with additional techniques described in item 22 of the previous section.

25. The method of any of clauses 1 to 24 wherein, the conversion uses a combined inter and intra prediction mode as a MODE_TYPE_INTRA mode.

26. The method of any of clauses 18 to 22, wherein the conversion uses a combined inter and intra prediction mode as a MODE_TYPE_INTER mode. For example, when considering CIIP as MODE_TYPE_INTER, methods described in item 14-17 in the previous section may be applied. Or when methods described in items 14-16 are applied, CIIP can be considered as MODE_TYPE_INTER.

The following clauses may be implemented together with additional techniques described in items 3-6 of the previous section.

27. A method of video processing, comprising: determining, whether a smallest chroma block rule is enforced during a conversion between a coded representation of a video region and pixel values of the video region, based on a coding condition of the video region; and performing the conversion based on the determining.

28. The method of clause 27, wherein the coding condition comprises a color format of the video region.

29. The method of clause 28, wherein the video region has a width of M pixels and a height of N pixels, and wherein the coding condition further depends on values of M and/or N.

30. The method of clause 29, wherein the smallest chroma block rule is enabled due to the video region having 4:2:2 color format and M*N=32 or M*N=64.

The following clauses may be implemented together with additional techniques described in items 7-11 of the previous section.

31. A method of video processing, comprising: determining, for a conversion between a coded representation of a video region in a 4:2:2 format and pixel values of the video region, a mode type to be used for the conversion based on whether a smallest chroma block rule is enabled for the video region; and performing the conversion based on the determining.

32. The method of clause 31, wherein the mode type of the video region is set to 1 due to the video region having 4:2:2 format and the smallest chroma block rule being enabled.

33. The method of clause 31, wherein the determining the mode type includes determining the mode type to be an INTRA type due to the smallest chroma block rule being enabled for the video region.

34. The method of clause 31, wherein the determining the mode type includes determining that the mode type INTER is disabled due to the smallest chroma block rule being enabled for the video region.

The following clauses may be implemented together with additional techniques described in items 7-11 of the previous section.

35. A method of video processing, comprising: determining, for a conversion between a coded representation of a video block and a video block of a video, whether block partitioning is allowed during the conversion, based on a mode type used during the conversion or a dimension of the video block; and performing the conversion using the determining.

36. The method of clause 35, wherein the block portioning comprises a binary tree partitioning or a ternary tree partitioning.

37. The method of any of clauses, 35-36 wherein, in case that the mode type is INTER mode, the block partitioning is based on a restriction rule that allows or disallows partition types.

38. The method of any of clauses 1 to 37, wherein the conversion comprises encoding the video into the coded representation.

39. The method of any of clauses 1 to 37, wherein the conversion comprises decoding the coded representation to generate pixel values of the video.

40. A video decoding apparatus comprising a processor configured to implement a method recited in one or more of clauses 1 to 39.

41. A video encoding apparatus comprising a processor configured to implement a method recited in one or more of clauses 1 to 39.

42. A computer program product having computer code stored thereon, the code, when executed by a processor, causes the processor to implement a method recited in any of clauses 1 to 39.

43. A method, apparatus or system described in the present document.

The second set of clauses describe certain features and aspects of the disclosed techniques in the previous section (e.g., items 1, 3-11, 18, 19, and 24).

Figure 21A:
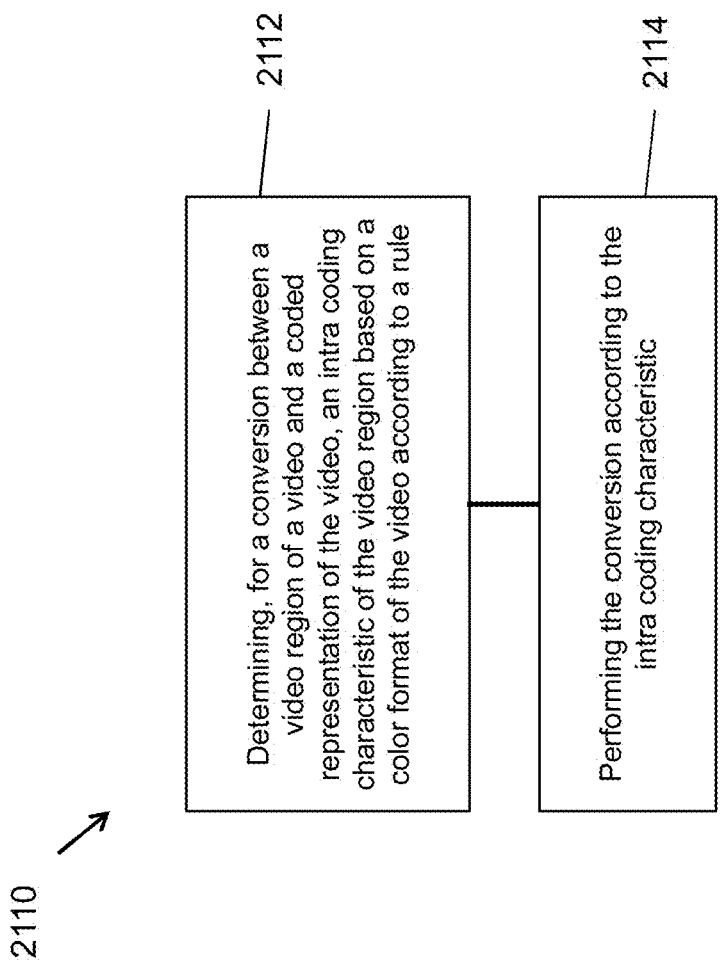
FIGS. 21A to 21G are flowcharts for example methods of video processing.

1. A method of video processing (e.g., method 2110 shown in FIG. 21A), comprising: determining (2112), for a conversion between a video region of a video and a coded representation of the video, an intra coding characteristic of the video region based on a color format of the video according to a rule; and performing (2114) the conversion according to the intra coding characteristic.

2. The method of clause 1, wherein the rule specifies that in case that the color format of the video region is 4:0:0 or 4:4:4, the intra coding characteristic is that all coding modes are enabled for the video region and wherein the coded representation includes a MODE_TYPE_ALL value for a syntax element indicating a mode type used for the video region.

3. The method of clauses 1-2, wherein the rule specifies that in case that the color format is 4:0:0 or 4:4:4, the coded representation includes a syntax element indicative of a condition for determining a mode type is set to 0.

4. The method of any of clauses 1-3, wherein the rule specifies that whether a restriction on a smallest allowed size for an intra coded chroma block in the video region is enabled depends on the color format.

5. The method of clause 4, wherein the rule specifies that the restriction is enabled for 4:2:0 and 4:2:2 formats.

6. The method of clause 4, wherein the rule specifies that the restriction is disabled for 4:0:0 and 4:4:4 formats.

Figure 21B:
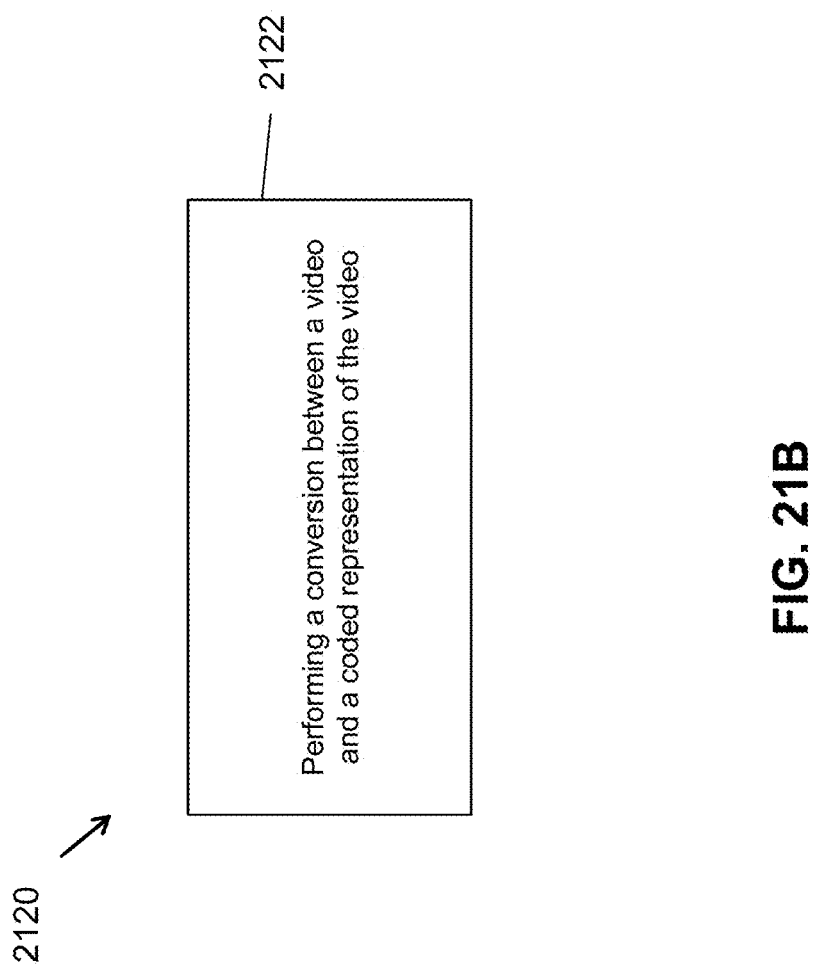

7. A method of video processing (e.g., method 2120 shown in FIG. 21B), comprising: performing (2122) a conversion between a current video block of a video and a coded representation of the video, wherein the coded representation conforms to a format rule, and wherein the format rule specifies a syntax element, modeType, indicative of a coding mode of the current video block, that is equal to either MODE_TYPE_NO_INTER that restricts use of the inter coding mode for the conversion, or MODE_TYPE_NO_INTRA that restricts use of the intra mode for the conversion.

8. A method of video processing (e.g., method 2120 shown in FIG. 21B), comprising: performing (2122) a conversion between a video and a coded representation of the video, wherein the coded representation conforms to a format rule that specifies that a flag indicating a prediction mode constraint is not included in the coded representation in case that a chroma format of the video is 4:2:2, 4:0:0, or 4:4:4.

9. The method of clause 8, wherein in case that the flag is not present, a corresponding value is inferred as 0 or 1.

Figure 21C:
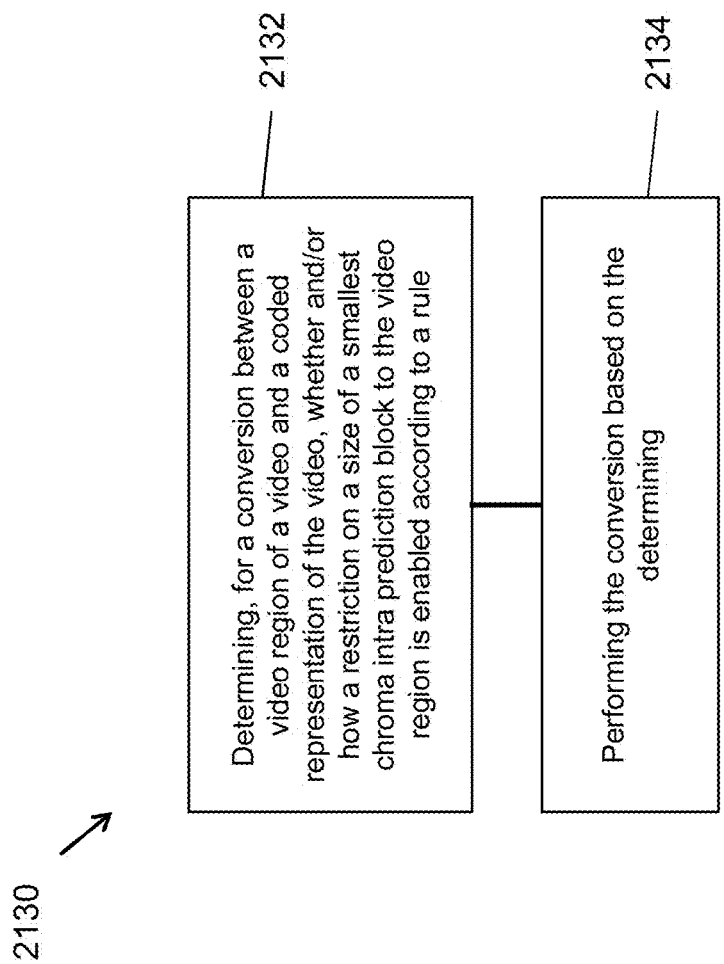

10. A method of video processing (e.g., method 2130 shown in FIG. 21C), comprising: determining (2132), for a conversion between a video region of a video and a coded representation of the video, whether and/or how a restriction on a size of a smallest chroma intra prediction block to the video region is enabled according to a rule; and performing (2134) the conversion based on the determining, wherein the rule is dependent on whether a color format of the video is 4:2:0 or 4:2:2.

11. A method of video processing, comprising: determining, for a conversion between a video region of a video and a coded representation of the video, whether a restriction on a size of a smallest chroma intra prediction block to the video region is enabled according to a rule; and performing the conversion based on the determining, wherein the rule is dependent on a color format of the video and/or a width (M) and a height (N) of the video region, and wherein the rule further specifies that, for the video region that is a coding tree node with a BT (binary tree) split, then the restriction on the smallest chroma intra prediction block is disabled in case that 1) the color format of the video is 4:2:2 and 2) that a multiplication of M and N is a value from a set of values, wherein the set of values includes 64.

12. The method of clause 11, wherein the rule further specifies that the restriction on the smallest chroma intra prediction block is enabled in case 1) that the color format of the video is 4:2:2 and 2) that the set of values further includes 32.

13. The method of clause 11, wherein the rule further specifies that the restriction on the smallest chroma intra prediction block is disabled in case 1) that the color format of the video is 4:2:2 and 2) that the set of values further includes 128.

14. The method of clause 11, wherein the rule further specifies, for the video region that is a coding tree node with a split_qt_flag equal to 1, that the restriction on the smallest chroma intra prediction block is enabled in case that the color format of the video is 4:2:2.

15. The method of clause 11, wherein the rule further specifies, for the video region that is a coding tree node with a TT (ternary tree) split, that the restriction on the smallest chroma intra prediction block is enabled in case that the color format of the video is 4:2:2.

16. The method of clause 11, wherein the rule further specifies, for the video region that is a coding tree node with a BT (binary tree) split, that the restriction on the smallest chroma intra prediction block is enabled in case that 1) the color format of the video is 4:2:2 and 2) that the set of values further includes 32.

17. The method of any of clauses 11 to 16, wherein the rule further specifies, for the smallest chroma intra prediction block in the video having a 4:2:2 color format, a modeTypeCondition is always equal to 1.

18. The method of any of clauses 11 to 17, wherein the rule further specifies, for the smallest chroma intra prediction block in the video having a 4:2:2 color format, only MODE_TYPE_INTRA that allows use of an intra mode, a palette mode, and an intra block copy mode for the conversion is allowed.

19. A method of video processing, comprising: performing a conversion between a video region of a video and a coded representation of the video according to a restriction on a smallest chroma intra prediction block size, wherein the coded representation conforms to a format rule that specifies a value of a syntax field in the coded representation, due to a 4:2:2 color format of the video.

20. The method of clause 19, wherein the syntax field corresponds to a modeTypeCondition of the SCIPU block and wherein the format rule further specifies, due to the 4:2:2 color format, that the modeTypeCondition is always 1.

21. The method of clause 19, wherein the syntax field corresponds to a modeTypeCondition of the SCIPU block and wherein the format rule further specifies, due to the 4:2:2 color format, that the modeTypeCondition is 0 or 1.

22. The method of clause 19, wherein the syntax field corresponds to a modeTypeCondition of the SCIPU block and wherein the format rule further specifies, due to the 4:2:2 color format, that the modeTypeCondition is not 2.

23. The method of clause 19, wherein the syntax field corresponds to a modeType of the SCIPU block and wherein the format rule further specifies, due to the 4:2:2 color format, that the modeType is always equal to MODE_TYPE_INTRA that allows use of an intra mode, a palette mode, and an intra block copy mode.

24. The method of clause 19, wherein the syntax field corresponds to a modeType of the SCIPU block and wherein the format rule further specifies, due to the 4:2:2 color format, that the modeType is equal to 1) MODE_TYPE_ALL that allows use of an inter coding mode, an intra mode, a palette mode, and an intra block copy mode for the conversion or 2) MODE_TYPE_INTRA that that allows use of an intra mode, a palette mode, and an intra block copy mode.

25. The method of clause 19, wherein the syntax field corresponds to a modeType of the SCIPU block and wherein the format rule further specifies, due to the 4:2:2 color format, that the modeType does not correspond to MODE_TYPE_INTER that allows use of an inter mode only for the conversion.

Figure 21D:
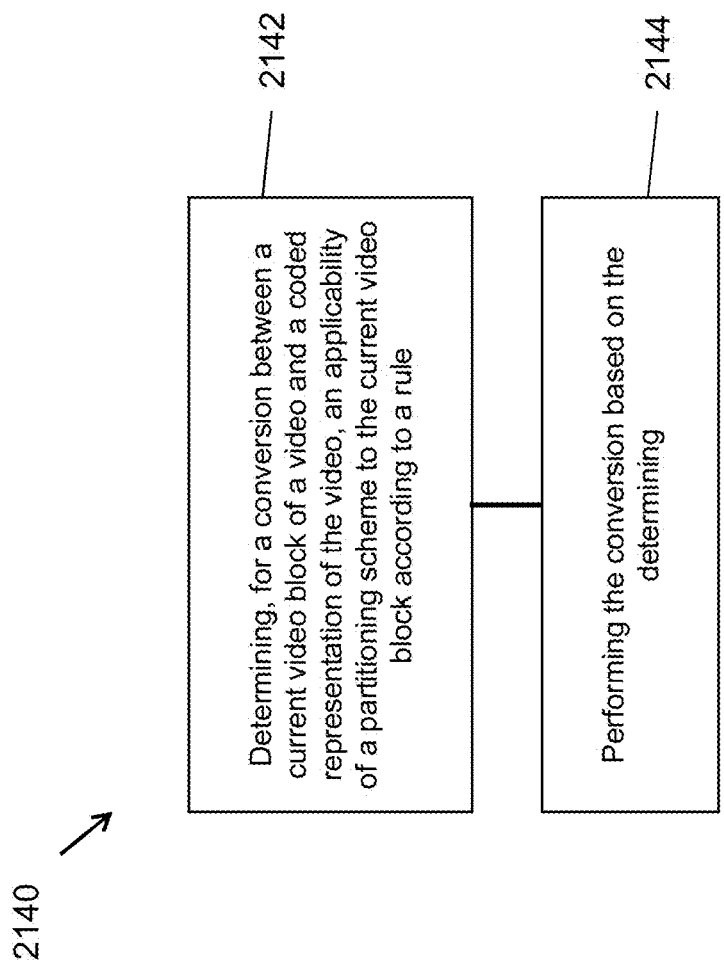

26. A method of video processing (e.g., method 2140 shown in FIG. 21D), comprising: determining (2142), for a conversion between a current video block of a video and a coded representation of the video, an applicability of a partitioning scheme to the current video block according to a rule; and performing (2144) the conversion based on the determining.

27. The method of clause 26, wherein the rule specifies that the determining determines the applicability based on at least one of a mode type used during the conversion or a dimension of the current video block, and wherein the partitioning scheme comprises a BT (binary tree) split and/or a TT (ternary tree) split.

28. The method of clause 27, wherein in case that the mode type is equal to a MODE_TYPE_INTER that allows use of an inter mode only for the conversion, the BT split is disallowed for the current video block.

29. The method of clause 27, wherein in case that the mode type is equal to a MODE_TYPE_INTER that allows use of an inter mode only for the conversion, the TT split is disallowed for the current video block.

30. The method of clause 27, wherein in case that M*N is less than or equal to 32 and the mode type is equal to MODE_TYPE_INTER that allows use of an inter mode only for the conversion, the BT split is disallowed, whereby M and N correspond to a height and a width of the current video block.

31. The method of clause 27, wherein in case that M*N is less than or equal to 64 and the mode type is equal to MODE_TYPE_INTER that allows use of an inter mode only for the conversion, the TT split is disallowed, whereby M and N correspond to a height and a width of the current video block.

32. The method of clause 26, wherein the rule specifies to restrict a certain partitioning scheme based on a syntax element, modeTypeCurr, that is included in the coded representation and descriptive of a mode type used during the conversion, and wherein the certain partitioning scheme comprises a BT (binary tree) split, a TT (ternary tree) split, and/or QT (quaternary tree) split.

33. The method of clause 32, wherein, due to the modeTypeCurr that is equal to MODE_TYPE_INTER that allows use of an inter mode only for the conversion, the BT split is disallowed.

34. The method of clause 32, wherein, due to the modeTypeCurr that is equal to MODE_TYPE_INTER that allows use of an inter mode only for the conversion, the TT split is disallowed.

35. The method of clause 32, wherein, due to the modeTypeCurr that is equal to MODE_TYPE_INTER that allows use of an inter mode only for the conversion, the QT split is disallowed.

36. The method of clause 32, wherein the BT split is disallowed in case that the modeTypeCurr that is equal to MODE_TYPE_INTER that allows use of an inter mode only for the conversion and that a luma block size is less than or equal to 32.

37. The method of clause 32, wherein the TT split is disallowed in case that the modeTypeCurr that is equal to MODE_TYPE_INTER that allows use of an inter mode only for the conversion and that a luma block size is less than or equal to 64.

Figure 21E:
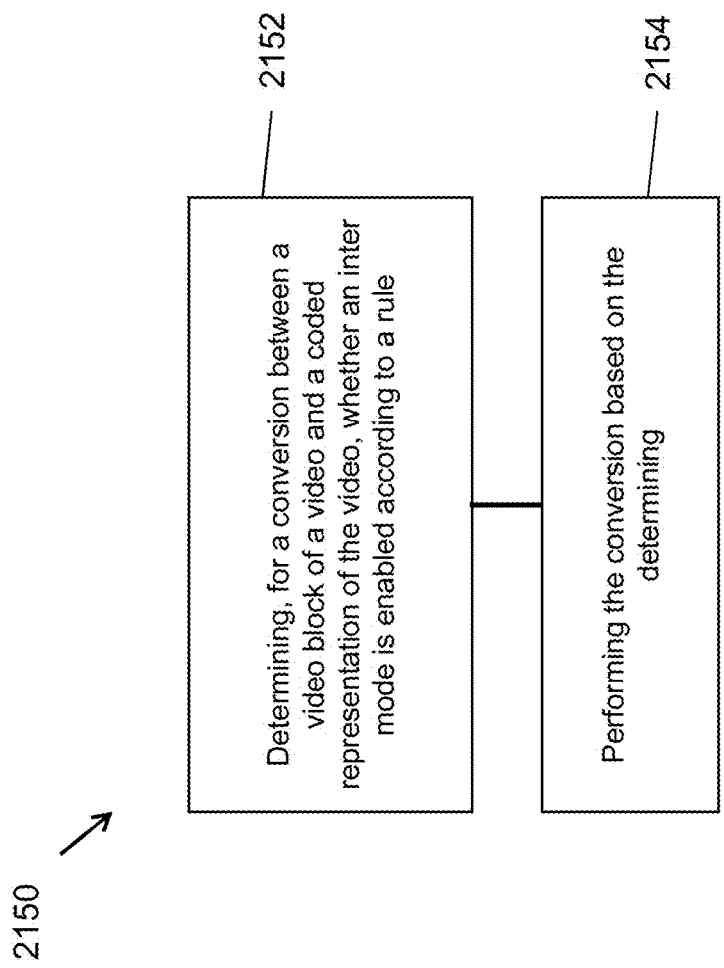

38. A method of video processing (e.g., method 2150 shown in FIG. 21E), comprising: determining (2152), for a conversion between a video block of a video and a coded representation of the video, whether an inter mode is enabled according to a rule, and performing (2154) the conversion based on the determining, wherein the rule specifies that the inter mode is enabled in case that a dual tree partitioning of luma samples is enabled for the video block.

39. The method of clause 38, wherein the coded representation includes a syntax field that is equal to DUAL_TREE_LUMA.

40. The method of clause 38, wherein the coding unit coded in the inter mode contains the luma samples only for color formats with multiple color components.

41. The method of clause 38, wherein the coded representation includes a flag indicative of a prediction mode applied to the video block and the flag is parsed for the video block corresponding to a luma block having a dual tree type.

42. The method of clause 38, wherein the rule further specifies to apply same constraints about the inter mode regardless of whether the dual tree partitioning or a single tree partitioning of the luma samples is enabled for the video block.

Figure 21F:
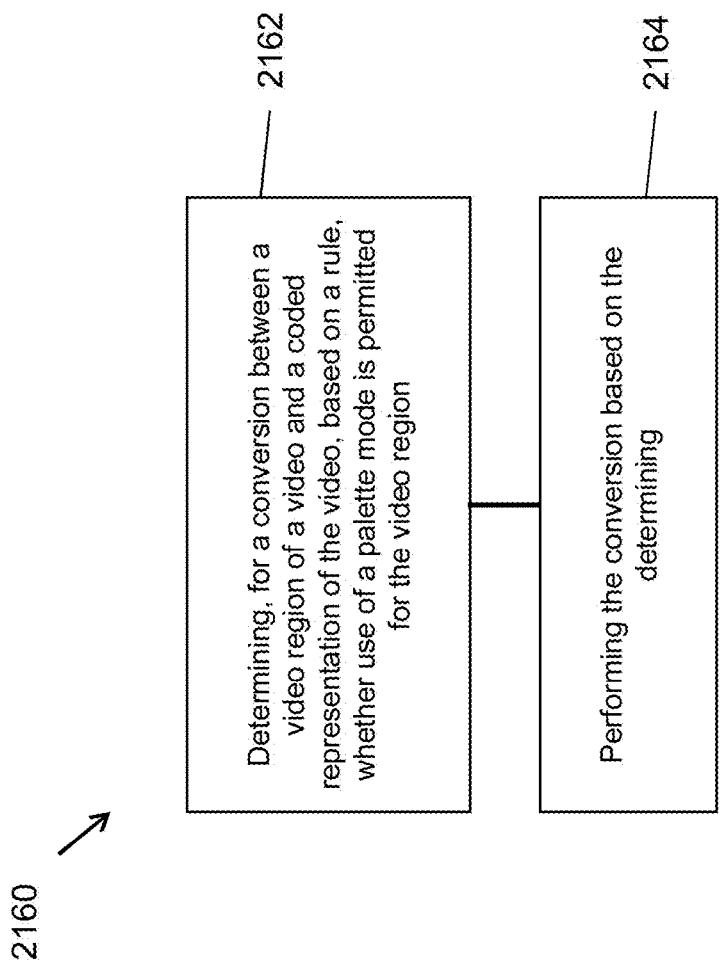
Figure 21G:
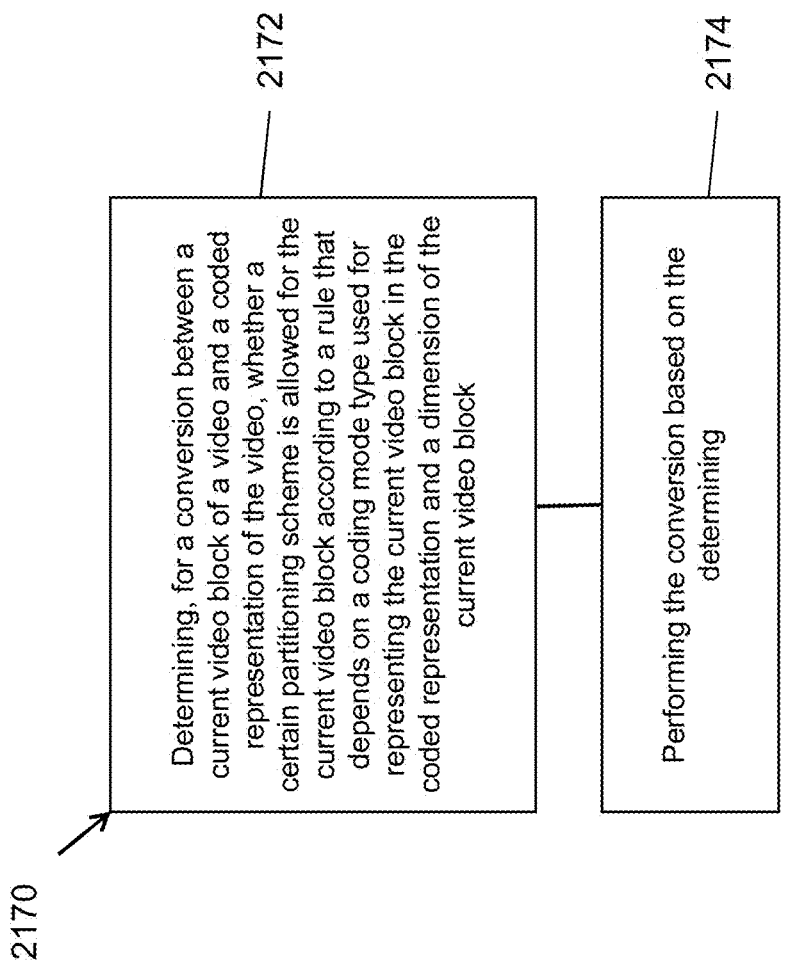

43. A method of video processing (e.g., method 2160 shown in FIG. 21F), comprising: determining (2162), for a conversion between a video region of a video and a coded representation of the video, based on a rule, whether use of a palette mode is permitted for the video region; and performing (2164) the conversion based on the determining, wherein the palette mode includes encoding the video region using a palette of representative sample values.

44. The method of clause 43, the rule specifies that the palette mode is allowed in case that a mode type of the video region is equal to MODE_TYPE_INTRA that allows use of an intra mode, a palette mode, and an intra block copy mode for the conversion or MODE_TYPE_INTER that allows use of an inter mode only for the conversion.

45. The method of clause 43, wherein the rule specifies that the palette mode is allowed independently of a mode type of the video region.

46. The method of clause 43, wherein the rule is based on a slice_type and a mode type of the video region.

47. The method of clause 46, wherein the rule specifies that the palette mode is allowed for an I slice with the mode type that is equal to MODE_TYPE_INTRA that allows use of an intra mode, a palette mode, and an intra block copy mode for the conversion.

48. The method of clause 46, wherein the rule specifies that the palette mode is allowed for a PB slice with the mode type that is equal to MODE_TYPE_INTRA that allows use of an intra mode, a palette mode, and an intra block copy mode for the conversion.

49. The method of clause 43, wherein the rule further specifies that a local dual tree is disallowed in case that the palette mode is allowed.

50. The method of clause 43, wherein a modeTypeCondition is always set 0 in case that the palette mode is enabled.

51. A method of video processing, comprising: performing a conversion between a current video block of a video and a coded representation of the video, wherein the coded representation conforms to a format rule, wherein the format rule specifies a syntax element, modeType, that includes a MODE_TYPE_IBC that allows use of an intra block copy mode for the conversion or MODE_TYPE_PALETTE that allows use of a palette mode for the conversion, wherein the intra block copy mode includes encoding the current video block using at least a block vector pointing to a video frame containing the current video block, and wherein the palette mode includes encoding the current video block using a palette of representative sample values.

52. The method of clause 51, wherein the format rule further specifies that the coded representation does not include a pred_mode_flag, a pred_mode_ibc_flag, and/or a pre_mode_plt_flag, in case that the modeType is the MODE_TYPE_IBC or the MODE_TYPE_PALETTE.

53. The method of clause 51, wherein the coded representation includes an index indicating a mode type used for the conversion instead of a mode_constraint_flag.

54. The method of any of clauses 1 to 53, wherein the conversion includes encoding the video into the coded representation.

55. The method of any of clauses 1 to 53, wherein the conversion includes decoding the coded representation to generate the video.

56. A video processing apparatus comprising a processor configured to implement a method recited in any one or more of clauses 1 to 55.

57. A computer readable medium storing program code that, when executed, causes a processor to implement a method recited in any one or more of clauses 1 to 55.

58. A computer readable medium that stores a coded representation or a bitstream representation generated according to any of the above described methods.

The third set of clauses describe certain features and aspects of the disclosed techniques in the previous section (e.g., items 25-33).

1. A method of video processing, comprising: determining, for a conversion between a current video block of a video and a coded representation of the video, whether a certain partitioning scheme is allowed for the current video block according to a rule that depends on a coding mode type used for representing the current video block in the coded representation and a dimension of the current video block; and performing the conversion based on the determining.

2. The method of clause 1, wherein the certain partitioning scheme comprises a QT (quaternary tree) split in which the current video block is split into four parts in both horizontal and vertical directions, a vertical TT (ternary tree) split in which the current video block is split into three parts in a vertical direction, a horizontal TT split in which the current video block is split into three parts in a horizontal direction, a vertical BT (binary tree) split in which the current video block is split into two parts in a vertical direction, and/or a horizontal BT split in which the current video block is split into two parts in a horizontal direction.

3. The method of clause 1, wherein the rule specifies that a QT (quaternary tree) split is disallowed for the current video block in case 1) that the coded representation includes a MODE_TYPE_INTER value corresponding to the coding mode type in which an inter mode only is allowed for the current video block and 2) that both of a width and a height of the current video block are 8.

4. The method of clause 1, wherein the rule specifies that a TT (ternary tree) split is disallowed for the current video block in case 1) that the coded representation includes a MODE_TYPE_INTER value corresponding to the coding mode type in which an inter mode only is allowed for the current video block and 2) that a multiplication of a width and a height of the current video block is 64.

5. The method of clause 4, wherein the rule further specifies that a vertical TT (ternary tree) split is disallowed in a case that the coded representation includes a MODE_TYPE_INTER value and the width and the height of the current video block are 16 and 4, respectively.

6. The method of clause 4, wherein the rule further specifies that a horizontal TT (ternary tree) split is disallowed in a case that the coded representation includes a MODE_TYPE_INTER value and the width and the height of the current video block are 4 and 16, respectively.

7. The method of clause 1, wherein the rule specifies that a BT (binary tree) split is disallowed for the current video block in case 1) that the coded representation includes a MODE_TYPE_INTER value corresponding to the coding mode type in which an inter mode only is allowed for the current video block and 2) that a multiplication of a width and a height of the current video block is 32.

8. The method of clause 7, wherein the rule further specifies that a vertical BT (binary tree) split is disallowed in a case that the coded representation includes a MODE_TYPE_INTER value and the width and the height of the current video block are 8 and 4, respectively.

9. The method of clause 7, wherein the rule specifies that a horizontal BT (binary tree) split is disallowed in a case that the coded representation includes a MODE_TYPE_INTER value and the width and the height of the current video block are 4 and 8, respectively.

10. A method of video processing, comprising: performing a conversion between a video block of a video and a coded representation of the video, wherein the coded representation conforms to a format rule, wherein the format rule specifies that a characteristic of the video block controls whether a syntax element in the coded representation indicates a prediction mode of the video block.

11. The method of clause 10, wherein the characteristic of the video block includes at least one of color components or a dimension of the video block.

12. The method of clause 10 or 11, wherein the format rule further specifies that the syntax element indicates the prediction mode of the video block corresponding to a chroma block.

13. The method of any of clauses 10 to 12, wherein the format rule further specifies that the syntax element does not indicate the prediction mode of the video block corresponding to a luma block and the prediction mode of the video block corresponding to the luma block is included in the coded representation.

14. The method of clause 13, wherein the video block has a width and a height that are greater than 4.

15. A method of video processing, comprising: performing a conversion between a video region of a first component of a video and a coded representation of the video, wherein the coded representation conforms to a format rule, wherein the format rule specifies whether and/or how a syntax field is configured in the coded representation to indicate a differential quantization parameter for the video region depends on a splitting scheme used for splitting samples of the first component.

16. The method of clause 15, wherein the format rule further specifies whether and/or how the syntax field is configured in the coded representation is independent of a splitting scheme used for splitting samples of a second component of the video.

17. The method of clause 15 or 16, wherein the first component is a luma component and the second component is a chroma component.

18. The method of clause 15 or 16, wherein the first component is a chroma component and the second component is a luma component.

19. The method of clause 15, wherein the format rule further specifies to include information related to the differential quantization parameter at most once in a specific region in which a luma component and a chroma component share a same mode type.

20. The method of clause 19, wherein the specific region corresponds to a quantization group.

21. A method of video processing, comprising: performing a conversion between a video region of a first component of a video and a coded representation of the video according to a rule, wherein the rule specifies, in case that a dual tree and/or a local dual tree coding structure is applied to the video region, that a variable related to a differential quantization parameter of the first component is not modified during a decoding or parsing process of a second component of the video.

22. The method of clause 21, wherein the local dual tree structure is applied to the video region in case that a restriction on a smallest allowed size for a chroma block is applied to the video region.

23. The method of clause 21 or 22, wherein the first component is a luma component and the second component is a chroma component.

24. The method of clause 21 or 22, wherein the first component is a chroma component and the second component is a luma component.

25. A method of any of clauses 21 to 24, wherein the differential quantization parameter indicates a difference in a quantization value applied to the video block and a previous quantization value applied to a neighboring video block.

26. The method of any of clauses 1 to 25, wherein the performing of the conversion includes generating the coded representation from the video.

27. The method of any of clauses 1 to 25, wherein the performing of the conversion includes generating the video from the coded representation.

28. A video processing apparatus comprising a processor configured to implement a method recited in any one or more of clauses 1 to 27.

29. A computer readable medium storing program code that, when executed, causes a processor to implement a method recited in any one or more of clauses 1 to 27.

30. A computer readable medium that stores a coded representation or a bitstream representation generated according to any of the above described methods.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
determining, for a conversion between a video slice including a luma parent block and a chroma parent block and a bitstream of the video, whether to split the luma parent block and the chroma parent block into one or more luma blocks and one or more chroma blocks respectively, wherein a mode type of the luma block or a mode type of the chroma block is determined based on a value of a variable, and wherein the value of the variable is derived based on a color format of the video slice; and performing the conversion based on the determining, wherein the luma parent block is generated from a luma coding tree block (CTB) based on a luma partition scheme including recursive partition operations, and wherein the chroma parent block is generated from a chroma coding tree block (CTB) based on a chroma partition scheme having same recursive partition operations with the luma partition scheme.

2. The method of claim 1, wherein when the color format of the video slice is 4:0:0 or 4:4:4, the value of the variable is set to be 0.

3. The method of claim 2, wherein when the value of the variable is 0, the mode type of the luma block and the mode type of the chroma block is MODE_TYPE_ALL, and wherein the mode type having a value of MODE_TYPE_ALL specifies that all coding modes are available for the luma block and the chroma block.

4. The method of claim 3, wherein when the value of the variable is 0, a mode constraint flag is not included in the bitstream, and wherein a value of the mode constraint flag specifies whether inter prediction coding modes can be used.

5. The method of claim 1, wherein the value of the variable is derived further based on a size of the luma parent block and a first predetermined partition mode of the luma parent block.

6. The method of claim 5, wherein in response to the luma parent block having a size of 64, the color format of the video slice being not equal to 4:0:0 and 4:4:4, and the first predetermined partition mode being QT (quaternary tree) split, the variable is equal to 1.

7. The method of claim 5, wherein in response to the luma parent block having a size of 32, the color format of the video slice being not equal to 4:0:0 and 4:4:4, and the first predetermined partition mode being BT (binary tree) split, the variable is equal to 1.

8. The method of claim 5, wherein in response to a slice_type of the video slice being equal to I slice, the color format of the video slice being 4:2:0, the luma parent block having a size of 64, and the first predetermined partition mode being BT (binary tree) split, the variable is set to be 1, and wherein in response to the color format of the video slice being 4:2:2, the luma parent block having a size of 64, and the first predetermined partition mode being BT (binary tree) split, the variable is set to be 0.

9. The method of claim 5, wherein in response to a slice_type of the video slice being equal to I slice, the color format of the video slice being 4:2:0, the luma parent block having a size of 128, and the first predetermined partition mode being TT (ternary tree) split, the variable is set to be 1, and wherein in response to the color format of the video slice being 4:2:2, the luma parent block having a size of 128, and the first predetermined partition mode being TT (ternary tree) split, the variable is set to be 0.

10. The method of claim 5, wherein in response to the value of the variable being 1, the chroma parent block is not allowed to be split and the first predetermined partition mode is allowed for the luma parent block.

11. The method of claim 5, wherein in response to the slice_type being not equal to I slice, the color format of the video slice being 4:2:0, the luma parent block having a size of 64, and the first predetermined partition mode being BT (binary tree) split, the variable is set to be 2, and wherein in response to the color format of the video slice being 4:2:2, the luma parent block having a size of 64, and the first predetermined partition mode being BT (binary tree) split, the variable is set to be 0.

12. The method of claim 5, wherein in response to the slice_type being not equal to I slice, the color format of the video slice being 4:2:0, the luma parent block having a size of 128, and the first predetermined partition mode being TT (ternary tree) split, the variable is set to be 2, and wherein in response to the color format of the video slice being 4:2:2, the luma parent block having a size of 128, and the first predetermined partition mode being TT (ternary tree) split, the variable is set to be 0.

13. The method of claim 5, wherein in response to the value of the variable being 2, a mode constraint flag is included in the bitstream, and wherein the mode constraint flag specifies whether inter prediction coding modes can be used.

14. The method of claim 13, wherein in response to the value of the variable being 2 and the mode constraint flag specifying that inter prediction coding modes cannot be used, the chroma parent block is not allowed to be split and the first predetermined partition is allowed for the luma parent block.

15. The method of claim 1, wherein the conversion comprises encoding the video into the bitstream.

16. The method of claim 1, wherein the conversion comprises decoding the video from the bitstream.

17. An apparatus for processing video data comprising a processor and a non-transitory memory with instructions thereon, wherein the instructions upon execution by the processor, cause the processor to:

determine, for a conversion between a video slice including a luma parent block and a chroma parent block and a bitstream of the video, whether to split the luma parent block and the chroma parent block into one or more luma blocks and one or more chroma blocks respectively, wherein a mode type of the luma block or a mode type of the chroma block is determined based on a value of a variable, and wherein the value of the variable is derived based on a color format of the video slice; and perform the conversion based on the determining, wherein the luma parent block is generated from a luma coding tree block (CTB) based on a luma partition scheme including recursive partition operations, and wherein the chroma parent block is generated from a chroma coding tree block (CTB) based on a chroma partition scheme having same recursive partition operations with the luma partition scheme.

18. The apparatus of claim 17, wherein when the color format of the video slice is 4:0:0 or 4:4:4, the value of the variable is set to be 0, wherein when the value of the variable is 0, the mode type of the luma block and the mode type of the chroma block is MODE_TYPE_ALL, and wherein the mode type having a value of MODE_TYPE_ALL specifies that all coding modes are available for the luma block and the chroma block.

19. A non-transitory computer-readable storage medium storing instructions that cause a processor to:

determine, for a conversion between a video slice including a luma parent block and a chroma parent block and a bitstream of the video, whether to split the luma parent block and the chroma parent block into one or more luma blocks and one or more chroma blocks respectively, wherein a mode type of the luma block or a mode type of the chroma block is determined based on a value of a variable, and wherein the value of the variable is derived based on a color format of the video slice; and perform the conversion based on the determining, wherein the luma parent block is generated from a luma coding tree block (CTB) based on a luma partition scheme including recursive partition operations, and wherein the chroma parent block is generated from a chroma coding tree block (CTB) based on a chroma partition scheme having same recursive partition operations with the luma partition scheme.

20. A non-transitory computer-readable recording medium storing a bitstream of a video which is generated by a method performed by a video processing apparatus, wherein the method comprises:

determining, for a video slice including a luma parent block and a chroma parent block, whether to split the luma parent block and the chroma parent block into one or more luma blocks and one or more chroma blocks respectively, wherein a mode type of the luma block or a mode type of the chroma block is determined based on a value of a variable, and wherein the value of the variable is derived based on a color format of the video slice; and generating the bitstream based on the determining, wherein the luma parent block is generated from a luma coding tree block (CTB) based on a luma partition scheme including recursive partition operations, and wherein the chroma parent block is generated from a chroma coding tree block (CTB) based on a chroma partition scheme having same recursive partition operations with the luma partition scheme.

* * * * *